United States Patent [19]
Hamanishi et al.

[11] Patent Number: 5,978,150
[45] Date of Patent: *Nov. 2, 1999

[54] ZOOM LENS

[75] Inventors: Yoshinari Hamanishi, Ohtawara; Kenzabro Suzuki, Yokohama, both of Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/657,668

[22] Filed: May 31, 1996

[30] Foreign Application Priority Data

| Jun. 1, 1995 | [JP] | Japan | 7-158568 |
| Jun. 1, 1995 | [JP] | Japan | 7-158569 |
| Jan. 10, 1996 | [JP] | Japan | 8-019343 |

[51] Int. Cl.⁶ ................................ G02B 15/14
[52] U.S. Cl. ................ 359/683; 359/685; 359/686; 359/689; 359/690; 359/691; 359/692
[58] Field of Search ................ 359/683, 685, 359/686, 689–692

[56] References Cited

U.S. PATENT DOCUMENTS

| 3,970,367 | 7/1976 | Tsuji . |
| 4,189,213 | 2/1980 | Iizuka ............... 359/683 |
| 4,437,732 | 3/1984 | Ishiyama . |
| 4,498,741 | 2/1985 | Ishiyama . |
| 4,637,690 | 1/1987 | Miyamae et al. . |
| 4,730,908 | 3/1988 | Tanaka . |
| 4,749,266 | 6/1988 | Takahashi et al. . |
| 4,854,685 | 8/1989 | Corbasson . |
| 4,896,950 | 1/1990 | Endo et al. . |
| 5,388,004 | 2/1995 | Adachi . |
| 5,440,430 | 8/1995 | Sato . |

FOREIGN PATENT DOCUMENTS

| 39-6127 | 5/1964 | Japan . |
| 39-29046 | 12/1964 | Japan . |
| 50-26931 | 9/1975 | Japan . |
| 54-29658 | 3/1979 | Japan . |
| 57-173812 | 10/1982 | Japan . |
| 60-39613 | 3/1985 | Japan . |
| 61-4013 | 1/1986 | Japan . |
| 61-124914 | 6/1986 | Japan . |
| 1-191819 | 8/1989 | Japan . |
| 3-71686 | 3/1991 | Japan . |

OTHER PUBLICATIONS

Tanaka, Kazuo "Paraxial analysis of mechanically compensated zoom lenses. 3: Five–component type"; Feb. 15, 1983; Applied Optics; vol. 22, No. 4; pp. 541–553.

*Primary Examiner*—Georgia Epps
*Assistant Examiner*—Evelyn A. Lester
*Attorney, Agent, or Firm*—Oliff & Berridge, PLC

[57] ABSTRACT

A high performance zoom lens with a high zoom ratio is suitable for a wide range of uses. The zoom lens includes, in order from the object side, a first lens group having a positive refractive power, a second lens group having a negative refractive power, a third lens group having a positive refractive power, a fourth lens group having a negative refractive power, and the fifth lens group having a positive refractive power. A magnification of the second lens group, a magnification of the third lens group and a magnification of the fourth lens group almost simultaneously attain near equal magnification. The zoom lens system satisfies at least one predetermined condition.

42 Claims, 58 Drawing Sheets

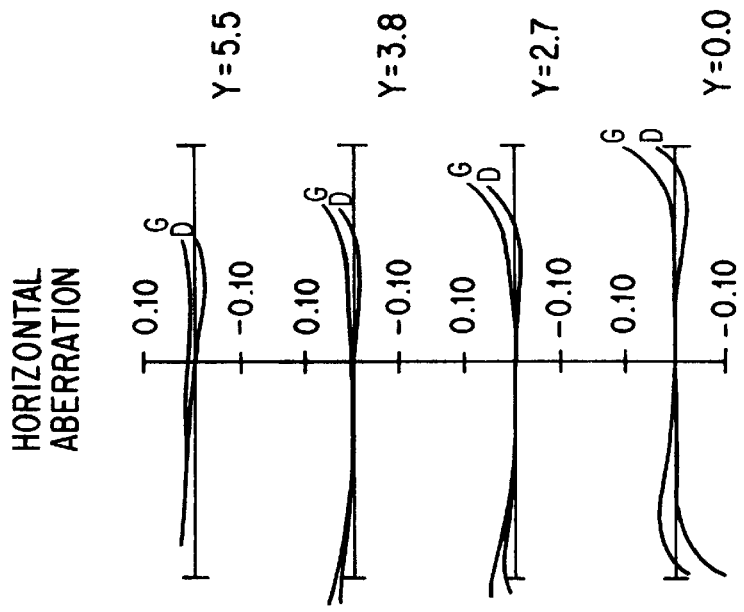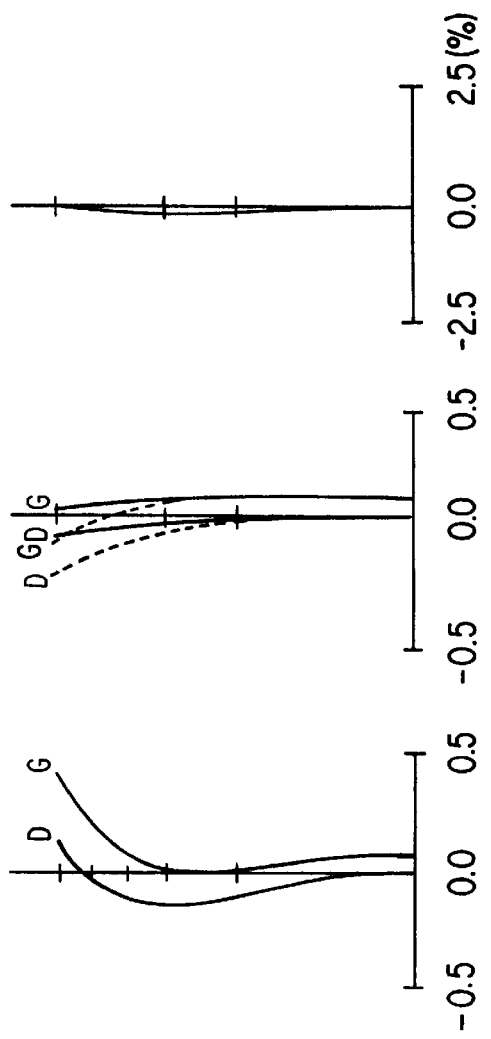
FIG. 6a  FIG. 6b  FIG. 6c  FIG. 6d

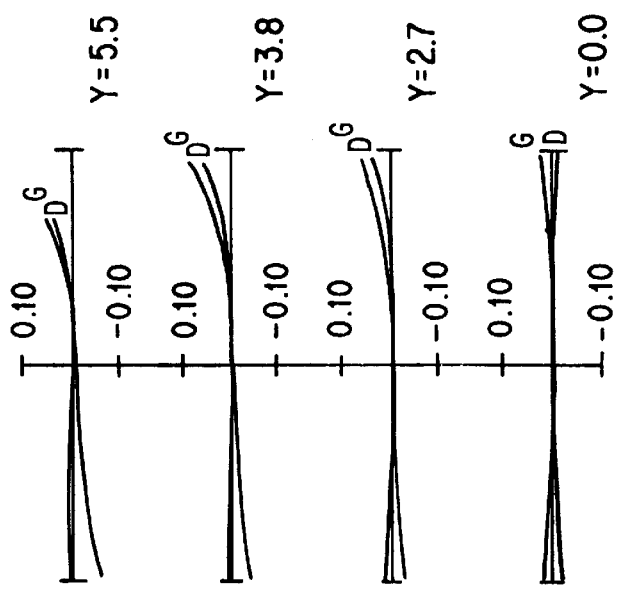
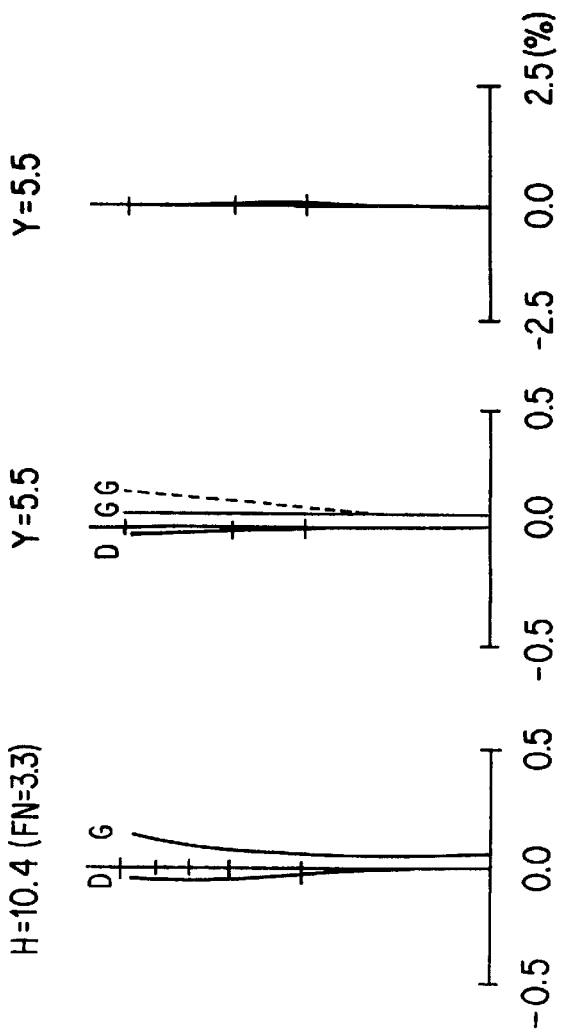
FIG. 7a
FIG. 7b
FIG. 7c
FIG. 7d

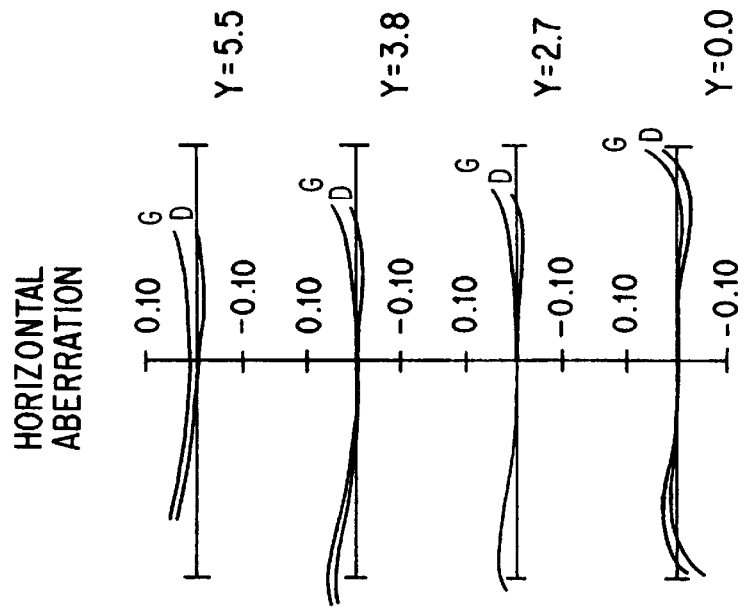
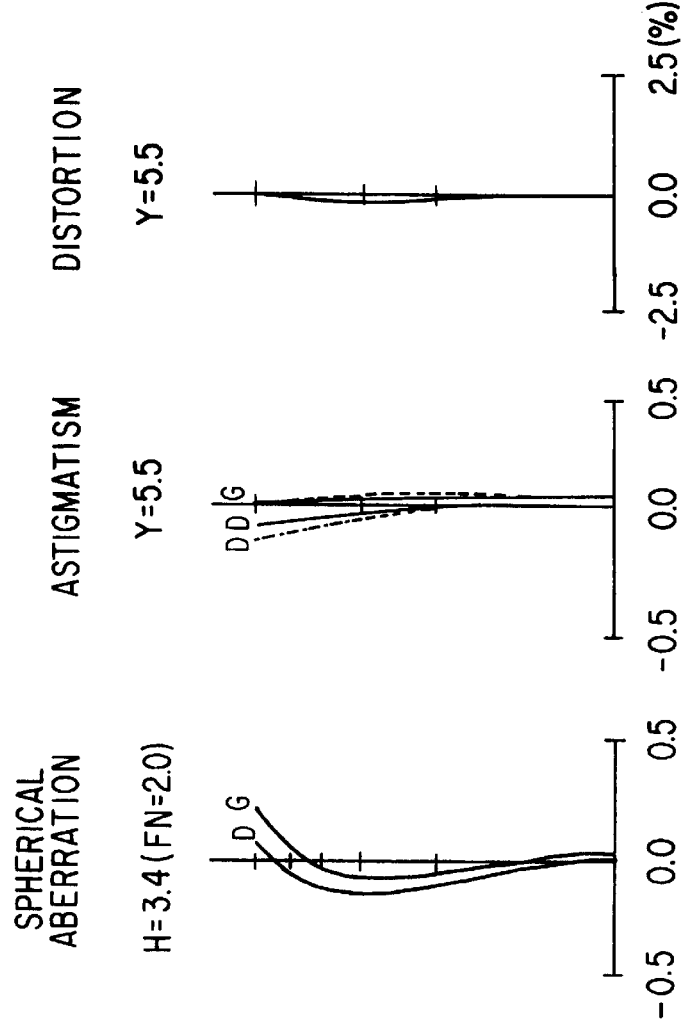

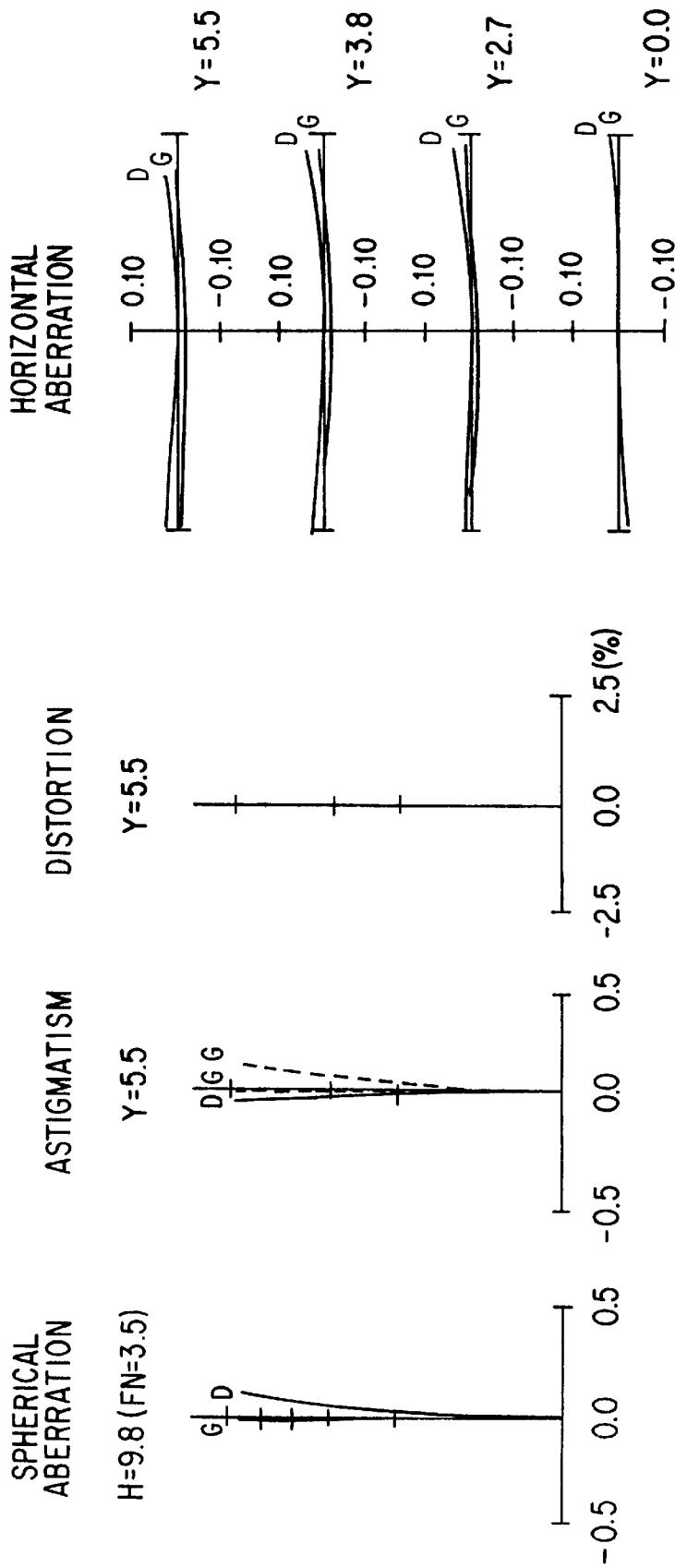

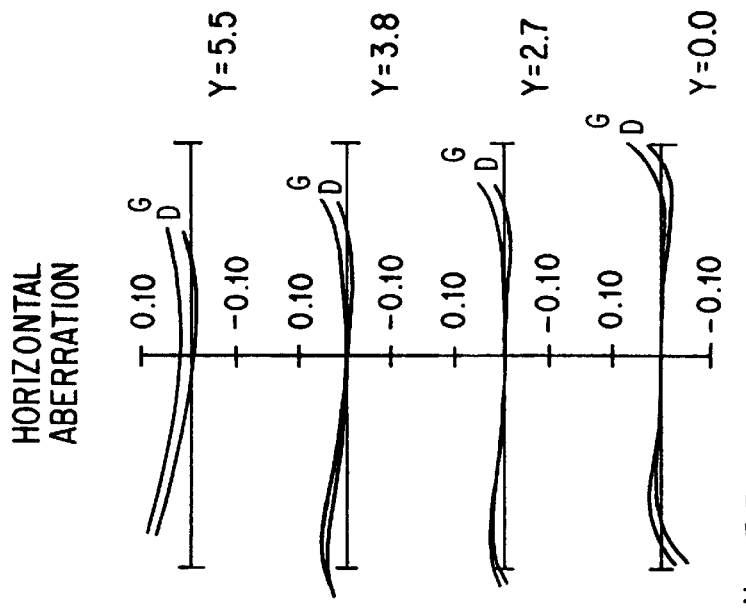
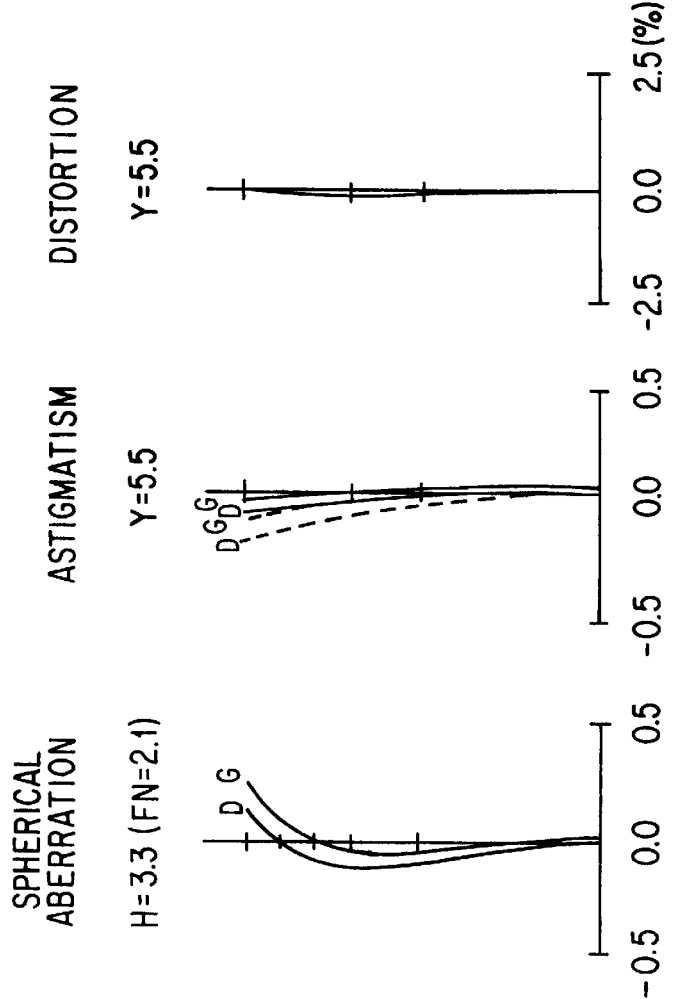
FIG. 12a  FIG. 12b  FIG. 12c  FIG. 12d

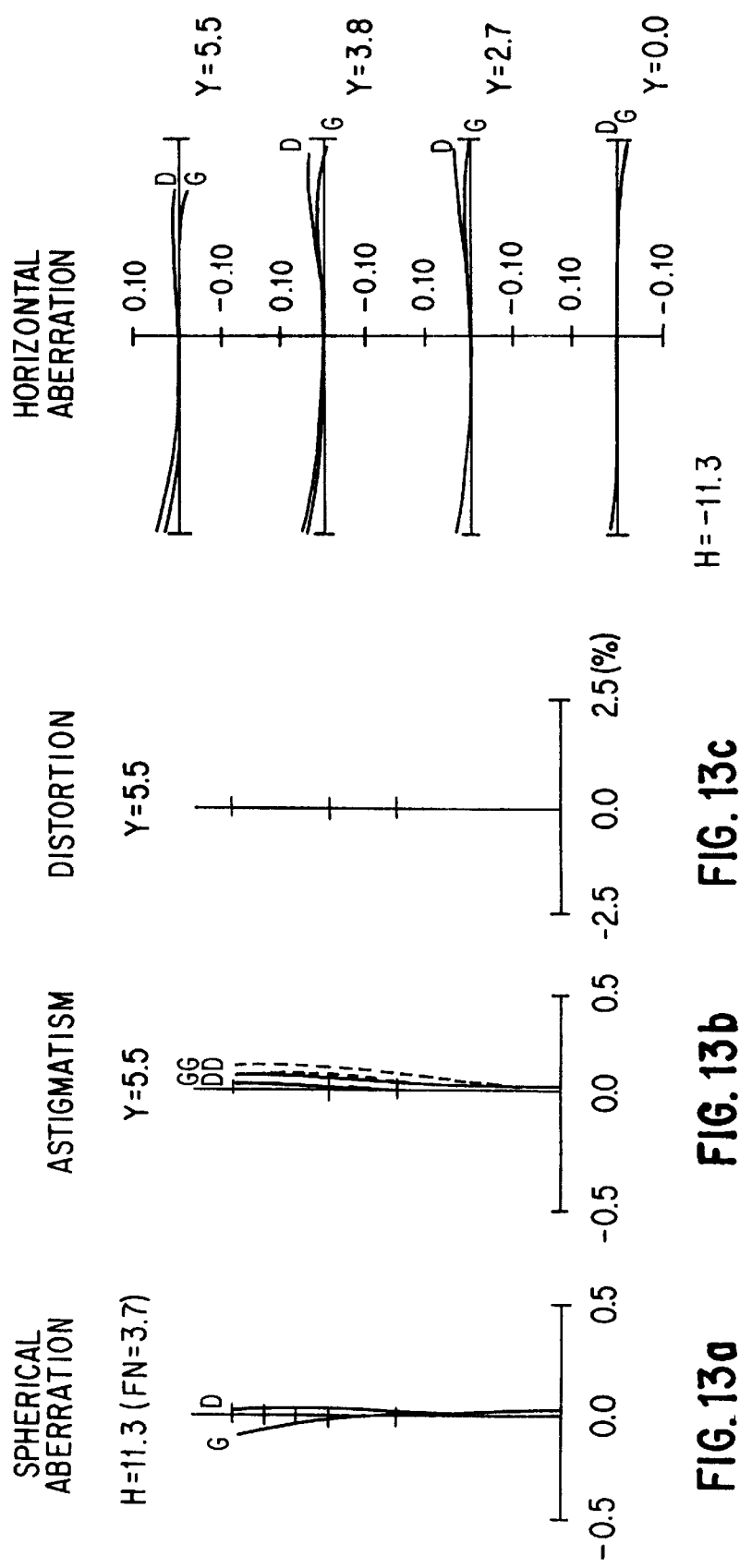

FIG. 15a SPHERICAL ABERRATION
FIG. 15b ASTIGMATISM
FIG. 15c DISTORTION
FIG. 15d HORIZONTAL ABERRATION

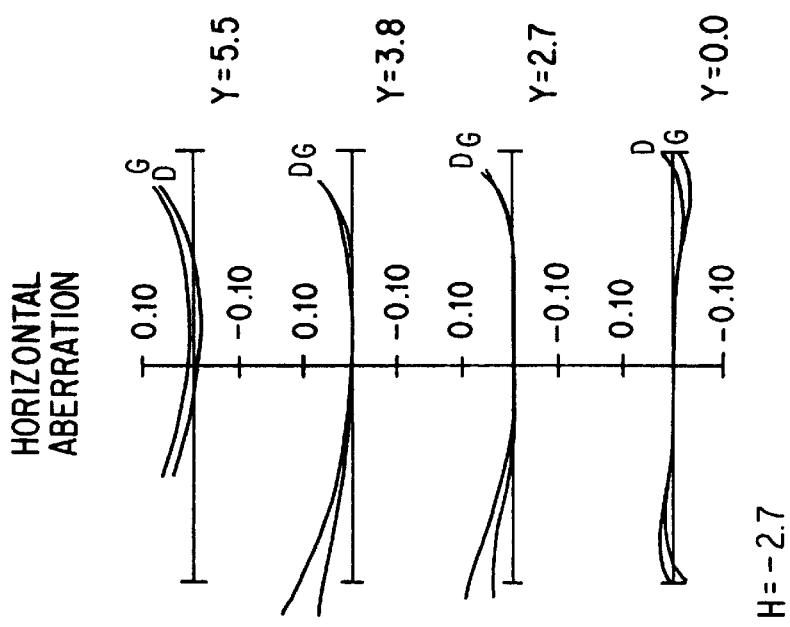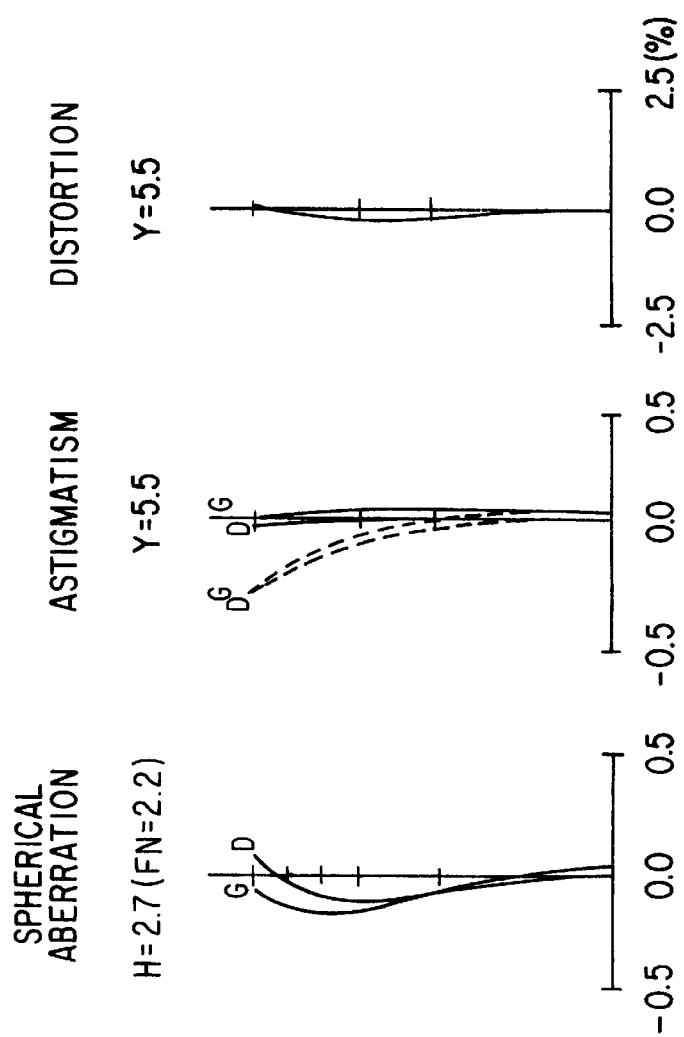
FIG.18d
FIG.18c
FIG.18b
FIG.18a

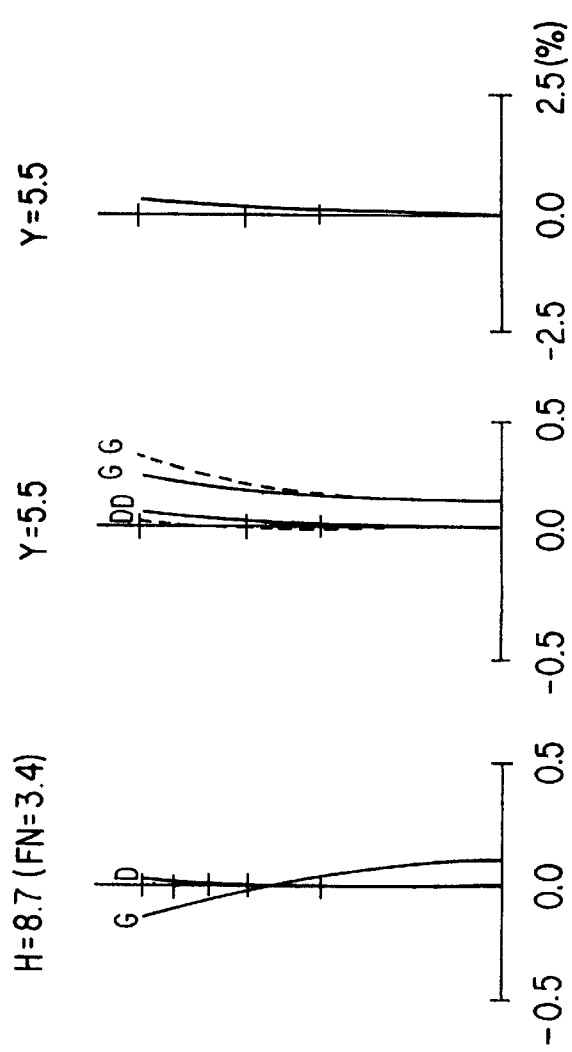

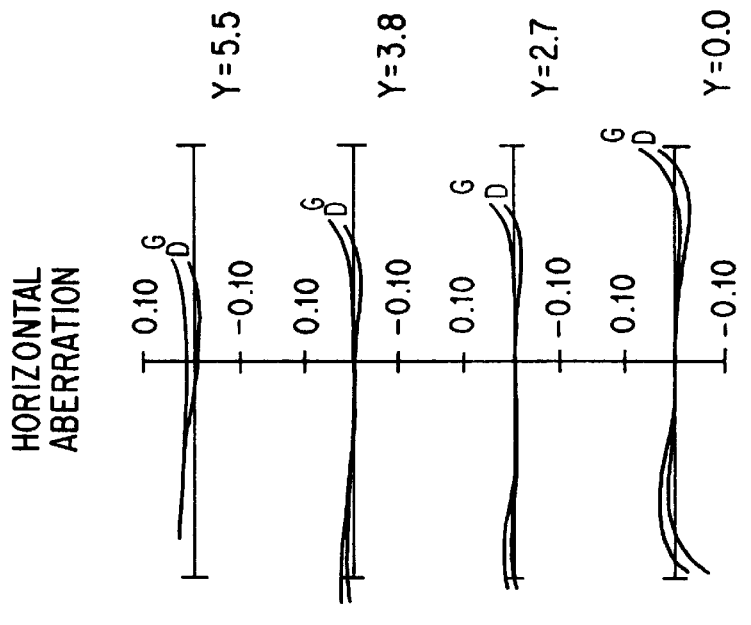
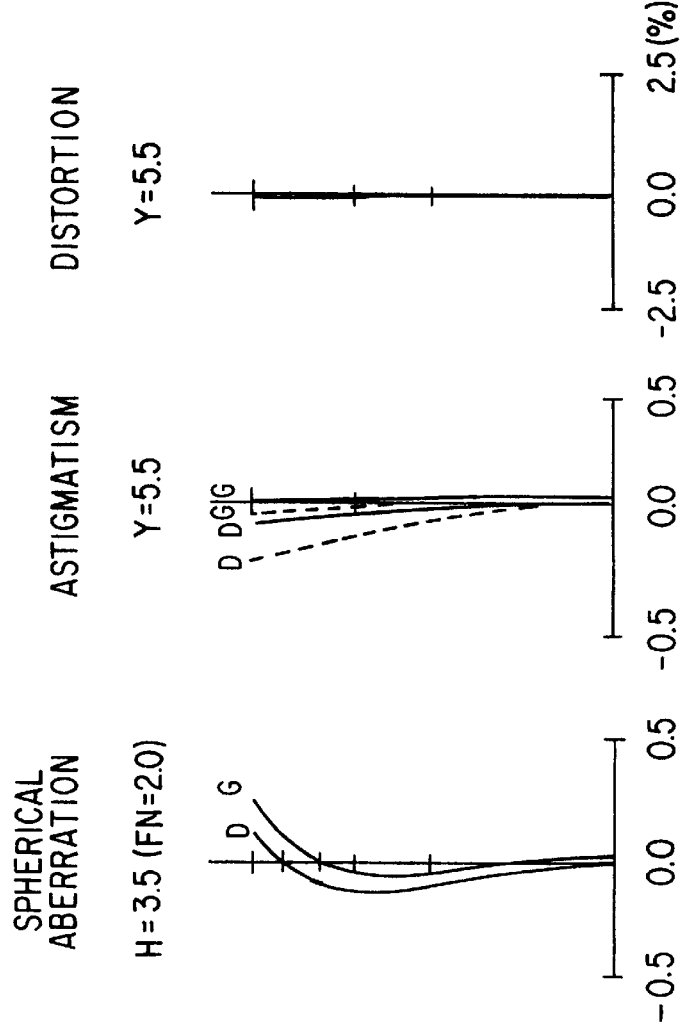
FIG. 21a  FIG. 21b  FIG. 21c  FIG. 21d

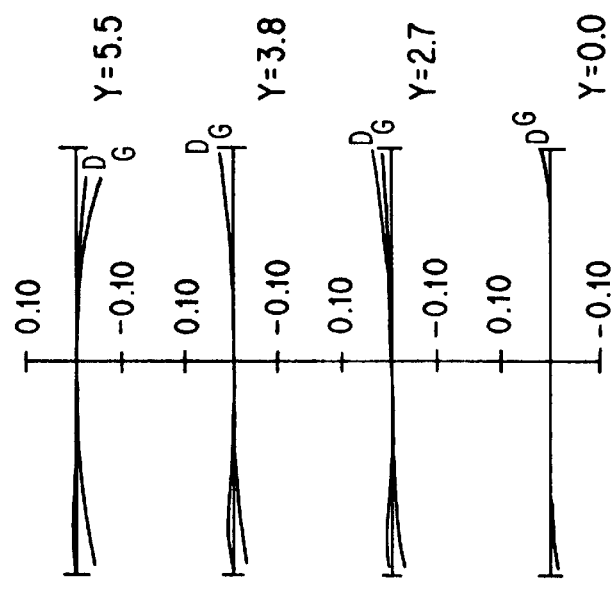
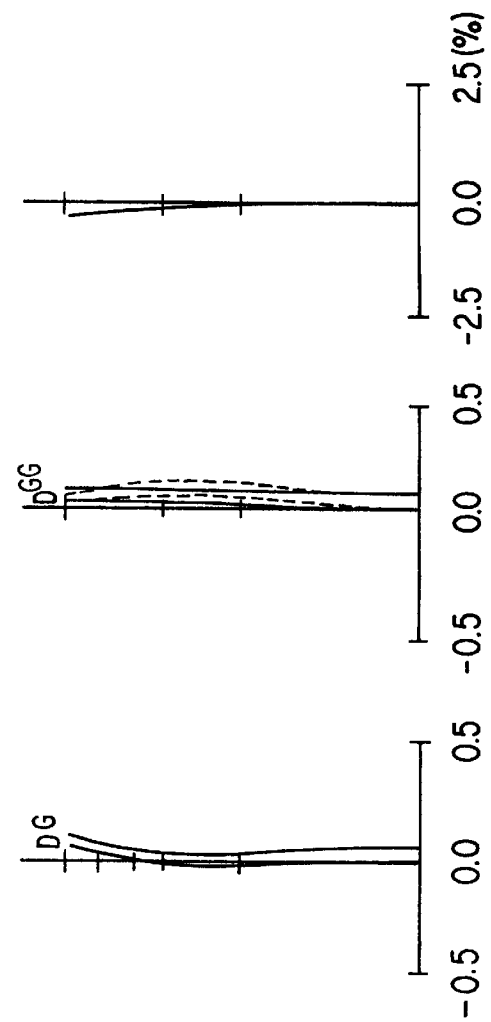
FIG. 22a  FIG. 22b  FIG. 22c  FIG. 22d

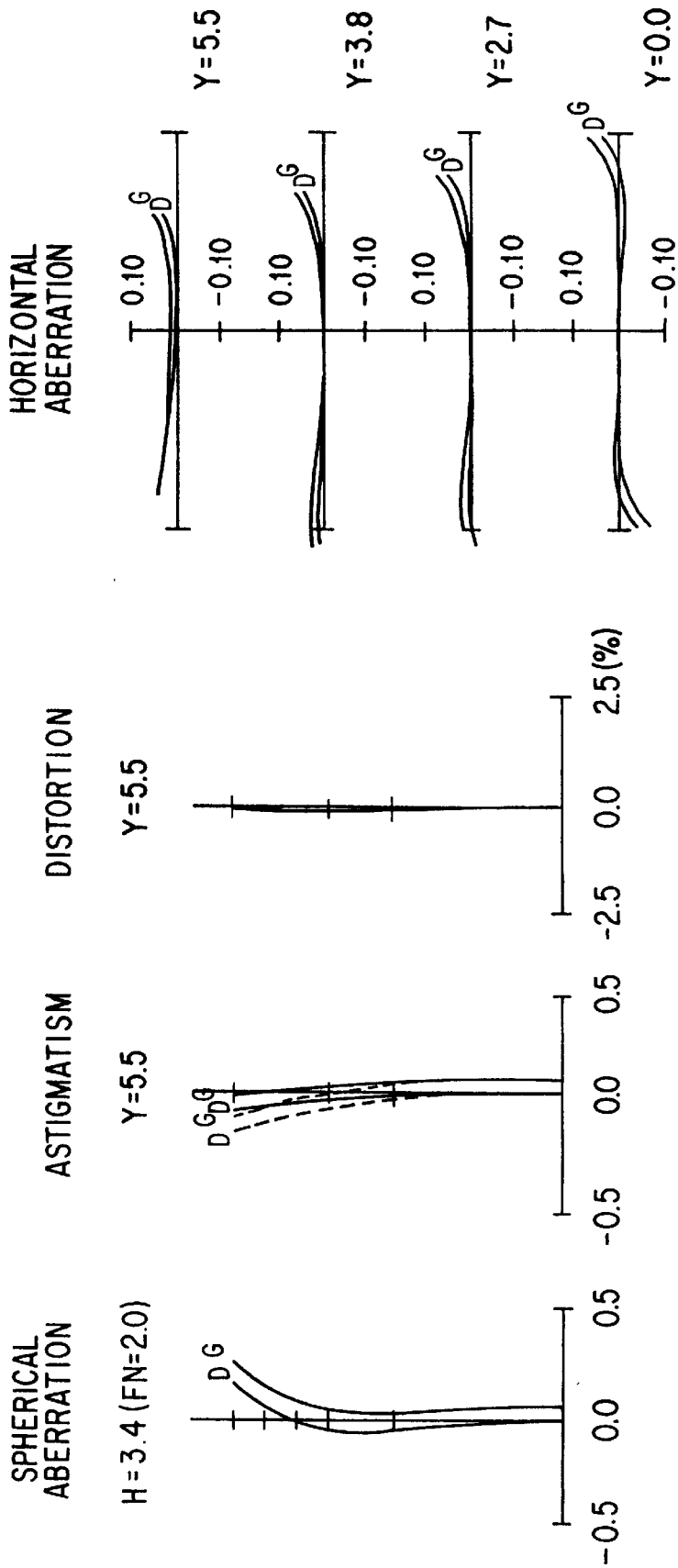

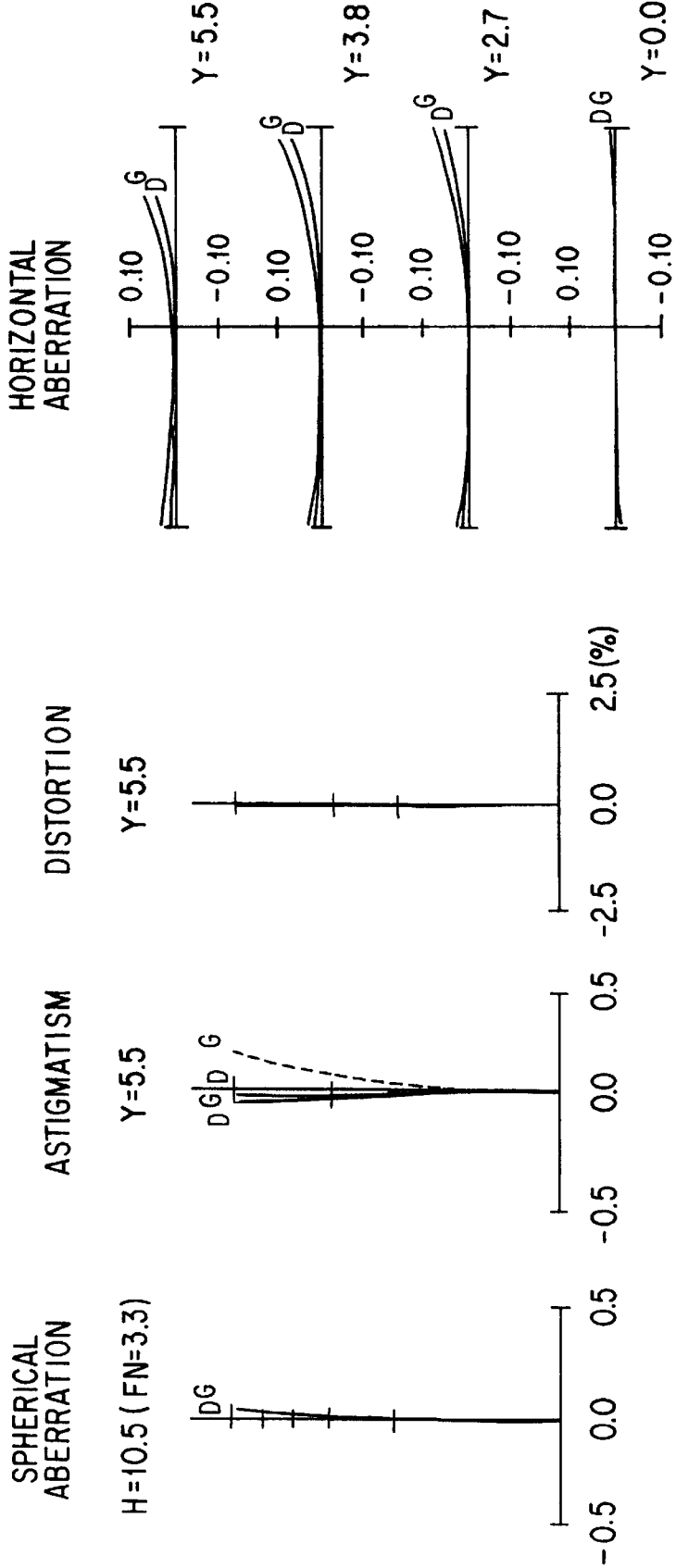

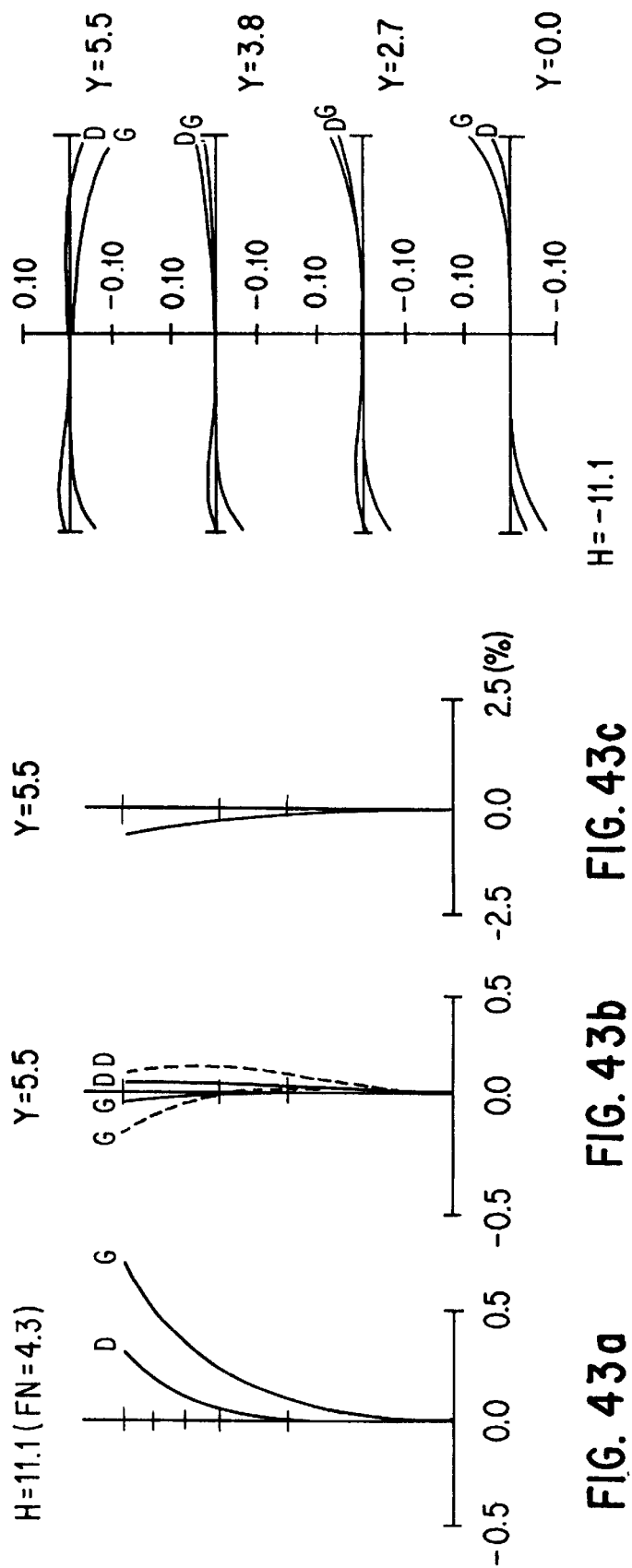

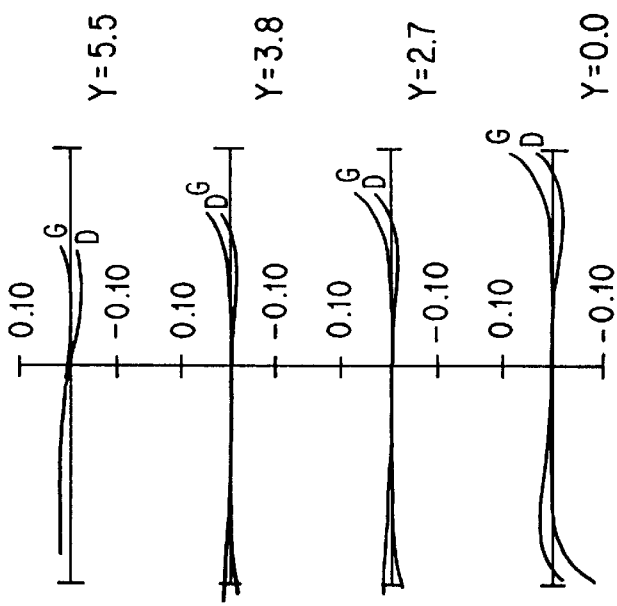
FIG. 45d
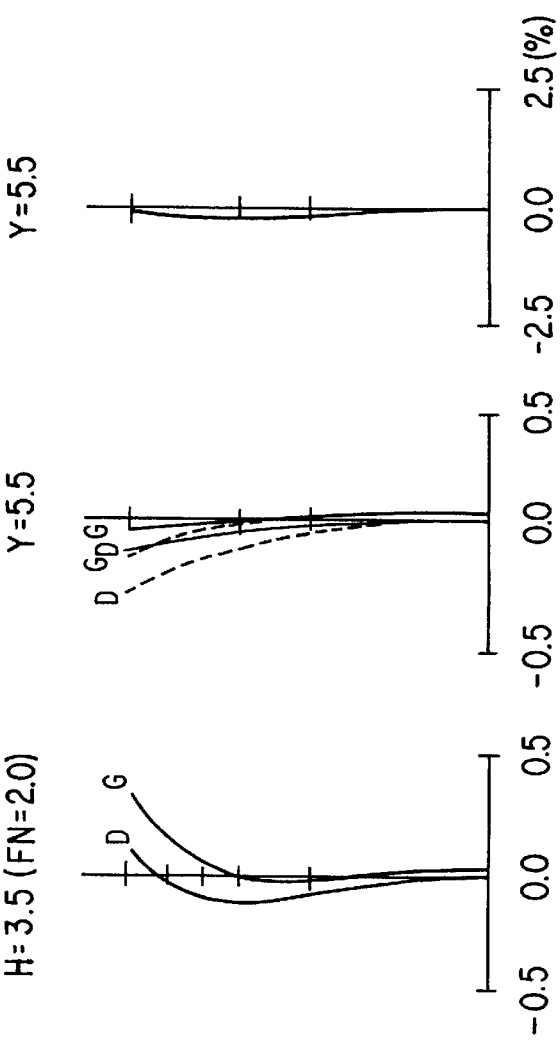
FIG. 45c
FIG. 45b
FIG. 45a

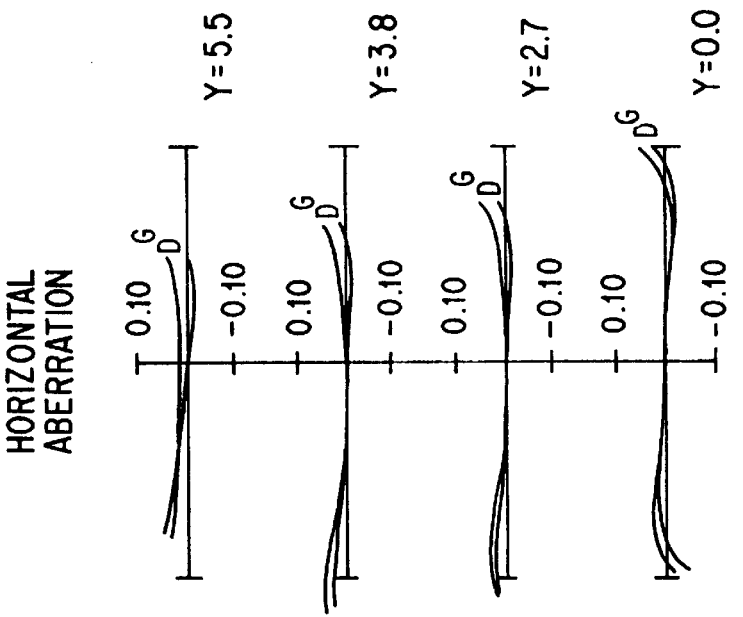
FIG. 51d
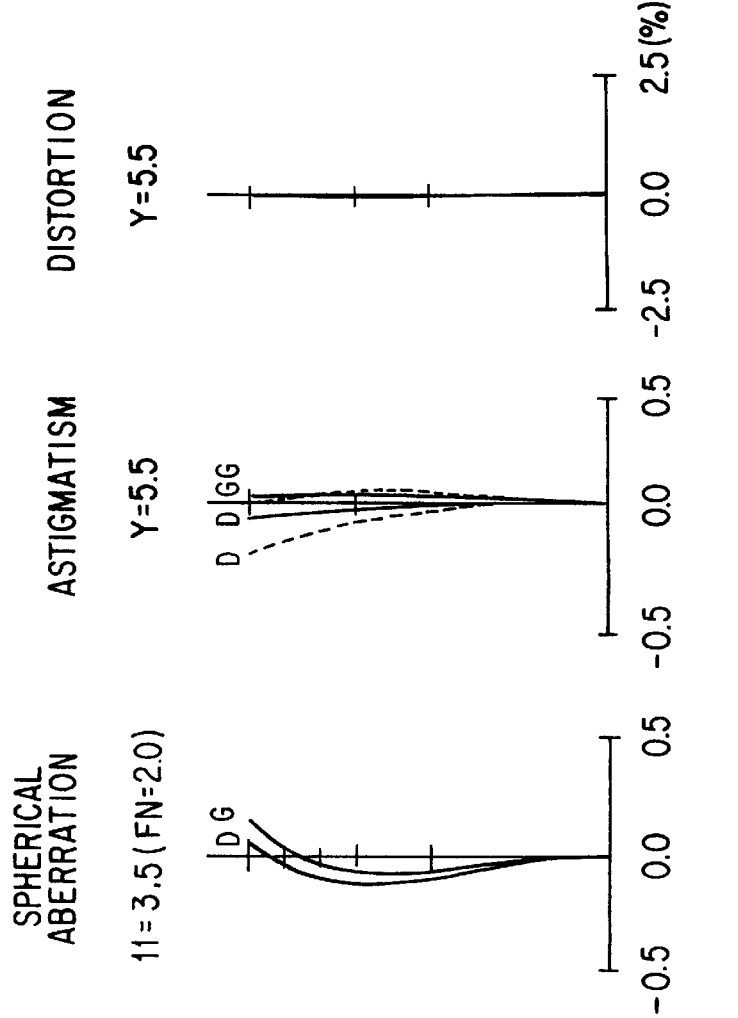
FIG. 51c
FIG. 51b
FIG. 51a

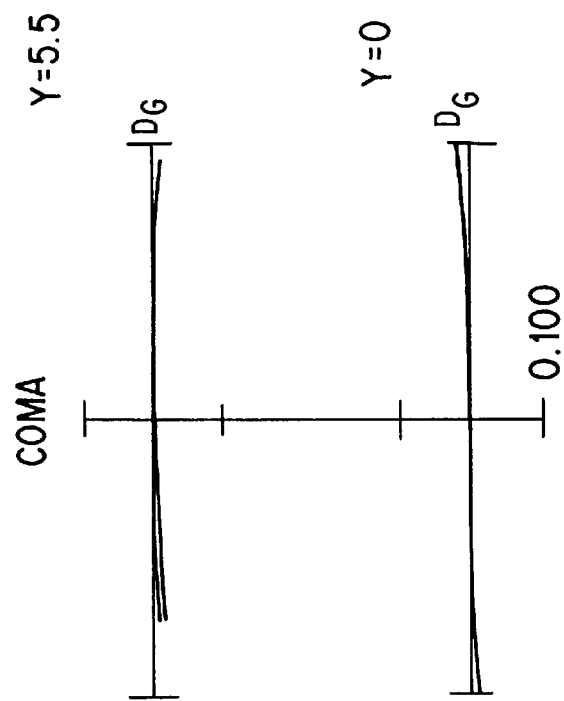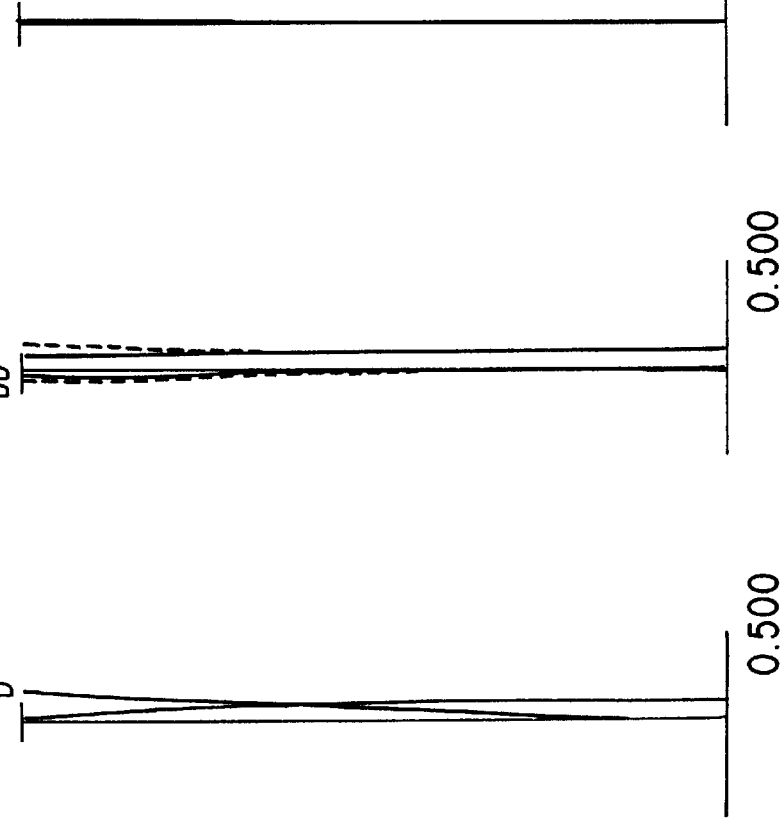

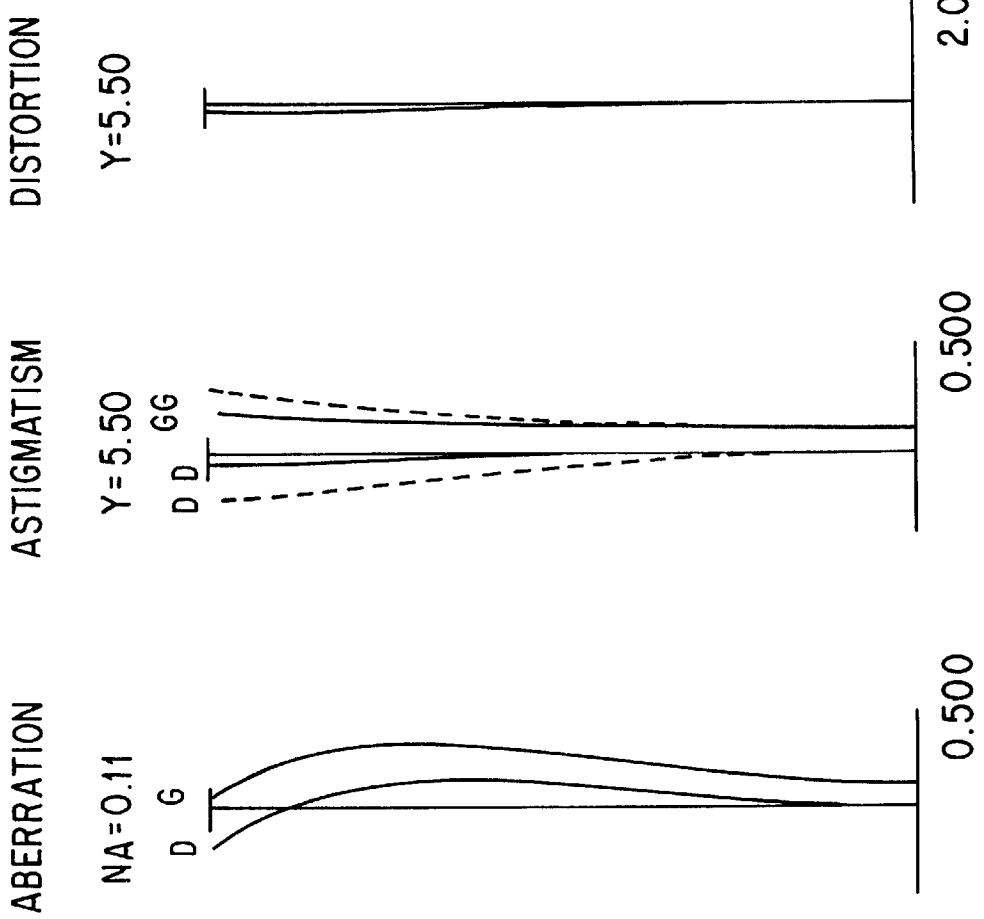

ZOOM LENS

BACKGROUND OF THE INVENTION

1. Field of the Invention

The invention relates to a zoom lens structure. In particular, the zoom lens has a structure to permit a high zoom capability.

2. Description of Related Art

A finite optical system is used widely in various electronic image devices, which require focusing and shooting by an optical system. In particular, a finite optical system is used for a lens system in digital still cameras, close-up shooting optical systems, enlargement development optical systems, reduction development optical systems, projection lenses for video projectors using liquid-crystal display and the like.

Among known finite optical systems, a finite single focus lens has limited use. Accordingly, a special optical system is required for each purpose. On the other hand, a finite zoom lens has a wider range of uses compared to a single focus lens. However, a finite zoom lens lacks a variety of lenses. A finite zoom lens is used widely in lens systems for 35 mm still cameras, lens systems for 16 mm cinema scope cameras, and lens systems for televisions. A shooting zoom lens with low magnification, around 1/50×~1/30×, with wide field angle, is advantageous for a compact and high image quality image input optical system in electronic image equipment.

A low magnification and wide field angle zoom lens is disclosed in Japanese Laid-Open Patent Publication No. 3-71686 (JP 686). However, a zoom method of the zoom lens in JP 686 encounters problems in shifting to a high magnification, and a zoom locus for each lens group is complicated. Moreover, with the zoom lens of JP 686, an optical system for a measurement projection equipment requires strong telecentricity. Additionally, an effective F-number is relatively large at around F/3.5–F/6.5. Therefore, the zoom lens is not sufficient to shoot an object with a dark and/or black design, depending on illumination conditions. Thus, a bright, wide angle high zooming capability and performance optical system has been long desired.

For an optical system in electronic image equipment, the system must cope with numerous uses. Therefore, a special optical system is needed to correspond to each purpose. In other words, in a conventional zoom lens, a special optical system is required for each purpose, making this optical system very inefficient and uneconomical.

With an optical system for use in photo-imaging systems with high resolution, a zoom lens should favorably correct chromatic aberrations of magnification. Further, the zoom lens should be bright, have high performance, be capable of shifting to high zooming, have a short conjugal length, be capable of presenting wide field angle, and have small distortion and fluctuation during zooming. Additionally, the zoom lens should be capable of securing sufficient amount of light in a marginal zone, to minimize shading.

Considering the problems described above, embodiments of the present invention aim to provide a high performance, high zooming ratio zoom lens capable of coping with a wide variety of utilization purposes.

SUMMARY OF THE INVENTION

The description of the embodiments of the invention herein uses characters G1, G2, G3, G4 and G5 to generally represent the lens groups, also known as lens units, meaning an optical unit that functions as a group. The term "lens group" is intended to include a plurality of lens elements or a single lens element. Further, the term "lens element" can also include known optical components, such as a prism. This is for ease and simplification of explanation purposes. The use of G1, G2, G3, G4 and G5 is in no way meant to limit the invention.

In order to overcome the shortcomings in the prior art, embodiments of the invention comprise, in the following order from the object side, a first lens group G1 having a positive refractive power, a second lens group G2 having a negative refractive power, a third lens group G3 having a positive refractive power, a fourth lens group G4 having a negative refractive power, and a fifth lens group G5 having a positive refractive power. The magnification of the second lens group G2, the magnification of the third lens group G3 and the magnification of the fourth lens group G4 simultaneously are equal (i.e., each provide an equal magnification (−1×) at the same time at some point during their movement in the zoom region).

In each embodiment, it is possible to focus by advancing the first lens group G1 towards the object side to change shooting distance and region of zooming magnification. The second lens group G2 is designated as a compensator group, the third lens group G3 is designated as a main lead group and the fourth lens group G4 is designated as a sub-lead group. In other words, the second lens group G2 through the fourth lens group G4 constitute a zoom unit that executes zooming by moving along the optical axis. The fifth lens group G5 is fixed relative to the image plane and is also a major lens group that determines the length of back focus and the position of the exit pupil.

Other objects, advantages and salient features of the invention will become apparent from the following detailed description, which, taken in conjunction with the annexed drawing, discloses preferred embodiments of the invention.

BRIEF DESCRIPTION OF THE DRAWINGS

The invention will be described in detail with reference to the following drawings in which like reference numerals refer to like elements, wherein:

FIGS. 6a–6d are various aberration graphs at a maximum wide-angle state for the second preferred embodiment;

FIGS. 7a–7d are various aberration graphs at a maximum telephoto ,state for the second preferred embodiment;

FIGS. 9a–9d are various aberration graphs at a maximum wide-angle state for the third preferred embodiment;

FIGS. 10a–10d are various aberration graphs at a maximum telephoto state for the third preferred embodiment;

FIGS. 12a–12d are various aberration graphs at a maximum wide-angle state for the fourth preferred embodiment;

FIGS. 13a–13d are various aberration graphs at a maximum telephoto state for the fourth preferred embodiment;

FIGS. 18a–18d are various aberration graphs at a maximum wide-angle state for the sixth preferred embodiment;

FIGS. 19a–19d are various aberration graphs at a maximum telephoto state for the sixth preferred embodiment;

FIGS. 21a–21d are various aberration graphs at a maximum wide-angle state for the seventh preferred embodiment;

FIGS. 22a–22d are various aberration graphs at a maximum telephoto state for the seventh preferred embodiment;

FIGS. 27a–27d are various aberration graphs at a maximum wide-angle state for the ninth preferred embodiment;

FIGS. 40a–40d are various aberrations graphs at a maximum telephoto state for the thirteenth preferred embodiment;

FIGS. 43a–43d are various aberration graphs at a telephoto state for the fourteenth preferred embodiment;

FIGS. 45a–45d are various aberration graphs at a maximum wide-angle state for the fifteenth preferred embodiment;

FIGS. 51a–51d are various aberration graphs at a maximum wide-angle state for the seventeenth preferred embodiment;

FIGS. 55a–55d are various aberration graphs at a maximum telephoto state for the eighteenth preferred embodiment;

FIGS. 58a–58d are various aberration graphs at a maximum telephoto state for the nineteenth preferred embodiment.

DETAILED DESCRIPTION OF PREFERRED EMBODIMENTS

Figure 1:
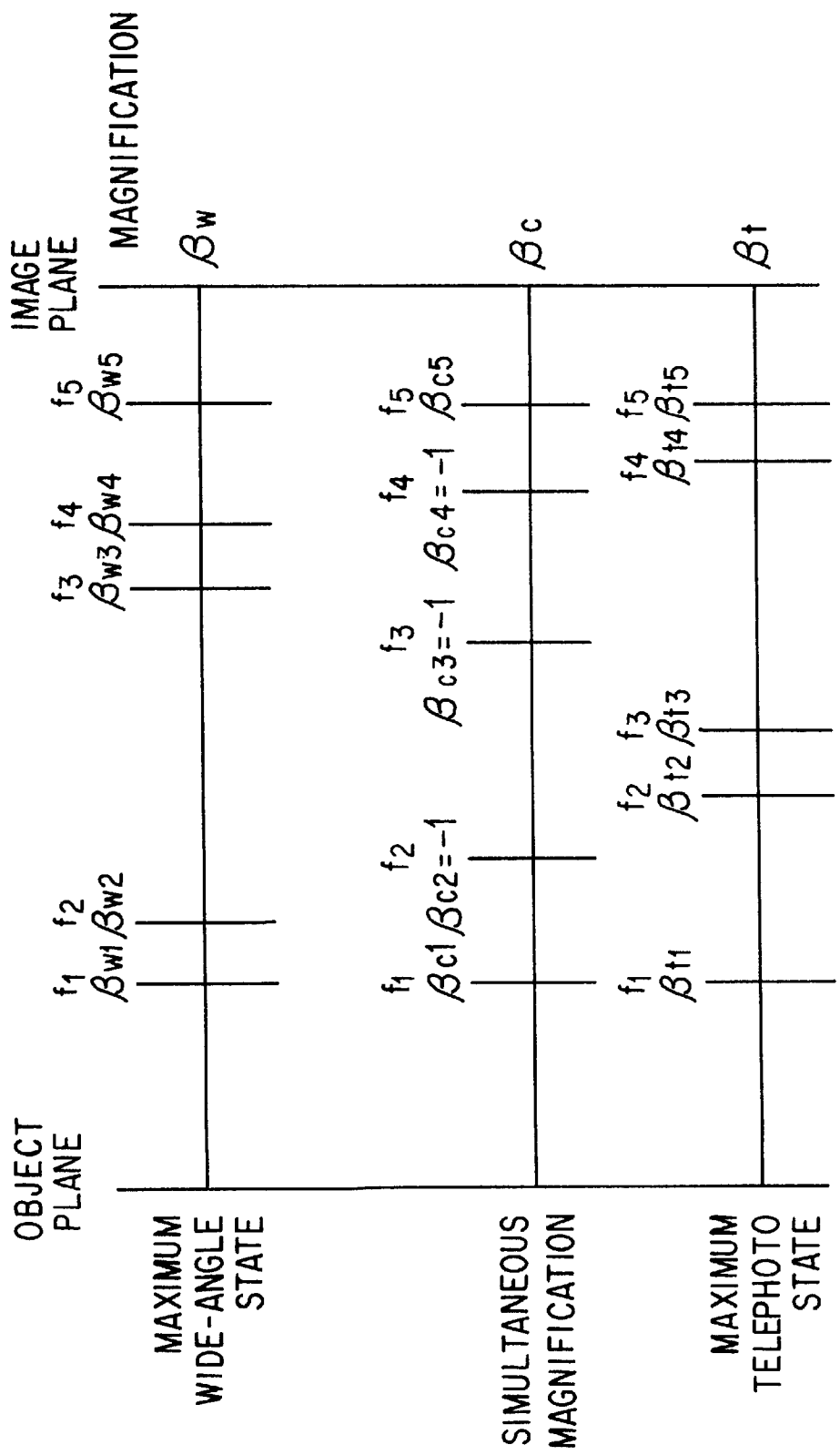
FIG. 1 is a schematic illustration of a basic structure of a zoom lens and the movement locus of each lens group during zooming according to the invention.

In order to resolve the problems described above, an object of the invention is to provide a high zoom capability zoom lens. The zoom lens comprises, in the following order from the object side, a first lens group G1 having a positive refractive power, a second lens group G2 having a negative refractive power, a third lens group G3 having a positive refractive power, a fourth lens group G4 having a negative refractive power, and a fifth lens group G5 having a positive refractive power. A zoom unit (groups G2, G3 and G4) is included in the zoom lens and has an arrangement such that at some point in the zoom region a magnification of the second lens group G2, a magnification of the third lens group G3 and a magnification of the fourth lens group G4 are substantially equal almost simultaneously. (That is, at some point, all three lens groups G2, G3 and G4 provide substantially equal magnifications at the same time.) Further, the zoom lens should satisfy conditions (1) and (2):

$$-0.9 < (1/f1 + 1/f2)fw < 0 \quad (1)$$

$$-0.5 < (1/f4 + 1/f5)fw < 0.2 \quad (2)$$

where, f1 is a focal length of the first lens group G1, f2 is a focal length of the second lens group G2, f4 is a focal length of the fourth lens group G4, f5 is a focal length of the fifth lens group G5 and fw is a focal length of the total zoom lens system at a maximum wide-angle state.

A further object of the invention is to provide a zoom lens, as described above, that satisfies the condition (3):

$$0.3 < \Phi/f3 < 0.8 \quad (3)$$

where, $\Phi$ is a maximum effective diameter of an object side surface of the third lens group G3 at the maximum wide-angle state.

The zoom lens comprises a zoom arrangement, wherein the magnification of the second lens group G2, of the third lens group G3 and of the fourth lens group G4 simultaneously have an almost equal magnification, for example $-1\times$.

According to yet another object of the invention, a zoom lens can be comprised of a zooming unit that has more than one lens group. In general, the magnification of each lens group satisfies the conditions (a) and (b) for specific zoom arrangements that are at lower magnifications than the zoom arrangement at which the lens group simultaneously achieve equal magnifications.

$$|\beta i| < 1 \quad (a)$$

$$|\ldots \beta i{-}1 \, \beta i \, \beta i{+}1 \ldots| < 1 \quad (b)$$

where, $\beta i$ is a horizontal magnification of the ith lens group in order from the object side.

Additionally, the magnification of each lens group satisfies conditions (c) and (d) for specific zoom arrangements that are at higher magnifications than the zoom at which the lens groups simultaneously achieve equal magnifications.

$$|\beta i| > 1 \quad (c)$$

$$|\ldots \beta i{-}1 \, \beta i \, \beta i{+}1 \ldots| > 1 \quad (d)$$

In other words, at some point during zooming, the lens groups are in an arrangement at which all lens groups (in the zoom unit) provide substantially equal magnifications. This is referred to as the equal magnification arrangement. When the lens groups are in arrangements that provide a lower magnification than the equal magnification arrangement, conditions (a) and (b) are satisfied. When the lens groups are in arrangement that provide a higher magnification than the equal magnification arrangement, conditions (c) and (d) are satisfied.

Considering the above, it is preferable to provide a zoom lens that has an equal magnification arrangement.

Moreover, if a zoom unit comprises two lens groups, some of the solutions of the zoom equations result in a condition where a compensator group attains equal magnification, $\beta j = -1$, whenever a variator group attains equal magnification $\beta i = -1$. Therefore, two motion curves or solution curves of the zoom locus spread with an equal magnification, $\beta j = -1$, arrangement and mutual switching of loci is possible.

By actively utilizing switching of loci and adopting a zoom arrangement where magnifications of other lens groups simultaneously have an equal magnification, each lens group of the zoom unit will have an equal magnification arrangement permitting the existence of stable zoom equation solutions for an entire zoom region. This also permits a capability for shifting to a high zooming power. As a result, a zoom power arrangement that has a very effective zoom efficiency can be selected and an optical system with large zoom ratio can be achieved. Moreover, attainable zoom loci and zoom equation solutions are achieved.

However, if an equal magnification arrangement is not attained, it is difficult to examine solutions of zoom equations for a zoom system that comprises a plurality of zoom lens groups. Moreover, a continuous shift to a high magnification becomes difficult since solution curves for zoom loci are not continuous.

To minimize distortion, a lens with a high degree of symmetry for the lens shape and aperture diaphragm is desired. However, each lens group moves along the optical axis during zooming. Therefore, it is not possible to maintain symmetry for the aperture diaphragm over the entire zoom region. Thus, to obtain an optical system where distortion and fluctuation are small, even during zooming, a structure where refractive power distribution of each lens group has a certain amount of symmetry with respect to the aperture diaphragm should be provided.

It is desirable to divide a zoom lens into three sections to analyze conditions of distortion. A lens group containing the aperture diaphragm is a middle group. The lens group closer to the object side from the middle group is a front group and the lens group closer to an image side is the rear group. A refractive power and lens arrangement are necessary to correct a substantial degree of distortion inside of the front and rear groups. Further, the role of each lens group should be clearly established so a distortion component, which is not offset by the front and rear group, is corrected by the middle group. Through use of a lens structure as described above, distortion fluctuation may be minimized, even with a lens group that moves during zooming.

To minimize distortion, a lens structure and refractive power distribution with an internal refractive power distribution in the front group should be, in the following order from the object side, positive (1/f1) and negative (1/f2). An internal refractive power distribution in the rear group should be, in the following order from the object side, negative (1/f4) and positive (1/f5). Thus, aberrations may be cancelled. This feature is clear when contributions of each lens group are studied for a three-dimensional aberration.

Moreover, to achieve a lens structure suitable for distortion correction, an internal refractive power distribution for the front group should be, in the following order from the object side, negative (1/f1) and positive (1/f2). An internal refractive power distribution in the rear group should be, in the following order from the object side, positive (1/f4) and negative (1/f5).

Condition (1) defines a refractive power distribution at a maximum wide-angle state for each lens group of the front group. If $(1/f1+1/f2)$fw is larger than the upper limit, the refractive power of the front group is too weak to achieve a wide angle. Moreover, the symmetric balance of the refractive power of the total system will collapse, causing the distortion correction become undesirably large for the lens shape.

On the other hand, if the value of $(1/f1+1/f2)$fw is smaller than the lower limit, the refractive power of the front group is too negative, and symmetry of the refractive power further collapses. This causes distortion correction to become undesirably large.

Condition (2) defines a refractive power distribution at a maximum wide-angle state for each lens group of the rear group. If $(1/f4+1/f5)$fw is larger than the upper limit, the refractive power of the rear group is too weak, and the refractive power is too positive. As a result, a symmetric balance of the total system collapses, and the distortion correction becomes undesirably large.

On the other hand, if $(1/f4+1/f5)$fw is smaller than the lower limit, the refractive power of the rear group becomes too negative and symmetry of the refractive power further collapses. This causes distortion correction to become undesirably large.

Moreover, if the zoom unit comprises more than one lens group to obtain the desired zoom ratio, zooming is possible by making a movement amount of the lens groups small. As a result, an incident height of a main light ray at a maximum wide-angle state may be small. This is effective to make a diameter of an object side lens small.

As described hereinafter, each example of the zoom unit comprises three lens groups. However, a high power zoom lens may be easily obtained, even if a fourth or fifth lens group or others are added to the zoom unit, as long as a symmetry with respect to the aperture diaphragm is maintained.

In moving a pupil position as close as possible to a surface edge of the lens, the refractive power arrangement is such that the lens group, which has a negative refractive power, moves first to the surface side of the lens edge. On the other hand, in moving a pupil position as far as possible away from the surface edge of the lens, the refractive power arrangement is such that a lens group with a positive refractive power moves first. If such a refractive power distribution is utilized, an optical system that is telecentric at an image side, an optical system that is telecentric at an object side or an optical system that is almost telecentric, may be attained.

However, the optical system of the invention need not necessarily be telecentric. The position of the aperture diaphragm may be at any position between the second lens group G2 and the third lens group G3, or between the third lens group G3 and the fourth lens group G4. The aperture diaphragm may be moved during zooming, or it may be fixed during zooming.

To obtain a compact structure and a large aperture ratio, condition (3) may be satisfied.

$$0.3 < \Phi/f3 < 0.8 \qquad (3)$$

where $\Phi$ is a maximum effective diameter of the object side surface of the third lens group G3 at a maximum wide-angle state and f3 is a focal length of the third lens group G3.

Condition (3) defines an appropriate range for a ratio of the maximum effective diameter of the object side surface for the third lens group G3 at a maximum wide-angle state and the focal length of the third lens group G3. If $\Phi/f3$ is larger than the upper limit of condition (3), the optical system is unnecessarily bright. This causes the optical system to become large, and the number of lenses to undesirably increase. Additionally, the refractive power of the third lens group G3 is too strong to correct various aberrations, including spherical aberrations.

On the other hand, if $\Phi/f3$ is smaller than the lower limit of condition (3), the refractive power of the third lens group G3 is too weak, and a movement amount of the lens group during zooming is too large. Thus, interference occurs between adjacent lens groups causing difficulty in securing a sufficient zoom ratio. Additionally, the optical system becomes dark, causing artificial illumination to be needed to shoot dark objects. However, this is not a problem if artificial illumination is normally required.

If the brightness of the optical system is considered, the system may be as dark as the resolution capability by refraction allows. In such case, the lower and upper limits of the condition (3) may be changed to 0 and 0.35 respectively. In a dark optical system, reduction of the number of lenses in the second lens group G2 and the third lens group G3 may be easily obtained.

FIG. 1 illustrates a basic structure of the zoom lens and a locus of motion for each lens group in zooming for embodiments of the invention. In FIG. 1, fi is the focal length of the ith lens group, $\beta w$ is the combined shooting magnification of the total zoom lens system at the maximum wide-angle state, $\beta t$ is the combined shooting magnification of the total zoom lens system at the maximum telephoto state, and $\beta c$ is the combined shooting magnification of the total zoom lens system at the equal magnification arrangement state. In particular, $\beta wi$ is the magnification of the ith lens group at the maximum wide-angle state, $\beta ti$ is the magnification of the ith lens group at the maximum telephoto state, and $\beta ci$ is the magnification of the ith lens group at the equal magnification arrangement state.

In the zoom lens, the following conditions (e)–(m) are satisfied;

$$\beta = \beta 1 \beta 2 \beta 3 \beta 4 \beta 5 \qquad (e)$$

$$\beta z = \beta 2 \beta 3 \beta 4 \qquad (f)$$

$$\beta w = \beta w1 \beta w2 \beta w3 \beta w4 \beta w5 \qquad (g)$$

$$\beta c = -\beta c1 \beta c5 \qquad (h)$$

$$\beta t = \beta t1 \beta t2 \beta t3 \beta t4 \beta t5 \qquad (i)$$

$$|\beta w2 \beta w3 \beta w4| < 1 \qquad (j)$$

$$|\beta c2 \beta c3 \beta c4| = 1 \qquad (k)$$

$$|\beta t2 \beta t3 \beta t4| > 1 \qquad (m)$$

where $\beta$ is a shooting magnification of the total zoom lens system at an arbitrary zoom arrangement and $\beta z$ is magnification of the zoom unit at an arbitrary zoom arrangement.

The magnification of each lens group may remain within a range defined by conditions (4)–(6), while maintaining an equal magnification arrangement.

$$-1.4 < \beta 2 < -0.4 \qquad (4)$$

$$-1.5 < \beta 3 < -0.5 \qquad (5)$$

$$-1.5 < \beta 4 < -0.6 \qquad (6)$$

If $\beta 2$ is larger than the upper limit of condition (4), an incident height of a main light ray, which is in the vicinity closest to the field passing through a surface closest to the object side of the first lens surface, drastically deviates from the optical axis. Thus, the lens diameter becomes too large, and the first lens group G1 and second lens group G2 interfere with each other. Moreover, it is difficult to correct an outer coma of a lower ray of a main light ray. On the other hand, if β2 is smaller than the lower limit of condition (4), the second lens group G2 and third lens group G3 also interfere with each other.

If β3 is larger than the upper limit of condition (5), the incident height of a main light ray, which is in the vicinity closest to the field passing through a surface closest to the object side, drastically deviates from the optical axis. As a result, the lens diameter is too large, and the second lens group G2 and the third lens group G3 interfere with each other.

If β3 is smaller than the lower limit of condition (5), correction of spherical aberrations at a maximum telephoto state becomes difficult, and the third lens group G3 and fourth lens group G4 interfere with each other.

If β4 is larger than the upper limit of condition (6), the incident height of the main light ray, which is in the vicinity closest to the field passing through a surface closest to the object side, drastically deviates from the optical axis. As a result, the diameter of the lens becomes too large, and the third lens group G3 and fourth lens group G4 interfere with each other.

If β4 is smaller than the lower limit of condition (6), correction of outer coma of the upper ray of the main light ray becomes difficult. Further, the fourth lens group G4 and fifth lens group G5 interfere with each other.

However, in an equal magnification arrangement (i.e., the lens arrangement where the second lens group G2, the third lens group G3 simultaneously attain equal magnification), a lens arrangement where equal magnification is achieved substantially simultaneously, as well as a lens arrangement with a strict mathematical relationship, is desirable. In other words, a magnification error range, which may cause defocus, such as rounding error, manufacturing error and the like, may require an adjustment to be made.

As described above, a zoom arrangement that results in substantially simultaneous equal magnification within a range of tolerance, is referred to as an equal magnification arrangement. Even when a region is created in which a zoom solution does not exist, errors are practically harmless provided that the zoom region that exceeds a focus jump in the image plane is small.

The following criteria for a desirable region of tolerance are established for the optical system. An arrangement should have a simultaneous equal magnification arrangement, with a combined magnification $\beta c_i$ of another lens group in the zoom unit satisfying condition (7), when at least one of the magnifications $\beta c_2$, $\beta c_3$ and $\beta c_4$ of the lens group G2 through the fourth lens group G4 has equal magnification $-1\times$.

$$0.9 < |\beta c_i| < 1.1 \quad (7)$$

If $|\beta c_i|$ is larger than the upper limit of condition (7), a region where a zoom solution does not exist expands from a maximum telephoto state. Further, a region where focus is fixed for zooming shrinks. On the other hand, if $|c_i$ is smaller than the lower limit of condition (7), a region where a zoom solution does not exist expands from a maximum wide-angle state. The region where focus is fixed for zooming shrinks. When such a region where a zoom solution does not exist expands, a region for which continuous zooming is not achieved also expands. This causes practicability of the optical system to decrease.

Moreover, the condition (8) should be satisfied:

$$0.7 < f2/f4 < 1.3 \quad (8).$$

Condition (8) defines an appropriate range for a ratio of the focal length of the second lens group G2 and the focal length of the fourth lens group G4.

If f2/f4 is larger than the upper limit of condition (8), the amount of movement of the second lens group G2 increases and interferes with other lens groups. This causes a magnification efficiency to decrease, which is undesirable for obtaining high power zoom lens. Moreover, the refractive power of the fourth lens group G4 becomes too strong. The load on the fifth lens group G5 increases, thus causing difficulty in correcting coma for an upper ray in the main light ray.

On the other hand, when f2/f4 is smaller than the lower limit of condition (8), the refractive power of the second lens group G2 becomes strong and the maximum telephoto state can be expanded, making higher zooming possible. However, an incident height of a main light ray in the vicinity closest to the field passing through a surface closest to the object side drastically separates from the optical axis at a maximum wide-angle state. This causes the lens diameter to become undesirably large. Moreover, correction of various aberrations, such as spherical aberration and coma, becomes difficult.

Furthermore, condition (9) should be satisfied.

$$0.05 < \beta1/\beta5 < 0.5 \quad (9).$$

Condition (9) defines an appropriate range of the ratio for the magnification β1 of the first lens group G1 and magnification β5 of the fifth lens group G5. If β1/β5 is larger than the upper limit of condition (9), a back focus becomes small. This causes a working distance to the object point to become short. Accordingly, the system becomes a finite system, and a desired magnification cannot be secured.

On the other hand, if β1/β5 is smaller than the lower limit of condition (9), the working distance to the object point becomes unnecessarily long. The back focus also becomes long, causing the optical system to become undesirably large.

Moreover, condition (10) is preferably satisfied.

$$-0.9 < fw/f12 < -0.1 \quad (10)$$

where, f12 is a combined focal length of the front groups.

Condition (10) defines a refractive power distribution for the front groups, the first lens group GI and the second lens group G2, at a maximum wide-angle state. If fw/f12 is larger than the upper limit of condition (10), the refractive power of the front group becomes too weak. Therefore, achieving a wide angle becomes difficult, and it is difficult to attain a system with a short length. Moreover, symmetric balance of the refracting power of the system collapses, causing a load on distortion correction to undesirably increase.

On the other hand, if fw/f 12 is smaller than the lower limit of condition (10), the refractive power of the front group becomes too negative. Thus, the symmetry of the refractive power further collapses, causing a load for distortion correction to increase. Correction of various aberrations is difficult, thus, the amount of light in a marginal zone becomes undesirable.

Furthermore, condition (11) should be satisfied.

$$0.1 < fw/f45 < 0.8 \quad (11)$$

where, f45 is a combined focal length of the rear groups.

Condition (11) defines a refractive power distribution for the rear groups, the fourth lens group G4 and the fifth lens group G5, at the maximum wide-angle state. If fw/f45 is larger than the upper limit of condition (11), the refractive power of the rear groups is too strong, causing correction of various aberrations to be difficult and a refractive power of the front groups to become too weak to achieve wide angle. Moreover, a strong refractive power in the rear groups destroys the symmetry of the refractive power for the total system. This causes a load for distortion correction to become too large.

On the other hand, if fw/f45 is smaller than the lower limit of condition (11), the refractive power of the rear groups becomes weak. The refractive power of the front group also becomes weak. As a result, dependence on the middle group to correct aberration increases, making correction of various aberrations difficult.

Moreover, condition (12) may be satisfied.

$$-1.4 < ft/f12 < -0.3 \qquad (12).$$

Condition (12) defines a refractive power distribution of the front groups at a maximum telephoto state. If ft/f12 is larger than the upper limit of condition (12), the refractive power of the front groups becomes too weak to contribute to the refractive power for the total system. This causes refractive power distribution to be ineffective.

On the other hand, if ft/f12 is smaller than the lower limit of condition (12), the refractive power of the front groups becomes too negative, causing difficulties in achieving a maximum telephoto state. Moreover, the symmetry between the refractive power of the front and rear groups drastically collapses, causing a load for the correction of various aberrations, including distortion, to become large.

Furthermore, the zoom lens should satisfy condition (13):

$$0.7 < ft/f45 < 3.0 \qquad (13).$$

Condition (13) defines a refractive power distribution of the rear groups at the maximum telephoto state. If ft/f45 is larger than the upper limit of condition (13), the refractive power becomes too strong, causing zooming towards the maximum telephoto state to become difficult. Moreover, correction of various aberrations, such as on-axis chromatic aberrations, off-axis chromatic aberrations and distortion, becomes difficult in rear groups.

On the other hand, if ft/f45 is smaller than the lower limit of condition (13), the refractive power of the rear groups becomes weak while zooming to the maximum telephoto state becomes possible. However, magnification of each lens group becomes high, causing correction of various aberration to become difficult.

Hereafter, each embodiment of the invention will be described in reference to the attached drawings.

A zoom lens according to the first through seventh preferred embodiments of the invention comprises, in the following order from the object side, a first lens group G1 having a positive refractive power, a second lens group G2 having a negative refractive power, a third lens group G3 having a positive refractive power, a fourth lens group G4 having negative refractive power, and a fifth lens group G5 having a positive refractive power. The magnification of the second lens group G2, the magnification of the third lens group G3 and of the fourth lens group G4 simultaneously attain an equal magnification in the zoom region.

In each of the first through seventh preferred embodiments, it is possible to focus by advancing the first lens group G1 towards the object side, to change shooting distance and region of zooming magnification. The second lens group G2 is designated as a compensator group, the third lens group G3 is designated as a main lead group and the fourth lens group G4 is designated as a sub-lead group. In other words, the second lens group G2 through the fourth lens group G4 constitute a zoom unit, which executes zooming by moving along the optical axis.

The fifth lens group G5 is fixed relative to the image plane and is also a major lens group, which determines the length of back focus and the position of the exit pupil. Moreover, in each of the first through seventh preferred embodiments, an aperture diaphragm is provided proximate the object side of the third lens group G3.

Figure 2:
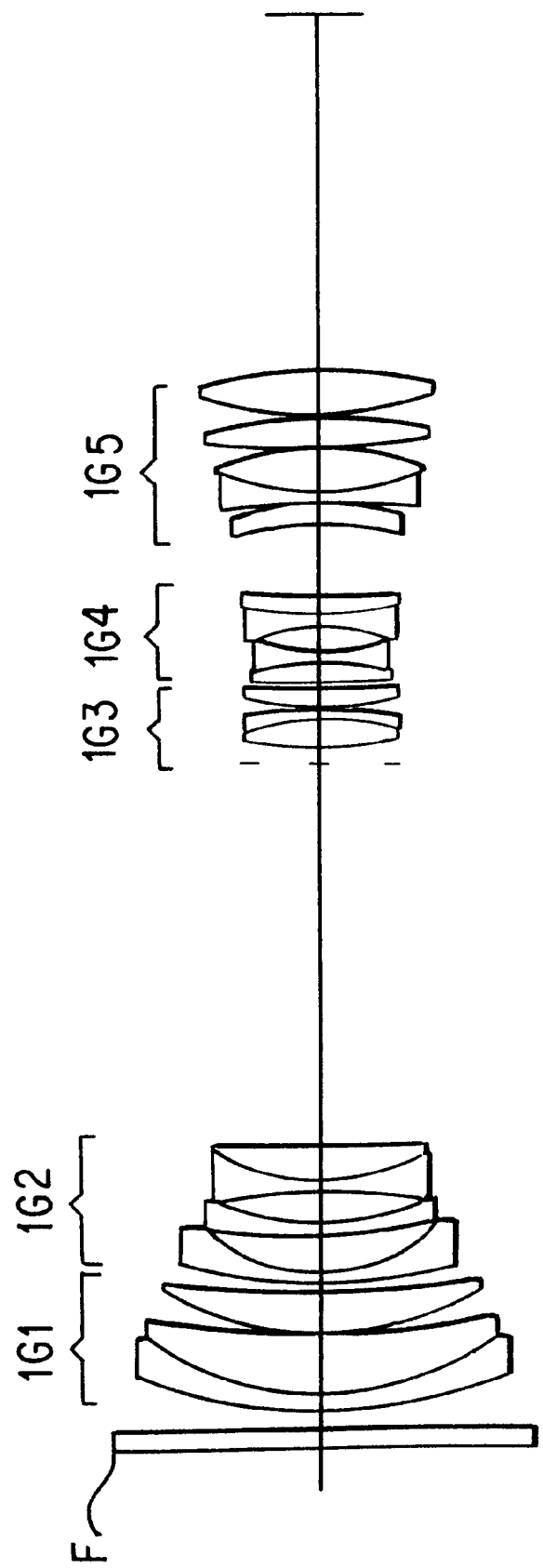
FIG. 2 is a side schematic drawing illustrating a lens structure according to a first preferred embodiment of the invention.
Figure 3:
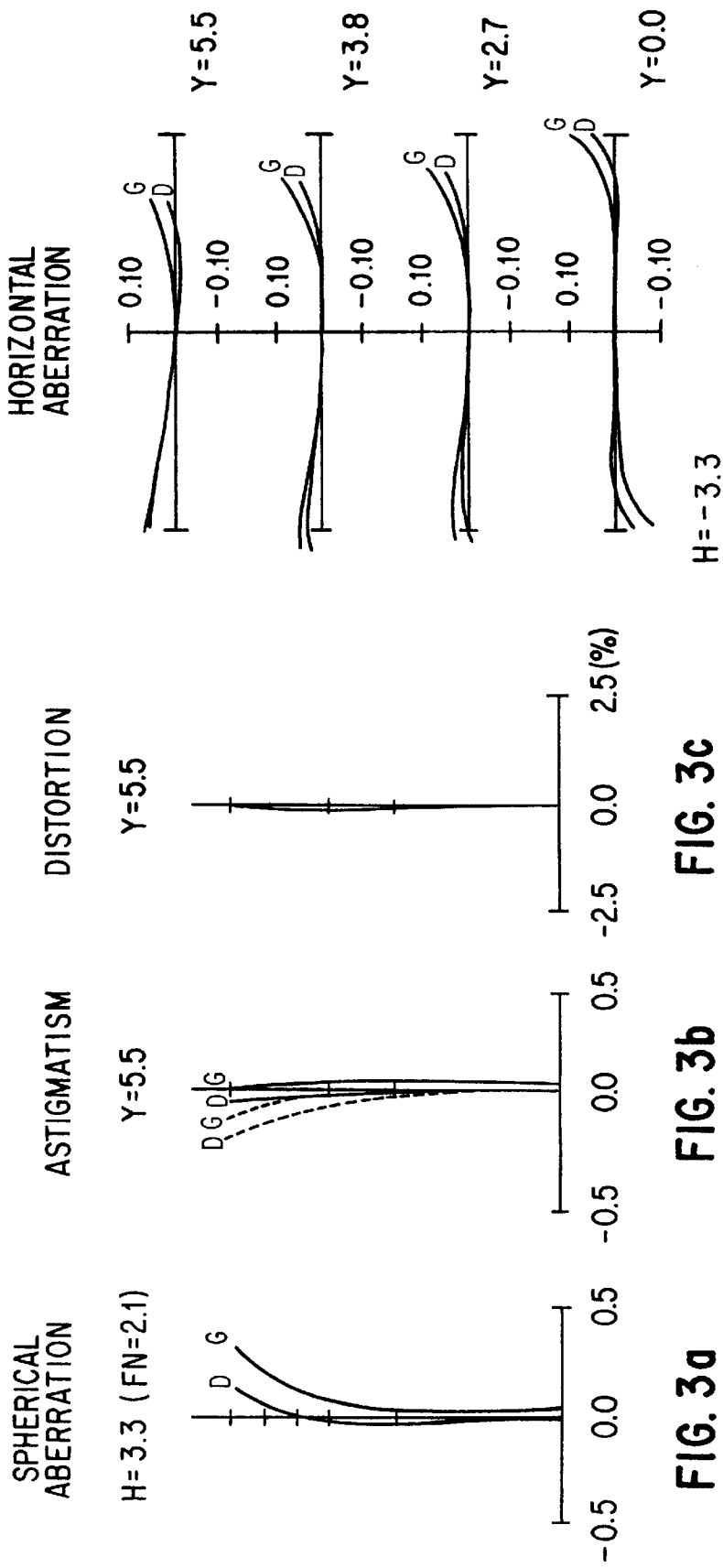
FIGS. 3a–3d are various aberration graphs at a maximum wide-angle state for the first preferred embodiment.
Figure 4:
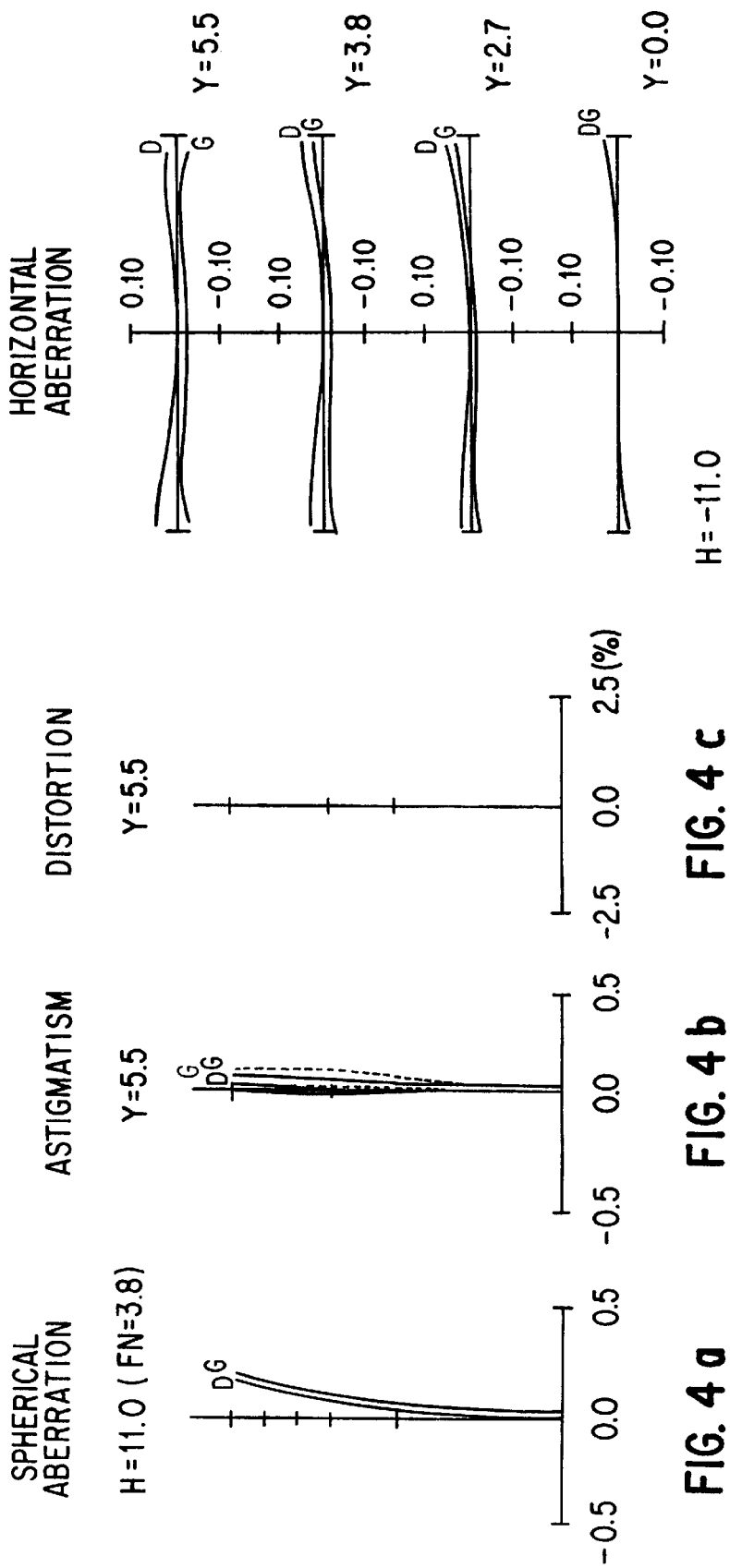
FIGS. 4a–4d are various aberration graphs at a maximum telephoto state for the first preferred embodiment.

FIG. 2 illustrates a lens structure of the zoom lens in the first preferred embodiment of the invention.

In FIG. 2, a filter F comprising a parallel plate is provided on the object side of the first lens group 1G1 in the zoom lens. The first lens group 1G1 comprises a cemented positive lens, which comprises a negative meniscus lens and a positive meniscus lens. The negative meniscus lens of the cemented positive lens has a weak curvature convex surface facing the object side and the positive meniscus lens has a strong curvature convex surface facing the object side. The first lens group 1G1 also comprises a positive meniscus lens with a strong curvature convex surface facing the object side.

The second lens group 1G2 comprises a negative meniscus lens with a weak curvature convex surface facing the object side; a negative meniscus lens with a weak curvature convex surface facing the object side; and a cemented negative lens, which comprises a biconcave lens and a positive meniscus lens with a strong curvature convex surface facing the object side.

The third lens group 1G3 comprises a cemented positive lens, which comprises a biconvex lens and a negative meniscus lens with a strong curvature concave surface facing the object side, and a positive meniscus lens with a strong curvature convex surface facing the object side.

The fourth lens group 1G4 comprises a cemented negative lens, which comprises a biconvex lens and a biconcave lens, and a cemented negative lens, which comprises a biconcave lens and a positive meniscus lens with a strong curvature biconvex surface facing the object side.

The fifth lens group 1G5 comprises a positive meniscus lens with a weak curvature concave surface facing the object side; a cemented positive lens which comprises a biconcave lens and a biconvex lens; a biconvex lens; and a biconvex lens.

The zoom lens according to the first preferred embodiment has a zoom ratio of about 600% and 13 groups with 19 individual components. The first preferred embodiment is characterized by the lens arrangement of the second lens group 1G2 and the lens arrangement of the fourth lens group 1G4. Through the lens arrangement of the fourth lens group 1G4, a degree of freedom is to simultaneously correct on-axis chromatic aberrations and chromatic aberrations of magnification at the maximum wide-angle state.

Next, values of various dimensions in the first preferred embodiment of the invention are listed in Table 1. In Table 1, f denotes a focal length, FN denotes an F-number, 2ω denotes a field angle, Bf denotes a back focus, β denotes a shooting magnification, and D0 denotes an object point distance. The surface number is the order of the lens surface from the object side with direction of travel of a light ray, and values of refraction index and Abbe's number are relative to a d-line (λ=587.6 nm).

TABLE 1 f = 14.9~99.6
FN = 2.1~3.8
2ω = 40.52°~6.54°

| Surface Number | Radius of Curvature | Intersurface Distance | Refractive Index | Abbe Number |
|---|---|---|---|---|
| 1 | ∞ | 2.000 | 1.51680 | 64.1 |
| 2 | ∞ | 2.000 | | |
| 3 | 51.040 | 1.800 | 1.80518 | 25.3 |
| 4 | 29.500 | 7.000 | 1.61720 | 54.0 |
| 5 | 106.170 | 0.200 | | |
| 6 | 35.274 | 4.800 | 1.67003 | 47.1 |
| 7 | 119.648 | (d7 = variable) | | |
| 8 | 55.472 | 1.300 | 1.71300 | 53.9 |
| 9 | 17.262 | 4.000 | | |
| 10 | 51.736 | 1.000 | 1.77279 | 49.5 |
| 11 | 24.872 | 4.000 | | |
| 12 | −76.811 | 1.000 | 1.65160 | 58.5 |
| 13 | 22.608 | 4.000 | 1.80384 | 33.9 |
| 14 | 307.707 | (d14 = variable) | | |
| 15 | 42.335 | 3.100 | 1.49782 | 82.5 |
| 16 | −26.000 | 1.000 | 1.80518 | 25.3 |
| 17 | −45.557 | 0.200 | | |
| 18 | 35.000 | 2.000 | 1.51680 | 64.1 |
| 19 | 303.535 | (d19 = variable) | | |
| 20 | 61.374 | 2.200 | 1.80518 | 25.3 |
| 21 | −38.000 | 1.000 | 1.62041 | 60.1 |
| 22 | 19.000 | 3.200 | | |
| 23 | −17.129 | 1.000 | 1.62041 | 60.1 |
| 24 | 28.000 | 2.300 | 1.75520 | 27.6 |
| 25 | 482.004 | (d25 = variable) | | |
| 26 | −42.161 | 2.000 | 1.79631 | 40.9 |
| 27 | −32.252 | 0.200 | | |
| 28 | −89.023 | 1.000 | 1.80518 | 25.3 |
| 29 | 27.675 | 5.000 | 1.49782 | 82.5 |
| 30 | −34.098 | 0.200 | | |
| 31 | 76.558 | 3.200 | 1.49782 | 82.5 |
| 32 | −57.382 | 0.200 | | |
| 33 | 37.279 | 4.900 | 1.49782 | 82.5 |
| 34 | −47.543 | Bf | | |

Variable Interval During Zooming

| β | −0.020 | −0.025 | −0.040 | −0.050 | −0.080 | −0.120 |
|---|---|---|---|---|---|---|
| D0 | 693.200 | 693.200 | 693.200 | 693.200 | 693.200 | 693.200 |
| d7 | 0.588 | 4.399 | 10.075 | 12.850 | 16.868 | 19.223 |
| d14 | 44.655 | 38.761 | 28.267 | 22.912 | 13.146 | 5.828 |
| d19 | 0.671 | 2.996 | 9.435 | 12.284 | 19.912 | 27.650 |
| d25 | 7.824 | 7.583 | 5.961 | 5.692 | 3.811 | 1.037 |
| Bf | 40.278 | 40.278 | 40.278 | 40.278 | 40.278 | 40.278 |

Condition Values

| f1 = | 58.837 | βw1 = | −0.0921 | βc1 = | −0.0921 | βt1 = | −0.0921 |
|---|---|---|---|---|---|---|---|
| f2 = | −19.300 | βw2 = | −0.5691 | βc2 = | −1.0000 | βt2 = | −1.2495 |
| f3 = | 33.073 | βw3 = | −0.6344 | βc3 = | −1.0000 | βt3 = | −1.2367 |
| f4 = | −21.096 | βw4 = | −0.8366 | βc4 = | −1.0000 | βt4 = | −1.1728 |
| f5 = | 24.210 | βw5 = | −0.7191 | βc5 = | −0.7191 | βt5 = | −0.7191 |
| fw = | 14.850 | βw = | −0.0200 | βc = | −0.0662 | βt = | −0.1200 |
| ft = | 99.643 | Φ = | 15.9 | | | | |

| | | |
|---|---|---|
| (1) | (1/f1 + 1/f2)fw = | −0.517037 |
| (2) | (1/f4 + 1/f5)fw = | −0.090542 |
| (3) | Φ/f3 = | 0.48075 |
| (8) | f2/f4 = | 0.91487 |
| (9) | β1/β5 = | 0.1281 |
| (10) | fw/f12 = | −0.37263 |
| (11) | fw/f45 = | 0.46574 |
| (12) | ft/f12 = | −0.86504 |
| (13) | ft/f45 = | 1.80079 |

FIGS. 3a–4d are various aberration graphs for the first preferred embodiment relative to a d-line (λ=587.6 nm) and a g-line (λ=435.8 nm). FIGS. 3a–3d are various aberration graphs at a maximum wide-angle or the closest-distance focusing state. FIGS. 4a–4d are various aberration graphs at a maximum telephoto or the farthest-distance focusing state.

In each aberration graph herein, H is a height of incident ray, FN is a F-number, Y is an image height, D is a d-line (λ=587.6 nm), and G is a g-line (λ=435.8 nm).

Moreover, in the aberration illustration showing astigmatism, the solid line represents a sagittal image plane and the broken line represents a meridional image plane. Each aberration graph clearly indicates that various aberrations are corrected at each focus distance condition. The above background discussion for the aberration graphs is appropriate for all aberration graphs in this application.

Figure 5:
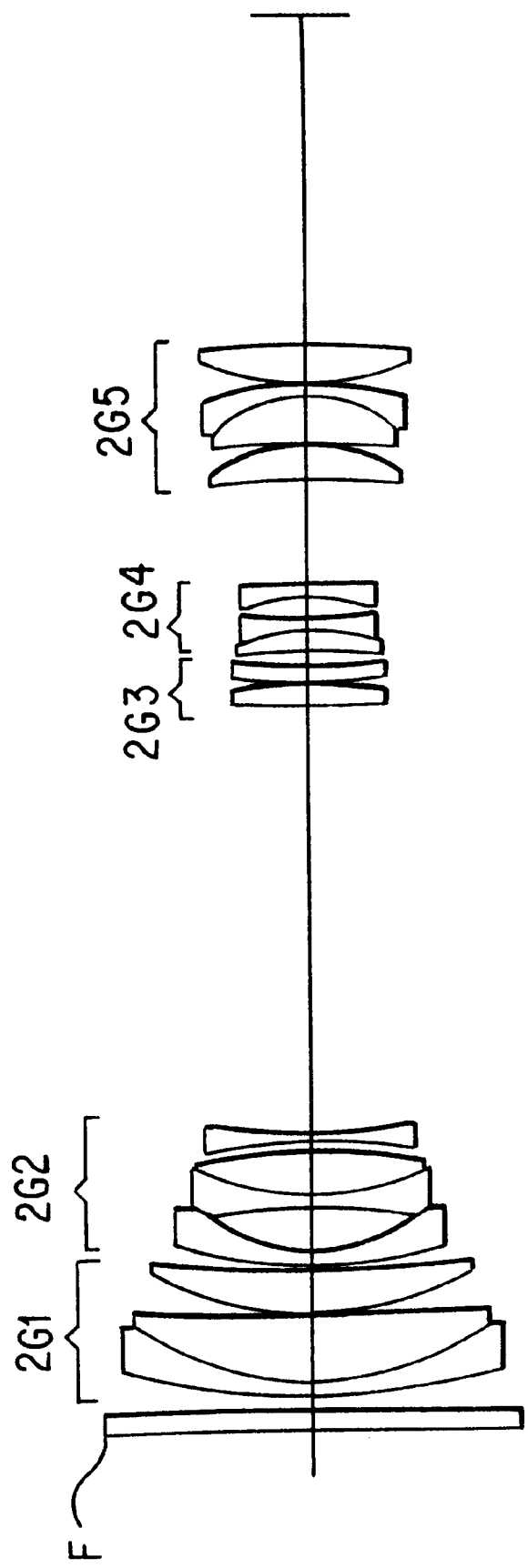
FIG. 5 is a side schematic drawing illustrating a lens structure according to a second preferred embodiment of the invention.

FIG. 5 illustrates a lens composition of the zoom lens in the second preferred embodiment of the invention. A filter F comprising a parallel plate is provided on the object side of the first lens group 2G1 in the zoom lens of FIG. 5. The first lens group 2G1 comprises a cemented positive lens, which comprises a negative meniscus lens with a weak curvature convex surface facing the object side and a positive meniscus lens with a strong curvature convex surface facing the object side, and a positive meniscus lens with a strong curvature convex surface facing the object side.

The second lens group 2G2 comprises a negative meniscus lens with a weak curvature convex surface facing the object side; a cemented positive lens, which includes a biconcave lens and a biconvex lens; and a biconcave lens.

The third lens group 2G3 comprises a biconvex lens and a positive meniscus lens, which has a strong curvature convex surface facing the object side.

The fourth lens group 2G4 comprises a cemented negative lens, which comprises a positive meniscus lens with a strong curvature convex surface facing the object side and a biconcave lens; and a negative meniscus lens with a strong curvature concave surface facing the object side.

The fifth lens group 2G5 comprises a positive meniscus lens with a weak curvature concave surface facing the object side; a cemented positive lens, which comprises a positive meniscus lens with a weak curvature concave surface facing the object side and a negative meniscus lens with a strong curvature concave surface facing the object side; and a biconvex lens.

The zoom lens according to the second preferred embodiment has a zoom ratio of about 500% and 12 groups with 16 individual components. The second preferred embodiment is characterized in that the third lens group 2G3 has two pieces and does not include a cemented lens and the lens shape and arrangement of the second lens group 2G2. Through this structure, fluctuation of coma of a lower ray of the main light ray associated with zooming is corrected.

Next, values of various dimensions in the second preferred embodiment of the invention are listed in Table 2. In Table 2, f denotes a focal length, FN denotes F-number, 2ω denotes a field angle, Bf denotes a back focus, β denotes a shooting magnification, and D0 denotes an object point distance. The surface number is the order of the lens surface from the object side for the direction of travel of a light ray, and values of refraction index and Abbe's number are relative to d-line (λ=587.6 nm).

TABLE 2 f = 14.9~84.6
FN = 2.1~3.3
2ω = 40.52°~7.82°

| Surface Number | Radius of Curvature | Intersurface Distance | Refractive Index | Abbe Number |
|---|---|---|---|---|
| 1 | ∞ | 2.000 | 1.51680 | 64.1 |
| 2 | ∞ | 2.000 | | |

TABLE 2-continued

| | | | | |
|---|---|---|---|---|
| 3 | 95.149 | 1.800 | 1.80518 | 25.3 |
| 4 | 32.500 | 7.500 | 1.69350 | 53.7 |
| 5 | 450.818 | 0.200 | | |
| 6 | 35.766 | 5.000 | 1.67025 | 57.5 |
| 7 | 128.037 | (d7 = variable) | | |
| 8 | 52.414 | 1.200 | 1.74400 | 45.0 |
| 9 | 18.713 | 5.800 | | |
| 10 | −78.828 | 1.100 | 1.74443 | 49.5 |
| 11 | 33.009 | 5.000 | 1.80518 | 25.3 |
| 12 | −61.573 | 1.000 | | |
| 13 | −70.000 | 1.000 | 1.77279 | 49.5 |
| 14 | 48.774 | (d14 = variable) | | |
| 15 | 85.366 | 2.400 | 1.49782 | 82.5 |
| 16 | −51.796 | 0.200 | | |
| 17 | 26.828 | 2.200 | 1.49782 | 82.5 |
| 18 | 135.689 | (d18 = variable) | | |
| 19 | −125.126 | 2.400 | 1.80518 | 25.3 |
| 20 | −22.000 | 1.000 | 1.61720 | 54.0 |
| 21 | 42.781 | 3.000 | | |
| 22 | −17.301 | 1.000 | 1.62280 | 57.0 |
| 23 | −263.797 | (d23 = variable) | | |
| 24 | −66.992 | 3.500 | 1.77279 | 49.5 |
| 25 | −20.832 | 0.200 | | |
| 26 | −123.185 | 5.500 | 1.49782 | 82.5 |
| 27 | −15.500 | 1.000 | 1.80518 | 25.3 |
| 28 | −40.780 | 0.200 | | |
| 29 | 28.524 | 4.000 | 1.49782 | 82.5 |
| 30 | −141.037 | Bf | | |

Variable Interval During Zooming

| β | −0.020 | −0.025 | −0.040 | −0.050 | −0.080 | −0.100 |
|---|---|---|---|---|---|---|
| D0 | 691.628 | 691.628 | 691.628 | 691.628 | 691.628 | 691.628 |
| d7 | 0.543 | 3.956 | 10.030 | 12.457 | 16.772 | 18.669 |
| d14 | 48.147 | 42.642 | 31.759 | 26.834 | 16.733 | 11.607 |
| d18 | 1.839 | 4.495 | 10.602 | 13.775 | 21.123 | 24.828 |
| d23 | 12.305 | 11.741 | 10.442 | 9.768 | 8.206 | 7.729 |
| Bf | 37.421 | 37.421 | 37.421 | 37.421 | 37.421 | 37.421 |

Condition Corresponding Values

| | | | | | |
|---|---|---|---|---|---|
| f1 = | 58.837 | βw1 = | −0.0921 | βc1 = | −0.0921 βt1 = −0.0921 |
| f2 = | −19.300 | βw2 = | −0.5691 | βc2 = | −1.0000 βt2 = −1.2226 |
| f3 = | 33.073 | βw3 = | −0.6344 | βc3 = | −1.0000 βt3 = −1.1725 |
| f4 = | −21.096 | βw4 = | −0.8366 | βc4 = | −1.0000 βt4 = −1.0535 |
| f5 = | 24.210 | βw5 = | −0.7191 | βc5 = | −0.7191 βt5 = −0.7191 |
| fw = | 14.850 | βw = | −0.0200 | βc = | −0.0662 βt = −0.1000 |
| ft = | 84.638 | Φ = | 16.1 | | |

| | | |
|---|---|---|
| (1) | (1/f1 + 1/f2)fw = | −0.517037 |
| (2) | (1/f4 + 1/f5)fw = | −0.090542 |
| (3) | Φ/f3 = | 0.48680 |
| (8) | f2/f4 = | 0.91487 |
| (9) | β1/β5 = | 0.1281 |
| (10) | fw/f12 = | −0.37263 |
| (11) | fw/f45 = | 0.46574 |
| (12) | ft/f12 = | −0.77281 |
| (13) | ft/f45 = | 1.89613 |

FIGS. 6a–7d are various aberration graphs for the second preferred embodiment relative to a d-line (λ=587.6 nm) and a g-line (λ=435.8 nm). FIGS. 6a–6d are various aberration graphs at a maximum wide-angle state and FIGS. 7a–7d are various aberration graphs at a maximum telephoto state.

Figure 8:
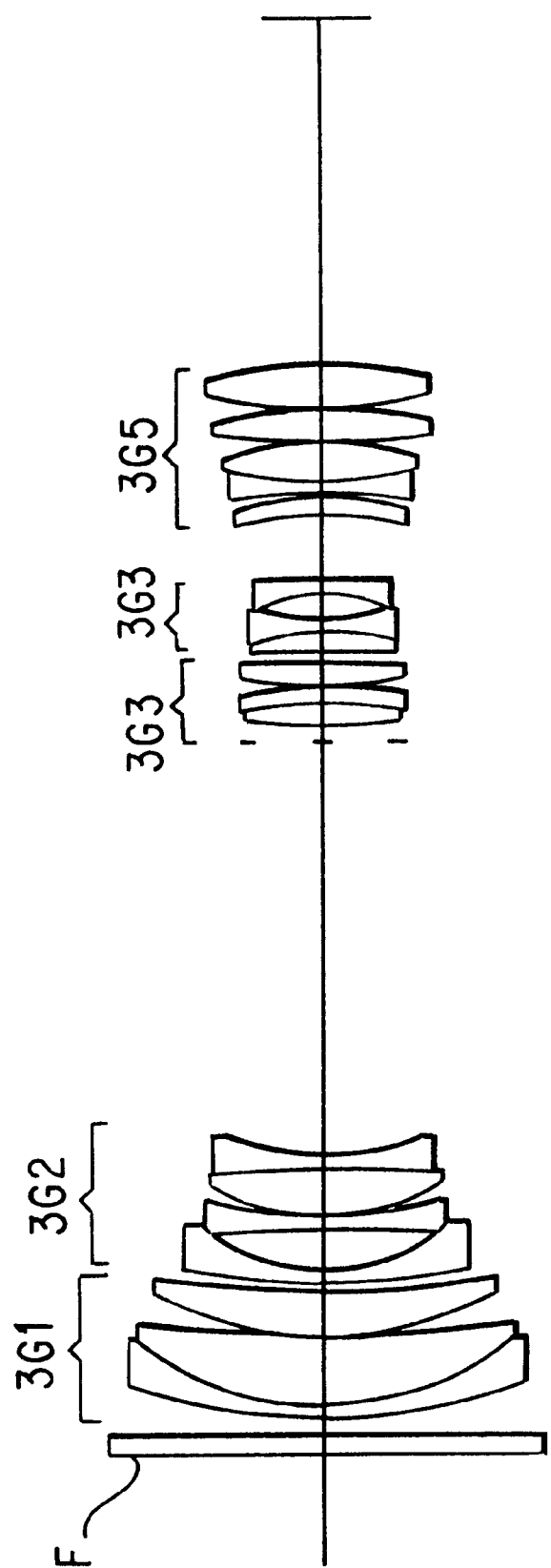
FIG. 8 is a side schematic drawing illustrating a lens structure according to a third preferred embodiment of the invention.

FIG. 8 illustrates a lens structure of the zoom lens in the third preferred embodiment of the invention. A filter F comprising a parallel plate is provided on the object side of the first lens group 3G1 in the zoom lens of FIG. 8. The first lens group 3G1 comprises a cemented positive lens, which comprises a negative meniscus lens with a weak curvature convex surface facing the object side and a positive meniscus lens with a strong curvature convex surface facing the object side, and a positive meniscus lens with the strong curvature convex surface facing the object side.

The second lens group 3G2 comprises a negative meniscus lens with a weak curvature convex surface facing the object side, a biconcave lens, and a cemented negative lens, which comprises a biconvex lens and a biconcave lens.

The third lens group 3G3 comprises a cemented positive lens, which comprises a biconvex lens and a negative meniscus lens with a strong curvature concave surface facing the object side; and a biconvex lens.

The fourth lens group 3G4 comprises a cemented negative lens, which comprises a biconvex lens and a biconvex lens; and a biconvex lens.

The fifth lens group 3G5 comprises a positive meniscus lens with a weak curvature concave surface facing the object side, a cemented positive lens, which comprises a biconcave lens and a biconvex lens, a biconvex lens; and a biconvex lens.

The zoom lens of the third preferred embodiment has a zoom ratio of about 500% and 13 groups with 18 individual pieces.

Next, values of various dimensions in the third preferred embodiment of the invention are listed in Table 3. In Table 3, f denotes a focal length, FN denotes an F-number, 2ω denotes a field angle, Bf denotes a back focus, β denotes a shooting magnification, and D0 denotes an object point distance. The surface number is the order of the lens surface from the object side in the direction of travel of a light ray, and values of refraction index and Abbe's number are relative to a d-line (λ=587.6 nm).

TABLE 3 f = 14.9~80.6
FN = 2.0~3.5
2ω = 40.50°~7.88°

| Surface Number | Radius of Curvature | Intersurface Distance | Refractive Index | Abbe Number |
|---|---|---|---|---|
| 1 | ∞ | 2.000 | 1.51680 | 64.1 |
| 2 | ∞ | 2.000 | | |
| 3 | 60.982 | 1.500 | 1.80518 | 25.3 |
| 4 | 31.500 | 7.000 | 1.61720 | 54.0 |
| 5 | 180.089 | 0.200 | | |
| 6 | 34.300 | 5.000 | 1.62374 | 47.1 |
| 7 | 125.694 | (d7 = variable) | | |
| 8 | 64.415 | 1.200 | 1.74443 | 49.5 |
| 9 | 18.566 | 5.000 | | |
| 10 | −438.679 | 1.100 | 1.74400 | 45.0 |
| 11 | 39.902 | 0.200 | | |
| 12 | 24.467 | 4.800 | 1.75520 | 27.6 |
| 13 | −130.000 | 1.000 | 1.74443 | 49.5 |
| 14 | 24.445 | (d14 = variable) | | |
| 15 | 59.530 | 2.700 | 1.49782 | 82.5 |
| 16 | −30.000 | 1.000 | 1.80518 | 25.3 |
| 17 | −54.316 | 0.200 | | |
| 18 | 32.103 | 2.800 | 1.49782 | 82.5 |
| 19 | −148.716 | (d19 = variable) | | |
| 20 | 240.167 | 2.370 | 1.80518 | 25.3 |
| 21 | −19.136 | 1.000 | 1.59319 | 67.9 |
| 22 | 25.161 | 3.100 | | |
| 23 | −13.945 | 1.000 | 1.59319 | 67.9 |
| 24 | −308.112 | (d24 = variable) | | |
| 25 | −42.000 | 2.000 | 1.74810 | 52.3 |
| 26 | −28.744 | 0.200 | | |
| 27 | −78.699 | 1.000 | 1.80518 | 25.3 |
| 28 | 28.563 | 4.700 | 1.49782 | 82.5 |
| 29 | −29.514 | 0.200 | | |
| 30 | 73.513 | 3.100 | 1.49782 | 82.5 |
| 31 | −56.022 | 0.200 | | |
| 32 | 43.932 | 4.600 | 1.49782 | 82.5 |
| 33 | −41.052 | Bf | | |

Variable Interval During Zooming

| β | −0.020 | −0.025 | −0.040 | −0.060 | −0.080 | −0.100 |
|---|---|---|---|---|---|---|
| D0 | 692.474 | 692.474 | 692.474 | 692.474 | 692.474 | 692.474 |
| d7 | 0.433 | 3.790 | 9.062 | 13.681 | 15.915 | 17.290 |

TABLE 3-continued

| | | | | | | |
|---|---|---|---|---|---|---|
| d14 | 46.886 | 41.511 | 31.854 | 22.718 | 16.937 | 13.015 |
| d19 | 1.025 | 3.588 | 10.024 | 15.348 | 20.107 | 24.089 |
| d24 | 7.021 | 6.476 | 4.424 | 3.618 | 2.405 | 0.971 |
| Bf | 37.435 | 37.435 | 37.435 | 37.435 | 37.435 | 37.435 |

Condition Corresponding Values

| | | | | | | | |
|---|---|---|---|---|---|---|---|
| f1 = | 58.837 | βw1 = | −0.0921 | βc1 = | −0.0921 | βt1 = | −0.0921 |
| f2 = | −19.000 | βw2 = | −0.5650 | βc2 = | −1.0000 | βt2 = | −1.1329 |
| f3 = | 32.000 | βw3 = | −0.6279 | βc3 = | −1.0000 | βt3 = | −1.1475 |
| f4 = | −21.001 | βw4 = | −0.8301 | βc4 = | −1.0000 | βt4 = | −1.1326 |
| f5 = | 22.500 | βw5 = | −0.7375 | βc5 = | −0.7375 | βt5 = | −0.7375 |
| fw = | 14.861 | βw = | −0.0200 | βc = | −0.0679 | βt = | −0.1000 |
| ft = | 80.593 | Φ = | 15.8 | | | | |

| | | |
|---|---|---|
| (1) | (1/f1 + 1/f2)fw = | −0.529787 |
| (2) | (1/f4 + 1/f5)fw = | −0.047144 |
| (3) | Φ/f3 = | 0.49375 |
| (8) | f2/f4 = | 0.90472 |
| (9) | β1/β5 = | 0.1249 |
| (10) | fw/f12 = | −0.37010 |
| (11) | fw/f45 = | 0.45912 |
| (12) | ft/f12 = | −0.81841 |
| (13) | ft/f45 = | 1.40642 |

FIGS. 9a–10d are various aberration graphs of the third preferred embodiment relative to a d-line (λ=587.6 nm) and a g-line (λ=435.8 nm). FIGS. 9a–9d are various aberration graphs at the maximum wide-angle state. FIGS. 10a–10d are various aberration graphs at the maximum telephoto state.

Figure 11:
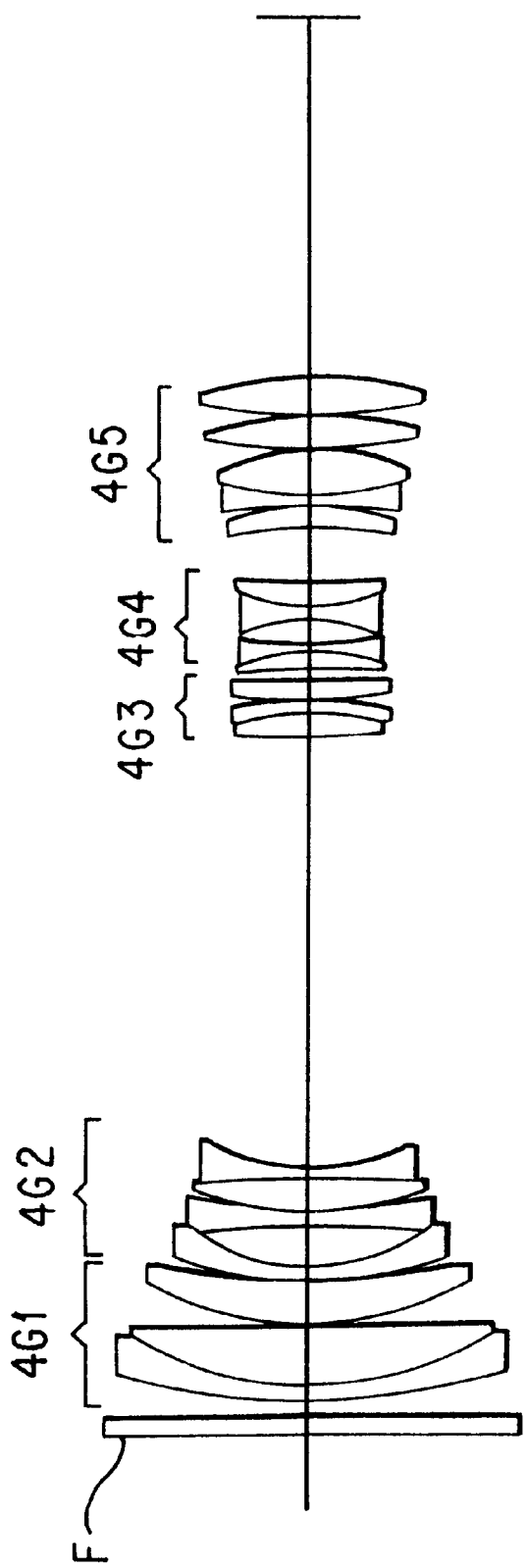
FIG. 11 is a side schematic drawing illustrating a lens structure according to a fourth preferred embodiment of the invention.

FIG. 11 illustrates a lens structure of the zoom lens in the fourth preferred embodiment of the invention.

In FIG. 11, a filter F comprising a parallel plate is provided on object side of the first lens group 4G1 for the zoom lens. The first lens group 4G1 comprises a cemented positive lens, which comprises a negative meniscus lens with a weak curvature convex surface facing the object side and a positive meniscus lens with a strong curvature convex surface facing the object side, and a positive meniscus lens with the strong curvature convex surface facing the object side.

The second lens group 4G2 comprises a negative meniscus lens with a weak curvature convex surface facing the object side; a biconcave lens; and a cemented negative lens, which comprises a biconvex lens and a biconcave lens.

The third lens group 4G3 comprises a cemented positive lens, which comprises a biconvex lens and a negative meniscus lens with a strong curvature concave surface facing the object side, and a biconvex lens.

The fourth lens group 4G4 comprises a cemented negative lens, which comprises a biconvex lens and a biconcave lens; and a cemented negative lens, which comprises a biconcave lens and a positive meniscus lens with a strong curvature convex surface facing the object side.

The fifth lens group 4G5 comprises a positive meniscus lens with a weak curvature concave surface facing the object side; a cemented positive lens, which comprises a biconcave lens and a biconvex lens; a biconvex lens; and a biconvex lens.

The zoom lens in the fourth preferred embodiment has a zoom ratio of about 600% and 13 groups with 18 individual pieces. Characteristics of the zoom lens of the fourth preferred embodiment include a lens shape of the third lens group 4G3 and the shape of the cemented positive lens in the fifth lens group 4G5.

Next, values of various dimensions in the fourth preferred embodiment of the invention are listed in Table 4. In Table 4, f denotes a focal length, FN denotes a F-number, 2ω denotes a field angle, Bf denotes a back focus, β denotes a shooting magnification, and D0 denotes an object point distance. The surface number is the order of the lens surface from the object side in the direction of travel of a light ray. The values of the refraction index and Abbe's number are relative to a d-line (λ=587.6 nm).

TABLE 4 f = 14.9~112.4
FN = 2.1~3.7
2ω = 40.62°~6.54°

| Surface Number | Radius of Curvature | Intersurface Distance | Refractive Index | Abbe Number |
|---|---|---|---|---|
| 1 | ∞ | 2.000 | 1.51680 | 64.1 |
| 2 | ∞ | 2.000 | | |
| 3 | 80.510 | 1.500 | 1.80518 | 25.3 |
| 4 | 38.000 | 6.500 | 1.65844 | 50.8 |
| 5 | 1802.123 | 0.200 | | |
| 6 | 34.821 | 4.500 | 1.65844 | 50.8 |
| 7 | 83.618 | (d7 = variable) | | |
| 8 | 59.592 | 1.200 | 1.74443 | 49.5 |
| 9 | 20.038 | 5.000 | | |
| 10 | −115.363 | 1.100 | 1.74400 | 45.0 |
| 11 | 38.407 | 0.200 | | |
| 12 | 25.647 | 4.400 | 1.75520 | 27.6 |
| 13 | −200.000 | 1.000 | 1.74443 | 49.5 |
| 14 | 27.251 | (d14 = variable) | | |
| 15 | 82.598 | 2.700 | 1.49782 | 82.5 |
| 16 | −25.722 | 1.000 | 1.80518 | 25.3 |
| 17 | −41.180 | 0.200 | | |
| 18 | 31.840 | 2.600 | 1.49782 | 82.5 |
| 19 | −215.760 | (d19 = variable) | | |
| 20 | 283.979 | 2.400 | 1.80518 | 25.3 |
| 21 | −20.000 | 1.000 | 1.62041 | 60.1 |
| 22 | 30.863 | 3.000 | | |
| 23 | −14.764 | 1.000 | 1.62374 | 47.1 |
| 24 | 18.102 | 2.500 | 1.75520 | 27.6 |
| 25 | 119.685 | (d25 = variable) | | |
| 26 | −39.262 | 2.000 | 1.79668 | 45.4 |
| 27 | −29.508 | 0.200 | | |
| 28 | −79.596 | 1.000 | 1.80518 | 25.3 |
| 29 | 26.918 | 4.700 | 1.49782 | 82.5 |
| 30 | −29.535 | 0.200 | | |
| 31 | 65.246 | 3.300 | 1.49782 | 82.5 |
| 32 | −56.668 | 0.200 | | |
| 33 | 52.110 | 4.300 | 1.49782 | 82.5 |
| 34 | −39.485 | Bf | | |

Variable Interval During Zooming

| β | −0.020 | −0.025 | −0.040 | −0.050 | −0.080 | −0.120 |
|---|---|---|---|---|---|---|
| D0 | 692.709 | 692.709 | 692.709 | 692.709 | 692.709 | 692.709 |
| d7 | 0.217 | 4.092 | 9.879 | 12.473 | 16.532 | 19.500 |
| d14 | 48.036 | 42.185 | 31.772 | 26.755 | 17.278 | 9.038 |
| d19 | 0.682 | 2.862 | 8.939 | 11.827 | 19.067 | 25.922 |
| d25 | 6.695 | 6.492 | 5.041 | 4.576 | 2.752 | 1.171 |
| Bf | 40.455 | 40.455 | 40.455 | 40.455 | 40.455 | 40.455 |

Condition Corresponding Values

| | | | | | | | |
|---|---|---|---|---|---|---|---|
| f1 = | 58.837 | βw1 = | −0.0921 | βc1 = | −0.0921 | βt1 = | −0.0921 |
| f2 = | −19.000 | βw2 = | −0.5536 | βc2 = | −1.0000 | βt2 = | −1.2633 |
| f3 = | 32.000 | βw3 = | −0.6175 | βc3 = | −1.0000 | βt3 = | −1.2161 |
| f4 = | −20.000 | βw4 = | −0.8248 | βc4 = | −1.0000 | βt4 = | −1.1011 |
| f5 = | 23.500 | βw5 = | −0.7704 | βc5 = | −0.7704 | βt5 = | −0.7704 |
| fw = | 14.822 | βw = | −0.0200 | βc = | −0.0709 | βt = | −0.1200 |
| ft = | 112.444 | Φ = | 15.8 | | | | |

| | | |
|---|---|---|
| (1) | (1/f1 + 1/f2)fw = | −0.528189 |
| (2) | (1/f4 + 1/f5)fw = | −0.110377 |
| (3) | Φ/f3 = | 0.49375 |
| (8) | f2/f4 = | 0.950 |
| (9) | β1/β5 = | 0.1195 |
| (10) | fw/f12 = | −0.40414 |
| (11) | fw/f45 = | 0.44167 |
| (12) | ft/f12 = | −0.85417 |
| (13) | ft/f45 = | 1.79082 |

FIGS. 12a–13d are various aberration graphs for the fourth preferred embodiment relative to a d-line (λ=587.6 nm) and a g-line (λ=435.8 nm). FIGS. 12a–12d are various aberration graphs at a maximum wide-angle state FIGS. 13a–13d are various aberration graphs at maximum telephoto state.

Figure 14:
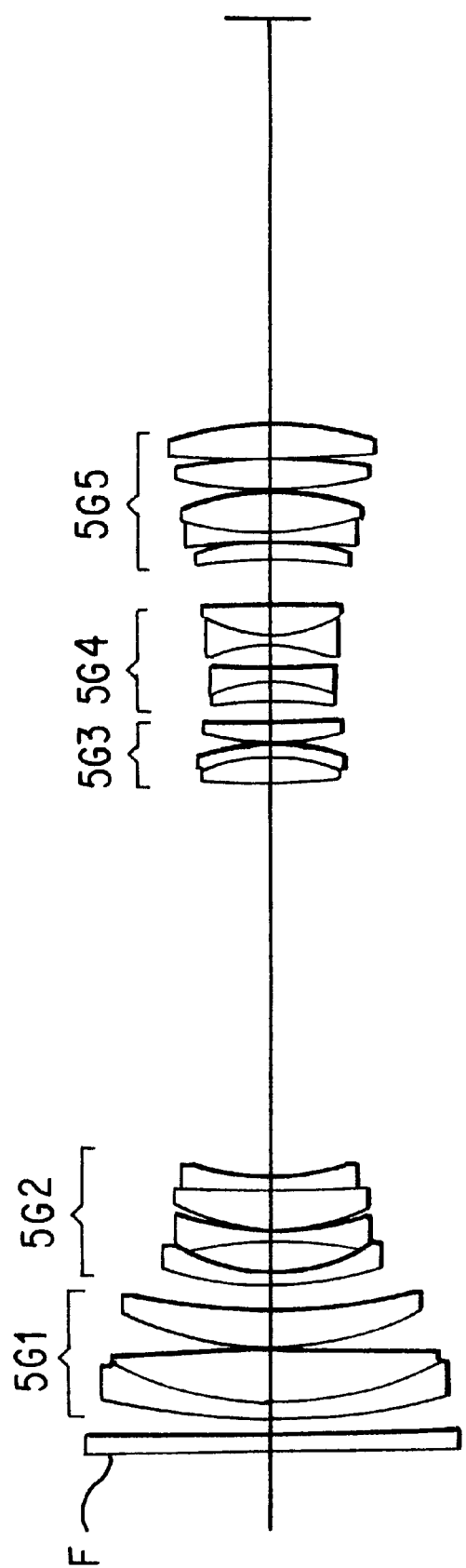
FIG. 14 is a side schematic drawing illustrating a lens structure according to a fifth preferred embodiment of the invention.
Figure 15:
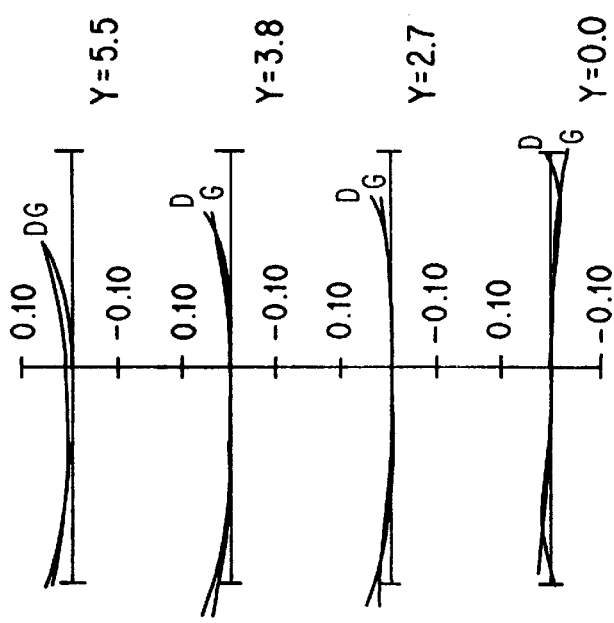
FIGS. 15a–15d are various aberration graphs at a maximum wide-angle state for the fifth preferred embodiment.
Figure 16:
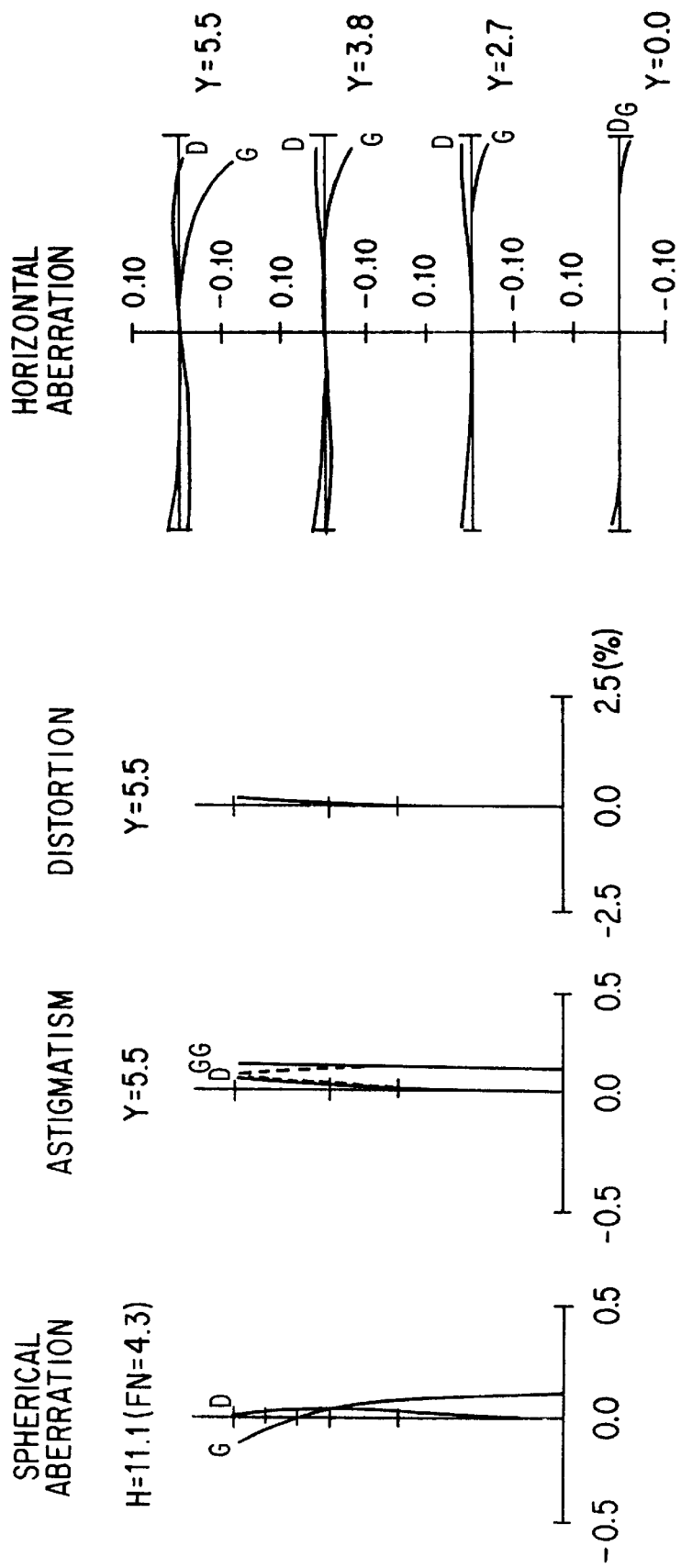
FIGS. 16a–16d are various aberration graphs at a maximum telephoto state for the fifth preferred embodiment.

FIG. 14 illustrates a lens structure for a zoom lens according to a fifth preferred embodiment of the present invention.

A filter F comprising a parallel plate is provided on the object side of the first lens group 5G1 in the zoom lens of FIG. 14. The first lens group 5G1 comprises a cemented positive lens, which comprises a negative meniscus lens with a weak curvature convex surface facing the object side and a positive meniscus lens with a strong curvature convex surface facing the object side; and a positive meniscus lens with a strong curvature convex surface facing the object side.

The second lens group 5G2 comprises a negative meniscus lens with a weak curvature convex surface facing the object side; a biconcave lens; and a cemented positive lens, which comprises a positive meniscus lens with a strong curvature convex surface facing the object side and a negative meniscus lens with a weak curvature convex surface facing the object side.

The third lens group 5G3 comprises a cemented positive lens, which includes a biconvex lens and a negative meniscus lens with a strong curvature concave surface facing the object side, and a biconvex lens.

The fourth lens group 5G4 comprises a cemented negative lens, which comprises a positive meniscus lens with the weak curvature concave surface facing the object side and a biconcave lens, and a cemented negative lens, which comprises a biconcave lens and a biconvex lens.

The fifth lens group 5G5 comprises a positive meniscus lens with a weak curvature concave surface facing the object side; a cemented positive lens, which comprises a biconcave lens and a biconvex lens; a biconvex lens and a biconvex lens.

The zoom lens of the fifth preferred embodiment has a zoom ratio of about 600% and 13 groups with 19 individual pieces. Characteristics of the fifth preferred embodiment include the structure where a refractive power of the first lens group 5G1 is weak, the refractive powers of the second lens group 5G2 and the fourth lens group 5G4 are strong and the lens arrangement of the second lens group 5G2.

Next, values of various dimensions in the fifth preferred embodiment of the invention are listed in Table 5. In Table 5, f denotes a focal length, FN denotes a F-number, 2ω denotes a field angle, Bf denotes a back focus, β denotes a shooting magnification, and D0 denotes an object point distance. The surface number is the order of the lens surface from the object side in the direction of movement of a light ray. The values of the refraction index and Abbe's number are relative to a d-line (λ=587.6 nm).

TABLE 5 f = 17.0~112.4
FN = 2.6~4.3
2ω = 35.84°~5.66°

| Surface Number | Radius of Curvature | Intersurface Distance | Refractive Index | Abbe Number |
|---|---|---|---|---|
| 1 | ∞ | 2.000 | 1.51680 | 64.1 |
| 2 | ∞ | 2.000 | | |
| 3 | 99.583 | 1.500 | 1.80518 | 25.3 |

TABLE 5-continued

| 4 | 39.261 | 6.900 | 1.62374 | 47.1 |
|---|---|---|---|---|
| 5 | -335.344 | 0.200 | | |
| 6 | 33.850 | 4.600 | 1.65844 | 50.8 |
| 7 | 78.216 | (d7 = variabie) | | |
| 8 | 52.841 | 1.000 | 1.74443 | 49.5 |
| 9 | 20.153 | 4.500 | | |
| 10 | -62.504 | 1.000 | 1.77279 | 49.5 |
| 11 | 37.515 | 0.200 | | |
| 12 | 23.622 | 4.800 | 1.80518 | 25.3 |
| 13 | 500.000 | 1.000 | 1.74400 | 45.3 |
| 14 | 24.406 | (d14 = variable) | | |
| 15 | 77.436 | 3.200 | 1.49782 | 82.5 |
| 16 | -19.500 | 1.000 | 1.80518 | 25.3 |
| 17 | -30.337 | 0.200 | | |
| 18 | 32.435 | 2.800 | 1.49782 | 82.5 |
| 19 | -472.313 | (d19 = variable) | | |
| 20 | -64.184 | 2.700 | 1.80518 | 25.3 |
| 21 | -17.000 | 1.000 | 1.62041 | 60.1 |
| 22 | 49.020 | 3.500 | | |
| 23 | -15.418 | 1.000 | 1.74443 | 49.5 |
| 24 | 15.300 | 3.200 | 1.79504 | 28.6 |
| 25 | -272.887 | (d25 = variable) | | |
| 26 | -41.768 | 2.100 | 1.79668 | 45.4 |
| 27 | -28.230 | 0.200 | | |
| 28 | -80.470 | 1.000 | 1.80518 | 25.3 |
| 29 | 29.443 | 5.000 | 1.49782 | 82.5 |
| 30 | -28.890 | 0.200 | | |
| 31 | 56.211 | 3.900 | 1.49782 | 82.5 |
| 32 | -60.103 | 0.200 | | |
| 33 | 144.157 | 3.800 | 1.49782 | 82.5 |
| 34 | -40.060 | Bf | | |

| Variable Interval During Zooming | | | | | | |
|---|---|---|---|---|---|---|
| β | -0.020 | -0.025 | -0.040 | -0.060 | -0.080 | -0.120 |
| D0 | 794.086 | 794.086 | 794.086 | 794.086 | 794.086 | 794.086 |
| d7 | 3.405 | 6.650 | 12.496 | 16.845 | 19.123 | 22.237 |
| d14 | 48.650 | 43.570 | 33.589 | 25.257 | 19.988 | 12.034 |
| d19 | 2.489 | 4.837 | 10.131 | 14.979 | 19.016 | 24.911 |
| d25 | 6.310 | 5.796 | 4.638 | 3.773 | 2.726 | 1.671 |
| Bf | 49.449 | 49.449 | 49.449 | 49.449 | 49.449 | 49.449 |

| Condition Corresponding Values | | | | | | |
|---|---|---|---|---|---|---|
| f1 = | 60.000 | βw1 = | -0.0811 | βc1 = | -0.8111 βt1 = | -0.811 |
| f2 = | -17.500 | βw2 = | -0.5205 | βc2 = | -1.0000 βt2 = | -1.1835 |
| f3 = | 30.000 | βw3 = | -0.5853 | βc3 = | -1.0000 βt3 = | -1.1433 |
| f4 = | -17.000 | βw4 = | -0.7772 | βc4 = | -1.0000 βt4 = | -1.0501 |
| fs = | 25.000 | βw5 = | -1.0417 | βc5 = | -1.0417 βt5 = | -1.0417 |
| fw = | 16.978 | βw = | -0.0200 | βc = | -0.0845 βt = | -0.1200 |
| ft = | 112.443 | Φ = | 15.7 | | | |

| | | | |
|---|---|---|---|
| (1) | (1/f1 + 1/f2)fw = | | -0.687205 |
| (2) | (1/f4 + 1/fS)fw = | | -0.319586 |
| (3) | Φ/f3 = | | 0.52333 |
| (8) | f2/f4 = | | 0.02941 |
| (9) | β1/β5 = | | 0.07785 |
| (10) | fw/f12 = | | -0.46494 |
| (11) | fw/f45 = | | 0.43093 |
| (12) | ft/f12 = | | -1.06252 |
| (13) | ft/f45 = | | 1.62675 |

FIGS. 15a–16d are aberration graphs for the fifth preferred embodiment relative to a d-line (λ=587.6 nm) and a g-line (λ=435.8 nm). FIGS. 15a–15d are various aberration graphs at a maximum wide-angle or closest-distance focusing state. FIGS. 16a–16d are various aberration graphs at a maximum telephoto or farthest-distance focusing state.

Figure 17:
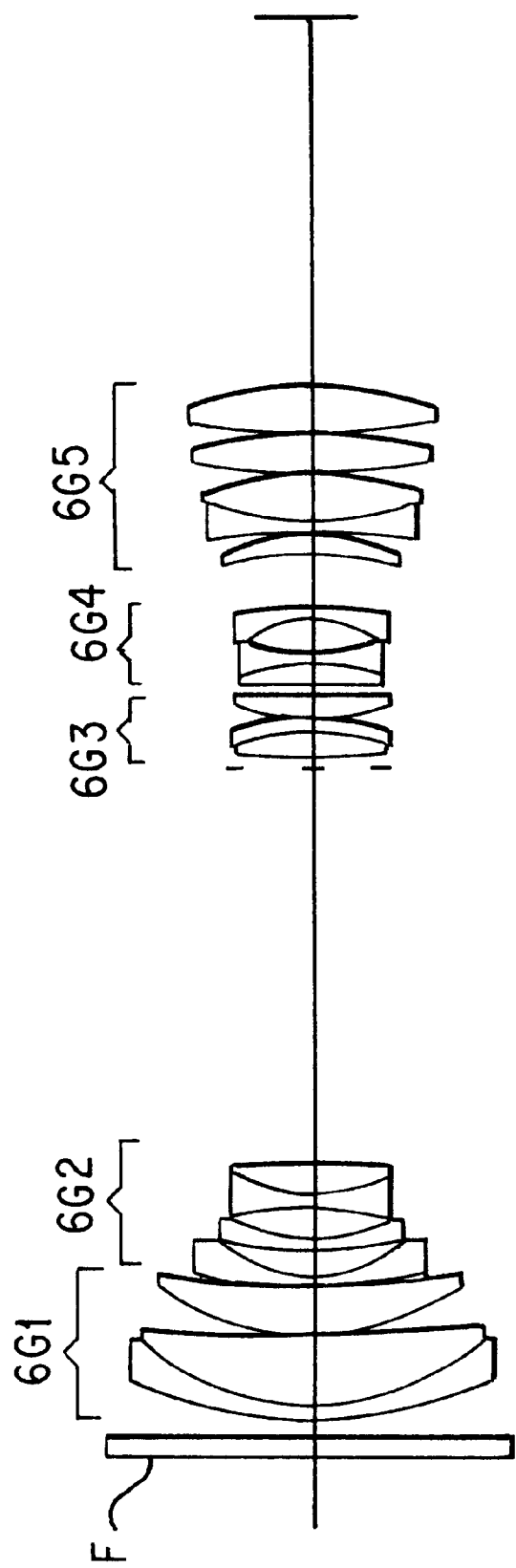
FIG. 17 is a side schematic drawing illustrating a lens structure according to a sixth preferred embodiment of the invention.

FIG. 17 illustrates a lens structure for a zoom lens according to a sixth preferred embodiment of the invention.

A filter F comprising a parallel plate is provided on the object side of the first lens group 6G1 for the zoom lens of FIG. 17. The first lens group 6G1 comprises a cemented positive lens, which comprises a negative meniscus lens with a weak curvature convex surface facing the object side and a positive meniscus lens with a strong curvature convex surface facing the object side; and a positive meniscus lens with a strong curvature convex surface facing the object side.

The second lens group 6G2 comprises a negative meniscus lens with a weak curvature convex surface facing the object side; a negative meniscus lens with a weak curvature convex surface facing the object side; and a cemented positive lens, which comprises a biconcave lens and a biconvex lens.

The third lens group 6G3 comprises a cemented positive lens, which comprises a biconvex lens and a negative meniscus lens with a strong curvature concave surface facing the object side; and a biconvex lens.

The fourth lens group 6G4 comprises a cemented negative lens, which comprises a biconvex lens and a biconcave lens; and a negative meniscus lens with a strong curvature concave surface facing the object side.

The fifth lens group 6G5 comprises a positive meniscus lens with a weak curvature concave surface facing the object side; a cemented positive lens, which includes a biconcave lens and a biconvex lens; a biconvex lens; and a biconvex lens.

The zoom lens of the sixth preferred embodiment has a zoom ratio of about 500% and 13 groups and 18 individual pieces. Characteristics of the sixth preferred embodiment include a structure where the refractive power of the first lens group 6G1 is strong, the refractive powers of the second lens group 6G2 and the fourth lens group 6G4 are strong, and the lens arrangement and shape of the fifth lens group 6G5.

Next, values of various dimensions in the sixth preferred embodiment of the invention are listed in Table 6. In Table 6, f denotes a focal length, FN denotes a F-number, 2ω denotes a field angle, Bf denotes a back focus, β denotes a shooting magnification, and D0 denotes an object point distance. The surface number is the order of the lens surface from the object side in the direction of travel of a light ray. The values of the refraction index and Abbe's number are relative to a d-line (λ=587.6 nm).

TABLE 6 f = 12.7~72.7
FN = 2.2~3.4
2ω = 46.50°~8.86°

| Surface Number | Radius of Curvature | Intersurface Distance | Refractive Index | Abbe Number |
|---|---|---|---|---|
| 1 | ∞ | 2.000 | 1.51680 | 64.1 |
| 2 | ∞ | 2.000 | | |
| 3 | 47.091 | 1.500 | 1.80518 | 25.3 |
| 4 | 28.500 | 7.500 | 1.54739 | 53.5 |
| 5 | 270.106 | 0.200 | | |
| 6 | 26.942 | 5.200 | 1.62041 | 60.1 |
| 7 | 91.449 | (d7 = variable) | | |
| 8 | 62.736 | 1.000 | 1.71300 | 53.9 |
| 9 | 15.069 | 3.000 | | |
| 10 | 41.510 | 1.000 | 1.77279 | 49.5 |
| 11 | 18.905 | 3.500 | | |
| 12 | -37.673 | 1.000 | 1.74950 | 35.2 |
| 13 | 15.500 | 3.800 | 1.80518 | 25.3 |
| 14 | -119.439 | (d14 = variable) | | |
| 15 | 71.001 | 3.000 | 1.49782 | 82.5 |
| 16 | -20.000 | 1.000 | 1.80518 | 25.3 |
| 17 | -33.601 | 0.200 | | |
| 18 | 30.577 | 2.700 | 1.49782 | 82.5 |
| 19 | -278.221 | (d19 = variable) | | |
| 20 | 502.459 | 2.500 | 1.80518 | 25.3 |
| 21 | -16.000 | 1.000 | 1.59319 | 67.9 |
| 22 | 21.384 | 4.000 | | |
| 23 | -11.690 | 1.000 | 1.59319 | 67.9 |

TABLE 6-continued

| 24 | -50.510 | (d24 = variable) | | |
|---|---|---|---|---|
| 25 | -41.055 | 2.000 | 1.62041 | 60.1 |
| 26 | -23.001 | 0.200 | | |
| 27 | -85.053 | 1.000 | 1.80518 | 25.3 |
| 28 | 27.072 | 5.500 | 1.49782 | 82.5 |
| 29 | -33.575 | 0.200 | | |
| 30 | 74.549 | 4.000 | 1.49782 | 82.5 |
| 31 | -56.592 | 0.200 | | |
| 32 | 61.637 | 5.200 | 1.49782 | 82.5 |
| 33 | -37.751 | Bf | | |

Variable Interval During Zooming

| β | -0.020 | -0.025 | -0.040 | -0.060 | -0.080 | -0.100 |
|---|---|---|---|---|---|---|
| D0 | 594.080 | 594.080 | 594.080 | 594.080 | 594.080 | 594.080 |
| d7 | 0.041 | 3.593 | 7.501 | 10.782 | 12.805 | 14.345 |
| d14 | 44.537 | 39.255 | 31.084 | 23.798 | 18.589 | 14.117 |
| d19 | 0.686 | 2.130 | 8.296 | 13.384 | 17.246 | 20.308 |
| d24 | 6.007 | 6.292 | 4.389 | 3.307 | 2.631 | 2.501 |
| Bf | 40.473 | 40.473 | 40.473 | 40.473 | 40.473 | 40.473 |

Condition Corresponding Values

| f1 = | 45.000 | βw1 = | -0.0811 | βc1 = | -0.8111 | βt1 = | -0.811 |
|---|---|---|---|---|---|---|---|
| f2 = | -14.000 | βw2 = | -0.5489 | βc2 = | -1.0000 | βt2 = | -1.2497 |
| f3 = | 30.000 | βw3 = | -0.6475 | βc3 = | -1.0000 | βt3 = | -1.1663 |
| f4 = | -19.000 | βw4 = | -0.8417 | βc4 = | -1.0000 | βt4 = | -1.0262 |
| f5 = | 23.500 | βw5 = | -0.8246 | βc5 = | -0.8246 | βt5 = | -0.8246 |
| fw = | 12.734 | βw = | -0.0200 | βc = | -0.0669 | βt = | -0.1000 |
| ft = | 72.682 | Φ = | 15.4 | | | | |

| (1) | (1/f1 + 1/f2)fw = | -0.626594 |
|---|---|---|
| (2) | (1/f4 + 1/f5)fw = | -0.128338 |
| (3) | Φ/f3 = | 0.51333 |
| (8) | f2/f4 = | 0.73684 |
| (9) | β1/β5 = | 0.09835 |
| (10) | fw/f12 = | -0.44180 |
| (11) | fw/f45 = | 0.35762 |
| (12) | ft/f12 = | -0.87146 |
| (13) | ft/f45 = | 1.46543 |

FIGS. 18a–19d are various aberration graphs for the sixth embodiment relative to a d-line (λ=587.6 nm) and a g-line (λ=435.8 nm). FIGS. 18a–18d are various aberration graphs at a maximum wide-angle or closest-distance focusing state. FIGS. 19a–19d are various aberration graphs at maximum telephoto or farthest-distance focusing state.

Figure 20:
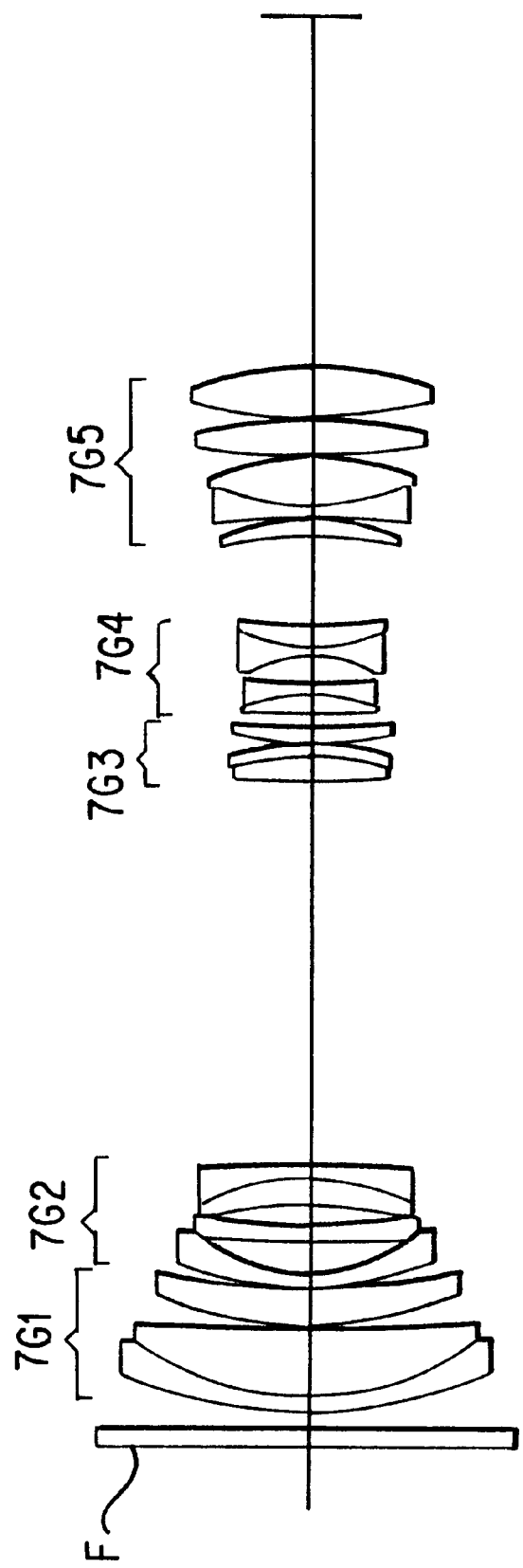
FIG. 20 is a side schematic drawing illustrating a lens structure according to a seventh preferred embodiment of the invention.

FIG. 20 illustrates a lens structure for a zoom lens according to a seventh preferred embodiment of the invention. A filter F comprising a parallel plate is provided on the object side of the first lens group 7G1 for the zoom lens of FIG. 20. The first lens group 7G1 comprises a cemented positive lens, which comprises a negative meniscus lens with a weak curvature convex surface facing the object side and a positive meniscus lens with a strong curvature convex surface facing the object side; and a positive meniscus lens with a strong curvature convex surface facing the object side.

The second lens group 7G2 comprises a negative meniscus lens with a weak curvature convex surface facing the object side; a negative meniscus lens with a weak curvature convex surface facing the object side; and a cemented negative lens, which comprises a positive meniscus lens with a weak curvature concave surface facing the object side and a negative meniscus lens with a strong curvature concave surface facing the object side.

The third lens group 7G3 comprises a cemented positive lens, which comprises a biconvex lens and a negative meniscus lens with a strong curvature concave surface facing the object side.

The fourth lens group 7G4 comprises a cemented negative lens, which comprises a positive meniscus lens with a weak curvature concave surface facing the object side and a biconcave lens; and a cemented negative lens, which includes a biconcave lens and a positive meniscus lens with a strong curvature convex surface facing the object side.

The fifth lens group 7G5 comprises a positive meniscus lens with a weak curvature concave surface facing the object side; a cemented positive lens, which comprises a biconcave lens and a biconvex lens; a biconvex lens; and a biconvex lens.

The zoom lens of the seventh preferred embodiment has a zoom ratio of about 600% and 13 groups with 19 individual pieces. Characteristics of the seventh preferred embodiment include an appropriate refractive power, lens shape and arrangement for the second lens group 7G2, and the refractive power distribution for the fourth lens group 7G4.

Next, values of various dimensions in the seventh preferred embodiment of the invention are listed in Table 7. In Table 7, f denotes a focal length, FN denotes a F-number, $2\omega$ denotes a field angle, Bf denotes a back focus, $\beta$ denotes a shooting magnification, and D0 denotes a object point distance. The surface number is the order of the lens surface from the object side in the direction of travel of a light ray. The values of the refraction index and Abbe's number are relative to a d-line ($\lambda$=587.6 nm).

TABLE 7 f = 14.9~101.8
FN = 2.0~3.8
$2\omega$ = 40.50°~6.66°

| Surface Number | Radius of Curvature | Intersurface Distance | Refractive Index | Abbe Number |
|---|---|---|---|---|
| 1 | ∞ | 2.000 | 1.51680 | 64.1 |
| 2 | ∞ | 2.000 | | |
| 3 | 51.026 | 1.500 | 1.80518 | 25.4 |
| 4 | 30.000 | 8.000 | 1.62374 | 47.1 |
| 5 | 448.606 | 0.200 | | |
| 6 | 39.234 | 4.000 | 1.65128 | 38.2 |
| 7 | 81.032 | (d7 = variable) | | |
| 8 | 46.818 | 1.200 | 1.71700 | 48.1 |
| 9 | 18.714 | 4.000 | | |
| 10 | 226.333 | 1.200 | 1.76684 | 46.8 |
| 11 | 54.379 | 3.000 | | |
| 12 | −43.849 | 2.800 | 1.79668 | 45.4 |
| 13 | −25.000 | 1.100 | 1.69680 | 55.6 |
| 14 | −982.240 | (d14 = variable) | | |
| 15 | 81.859 | 2.700 | 1.49782 | 82.6 |
| 16 | −26.500 | 1.000 | 1.80518 | 25.4 |
| 17 | −35.246 | 0.200 | | |
| 18 | 29.453 | 2.000 | 1.49782 | 82.6 |
| 19 | 125.3891 | (d19 = variable) | | |
| 20 | −335.750 | 2.000 | 1.80518 | 25.4 |
| 21 | −20.000 | 1.000 | 1.62041 | 60.1 |
| 22 | 48.402 | 3.400 | | |
| 23 | −15.325 | 1.000 | 1.62041 | 60.1 |
| 24 | 18.102 | 2.500 | 1.75520 | 27.6 |
| 25 | 78.390 | (d25 = variable) | | |
| 26 | −38.823 | 2.000 | 1.76684 | 46.8 |
| 27 | −25.492 | 0.200 | | |
| 28 | −75.372 | 1.000 | 1.80518 | 25.4 |
| 29 | 24.759 | 5.500 | 1.49782 | 82.6 |
| 30 | −37.686 | 0.200 | | |
| 31 | 76.558 | 3.800 | 1.49782 | 82.6 |
| 32 | −58.196 | 0.200 | | |
| 33 | 40.937 | 5.800 | 1.49782 | 82.6 |
| 34 | −40.425 | Bf | | |

Variable Interval During Zooming

| β | −0.020 | −0.025 | −0.040 | −0.050 | −0.080 | −0.120 |
|---|---|---|---|---|---|---|
| D0 | 693.295 | 693.295 | 693.295 | 693.295 | 693.295 | 693.295 |
| d7 | 0.244 | 3.118 | 8.655 | 10.766 | 14.717 | 17.070 |

TABLE 7-continued

| d14 | 43.831 | 38.671 | 28.133 | 23.510 | 13.925 | 6.660 |
|---|---|---|---|---|---|---|
| d19 | 1.598 | 4.685 | 11.262 | 14.727 | 22.432 | 30.152 |
| d25 | 10.295 | 9.495 | 7.919 | 6.964 | 4.894 | 2.086 |
| Bf | 39.671 | 39.671 | 39.671 | 39.671 | 39.671 | 39.671 |

Condition Corresponding Values

| f1 = | 58.837 | $\beta$w1 = | −0.0921 | $\beta$c1 = | −0.0921 | $\beta$t1 = | −0.0921 |
|---|---|---|---|---|---|---|---|
| f2 = | −20.000 | $\beta$w2 = | −0.6071 | $\beta$c2 = | −1.0000 | $\beta$t2 = | −1.2409 |
| f3 = | 33.073 | $\beta$w3 = | −0.6453 | $\beta$c3 = | −1.0000 | $\beta$t3 = | −1.2361 |
| f4 = | −20.000 | $\beta$w4 = | −0.7709 | $\beta$c4 = | −1.0000 | $\beta$t4 = | −1.1813 |
| f5 = | 24.133 | $\beta$w5 = | −0.7192 | $\beta$c5 = | −0.7192 | $\beta$t5 = | −0.7192 |
| fw = | 14.909 | $\beta$w = | −0.0200 | $\beta$c = | −0.0662 | $\beta$t = | −0.1200 |
| ft = | 101.848 | $\Phi$ = | 15.87 | | | | |

| (1) | (1/f1 + 1/f2)fw = | −0.492055 |
|---|---|---|
| (2) | (1/f4 + 1/f5)fw = | −0.008563 |
| (3) | $\Phi$/f3 = | 0.479847 |
| (8) | f2/f4 = | 1.00000 |
| (9) | $\beta$1/$\beta$5 = | 0.1281 |
| (10) | fw/f12 = | −0.34874 |
| (11) | fw/f45 = | 0.56028 |
| (12) | ft/f12 = | −0.92608 |
| (13) | ft/f45 = | 2.09534 |

FIGS. 21a–22d are various aberration graphs for the seventh preferred embodiment relative to a d-line ($\lambda$=587.6 nm) and a g-line ($\lambda$=435.8 nm). FIGS. 21a–22d are various aberrations at a maximum wide-angle or closest-distance focusing state. FIGS. 22a–22d are various aberration graphs at a maximum telephoto or farthest-distance focusing state.

Figure 23:
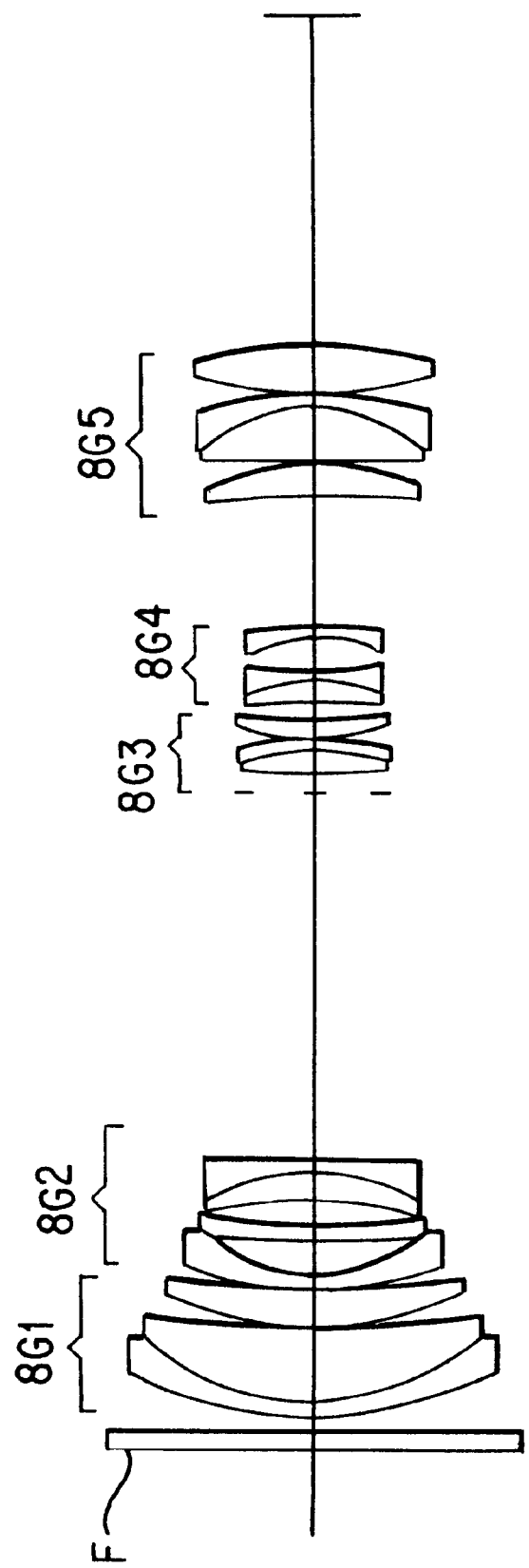
FIG. 23 is a side schematic drawing illustrating a lens structure according to an eighth preferred embodiment of the present invention.
Figure 24:
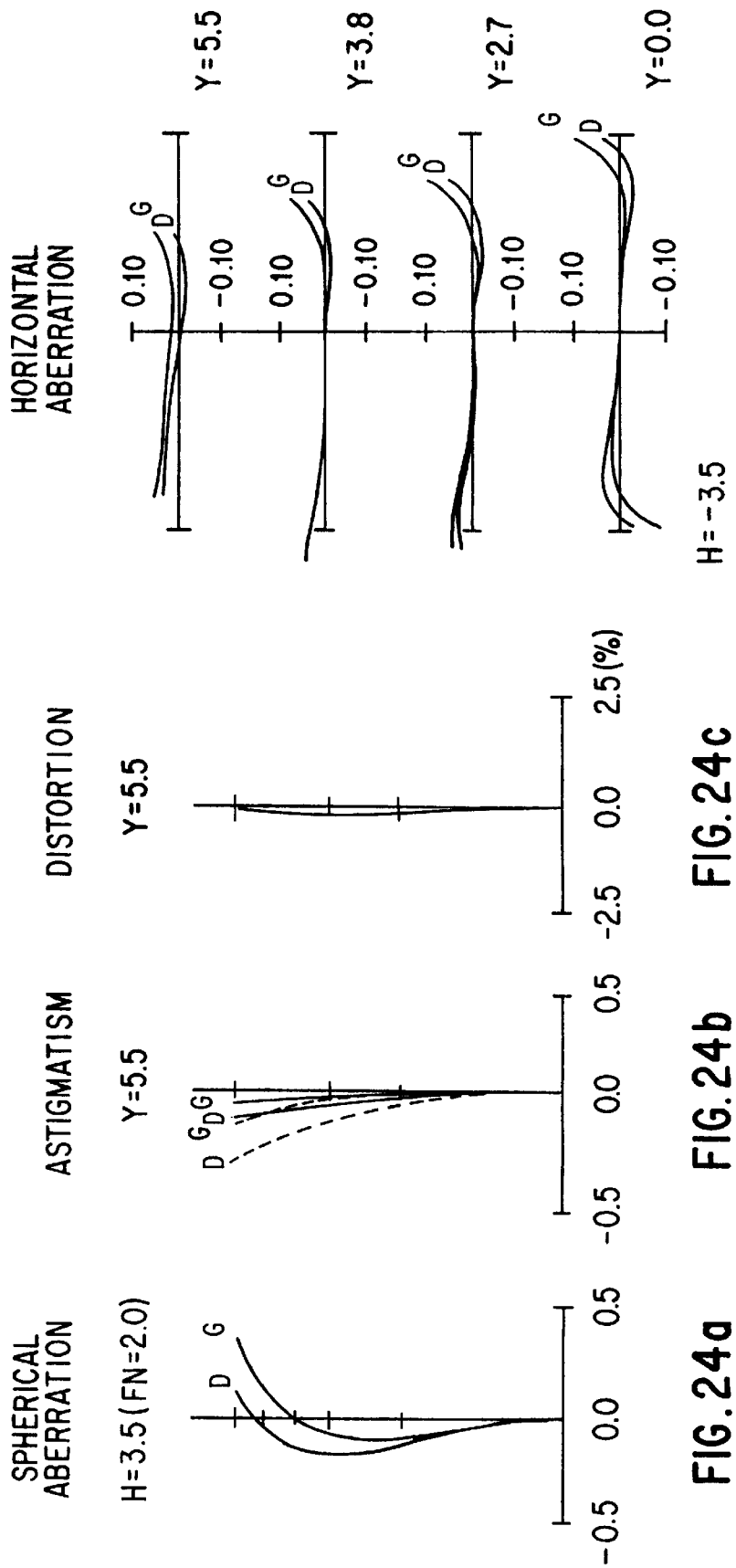
FIGS. 24a–24d are various aberration graphs at a maximum wide-angle state for the eighth preferred embodiment.
Figure 25:
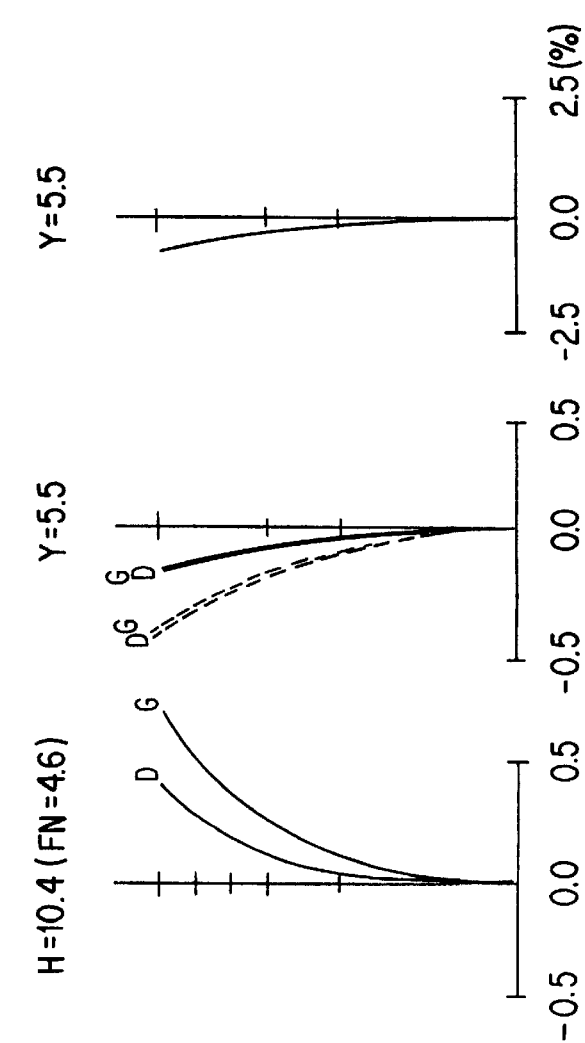
FIGS. 25a–25d are various aberration graphs at a maximum telephoto state for the eighth preferred embodiment.

FIG. 23 illustrates a lens structure for a zoom lens according to an eighth preferred embodiment of the invention.

A filter F comprising a parallel plate is provided on the object side of the first lens group 8G1 for the zoom lens of FIG. 23. The first lens group 8G1 comprises a cemented positive lens, which includes a negative meniscus lens with a weak curvature convex surface facing the object side and a positive meniscus lens with a strong curvature convex surface facing the object side; and a positive meniscus lens with a strong curvature convex surface facing the object side.

The second lens group 8G2 comprises a negative meniscus lens with a weak curvature convex surface facing the object side; a negative meniscus lens with a weak curvature convex surface facing the object side; and a cemented negative lens, which comprises a positive meniscus lens with a weak curvature concave surface facing the object side and a negative meniscus lens with a strong curvature concave surface facing the object side.

The third lens group 8G3 comprises a cemented positive lens, which includes a biconvex lens and a negative meniscus lens with a strong curvature concave surface facing the object side; and a positive meniscus lens with a strong convex surface facing the object side.

The fourth lens group 8G4 comprises a cemented negative lens, which includes a positive meniscus lens with a weak curvature concave surface facing the object side and a biconcave lens; and a negative meniscus lens with a strong curvature concave surface facing the object side.

The fifth lens group 8G5 comprises a positive meniscus lens with a weak curvature concave surface facing the object side; a cemented positive lens which comprises a biconvex lens and a negative meniscus lens with a strong curvature concave surface facing the object side; and a biconvex lens.

The zoom lens of the eighth preferred embodiment has a zoom ratio of about 700% and 12 groups with 17 individual pieces. Characteristics of the eighth preferred embodiment include an appropriate refractive power for the second lens group 8G2, and a lens arrangement and shape of the fifth lens group 8G5.

Next, values of various dimensions in the eighth preferred embodiment of the invention are listed in Table 8. In Table 8, f denotes a focal length, FN denotes F-number, $2\omega$ denotes a field angle, Bf denotes a back focus, $\beta$ denotes a shooting magnification, and D0 denotes a object point distance. The surface number is the order of the lens surface from the object side in the direction of travel of a light ray. The values of the refraction index and Abbe's number are relative to a d-line ($\lambda=587.6$ nm).

TABLE 8 f = 14.9~109.0
FN = 2.0~4.6
$2\omega$ = 40.52°~5.80°

| Surface Number | Radius of Curvature | Intersurface Distance | Refractive Index | Abbe Number |
|---|---|---|---|---|
| 1 | ∞ | 2.000 | 1.51680 | 64.1 |
| 2 | ∞ | 2.000 | | |
| 3 | 43.517 | 1.500 | 1.80518 | 25.3 |
| 4 | 27.800 | 8.000 | 1.62041 | 60.1 |
| 5 | 129.101 | 0.200 | | |
| 6 | 37.068 | 4.000 | 1.65160 | 58.5 |
| 7 | 83.553 | (d7 = variable) | | |
| 8 | 48.423 | 1.200 | 1.74810 | 52.3 |
| 9 | 17.371 | 4.300 | | |
| 10 | 226.333 | 1.200 | 1.77279 | 49.5 |
| 11 | 54.698 | 3.000 | | |
| 12 | −47.941 | 3.200 | 1.80518 | 25.3 |
| 13 | −20.000 | 1.100 | 1.69680 | 55.6 |
| 14 | −348.221 | (d14 = variable) | | |
| 15 | 81.859 | 2.700 | 1.49782 | 82.5 |
| 16 | −23.500 | 1.000 | 1.80518 | 25.3 |
| 17 | −32.456 | 0.200 | | |
| 18 | 26.736 | 2.000 | 1.49782 | 82.5 |
| 19 | 78.605 | (d19 = variable) | | |
| 20 | −182.084 | 2.500 | 1.80518 | 25.3 |
| 21 | −19.200 | 1.000 | 1.61720 | 54.0 |
| 22 | 37.820 | 3.900 | | |
| 23 | −15.770 | 1.000 | 1.74400 | 45.0 |
| 24 | −78.341 | (d19 = variable) | | |
| 25 | −75.571 | 3.500 | 1.79631 | 40.9 |
| 26 | −26.078 | 0.200 | | |
| 27 | 620.811 | 6.000 | 1.49782 | 82.5 |
| 28 | −17.400 | 1.200 | 1.80518 | 25.3 |
| 29 | −41.721 | 0.200 | | |
| 30 | 43.004 | 5.0 | 1.49782 | 82.5 |
| 31 | −51.348 | Bf | | |

Variable Interval During Zooming

| $\beta$ | −0.020 | −0.040 | −0.050 | −0.080 | −0.100 | −0.140 |
|---|---|---|---|---|---|---|
| D0 | 694.036 | 694.036 | 694.036 | 694.036 | 694.036 | 694.036 |
| d7 | 0.235 | 7.933 | 10.283 | 14.558 | 16.083 | 15.969 |
| d14 | 42.624 | 27.726 | 22.926 | 12.940 | 8.645 | 5.358 |
| d19 | 1.781 | 12.032 | 15.291 | 22.745 | 26.762 | 35.491 |
| d24 | 14.509 | 11.458 | 10.649 | 8.906 | 7.659 | 2.331 |
| Bf | 36.917 | 36.917 | 36.917 | 36.917 | 36.917 | 36.917 |

Condition Corresponding Values

| f1 = | 58.837 | $\beta w1$ = | −0.0921 | $\beta c1$ = | −0.0921 | $\beta t1$ = | −0.0921 |
|---|---|---|---|---|---|---|---|
| f2 = | −20.000 | $\beta w2$ = | −0.6071 | $\beta c2$ = | −1.0000 | $\beta t2$ = | −1.1621 |
| f3 = | 33.073 | $\beta w3$ = | −0.6453 | $\beta c3$ = | −1.0000 | $\beta t3$ = | −1.3184 |
| f4 = | −20.000 | $\beta w4$ = | −0.7709 | $\beta c4$ = | −1.0000 | $\beta t4$ = | −1.3796 |
| fs = | 24.133 | $\beta w5$ = | −0.7191 | $\beta c5$ = | −0.7191 | $\beta t5$ = | −0.7191 |
| fw = | 14.909 | $\beta w$ = | −0.0200 | $\beta c$ = | −0.0662 | $\beta t$ = | −0.1400 |
| ft = | 101.848 | $\Phi$ = | 15.87 | | | | |

| (1) | (1/f1 + 1/f2)fw = | −0.492055 |
|---|---|---|
| (2) | (1/f4 + 1/f5)fw = | −0.008563 |
| (3) | $\Phi$/f3 = | 0.48075 |
| (8) | f2/f4 = | 1.00000 |
| (9) | $\beta 1/\beta 5$ = | 0.1281 |

TABLE 8-continued

| (10) | fw/f12 = | −0.34874 |
|---|---|---|
| (11) | fw/f45 = | 0.56028 |
| (12) | ft/f12 = | −1.09185 |
| (13) | ft/f45 = | 1.34560 |

FIGS. 24*a*–25*d* are various aberration graphs for the eighth preferred embodiment relative to a d-line ($\lambda=587.6$ nm) and a g-line ($\lambda=435.8$ nm). FIGS. 24*a*–24*d* are various aberration graphs at a maximum wide-angle or closest-distance focusing state. FIGS. 25*a*–25*d* are various aberration graphs at a maximum telephoto or farthest-distance focusing state.

Another criteria, other than condition (7), may be introduced as a tolerance range for the lens arrangement, where the second lens group G2, third lens group G3 and fourth lens group G4 simultaneously attain equal magnification. In other words, another desirable criteria for the tolerance on the region of the simultaneous equal magnification arrangement may be provided. For this combined magnification |$\beta c2 \beta c3 \beta c4$| of the zooming unit satisfies condition (14) when at least one of the magnifications $\beta c2$, $\beta c3$, $\beta c4$ of the second lens group G2 through fourth lens group G4 attains equal magnification:

$$0.95 < |\beta c2 \beta c3 \beta c4| < 1.05 \qquad (14)$$

If |$\beta c2 \beta c3 \beta c4$| is larger than the upper limit of condition (14), the region where a zoom solution does not exist expands from a maximum telephoto state. This causes the region where focus is fixed by zooming to become small.

On the other hand, if $\beta c2 \beta c3 \beta c4$ is smaller than the lower limit of condition (14), the region where zoom solution does not exist expands from a maximum wide-angle state. This causes the region where focus is fixed by zooming to become small. When the region where zoom solution does not exist expands, continuous zooming becomes impossible.

However, if the system is not used in a continuous manner, and only a maximum wide-angle state and maximum telephoto state are used so that an intermediate focal length region is not necessary, then the upper limit and the lower limit of condition (14) will naturally change. Moreover, a practical functioning of the zoom lens will not decrease even if the region where a zoom solution does not exist expands.

Figure 26:
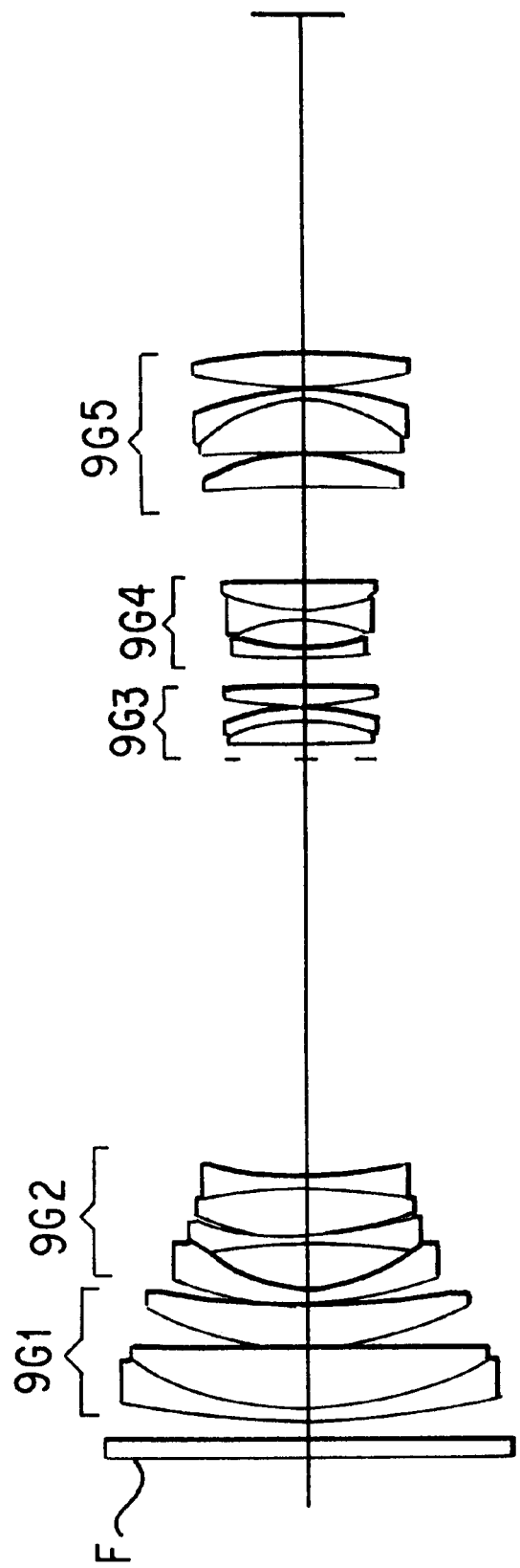
FIG. 26 is a side schematic drawing illustrating a lens structure according to a ninth preferred embodiment of the present invention.
Figures 28A, 28B, 28C, 28D:
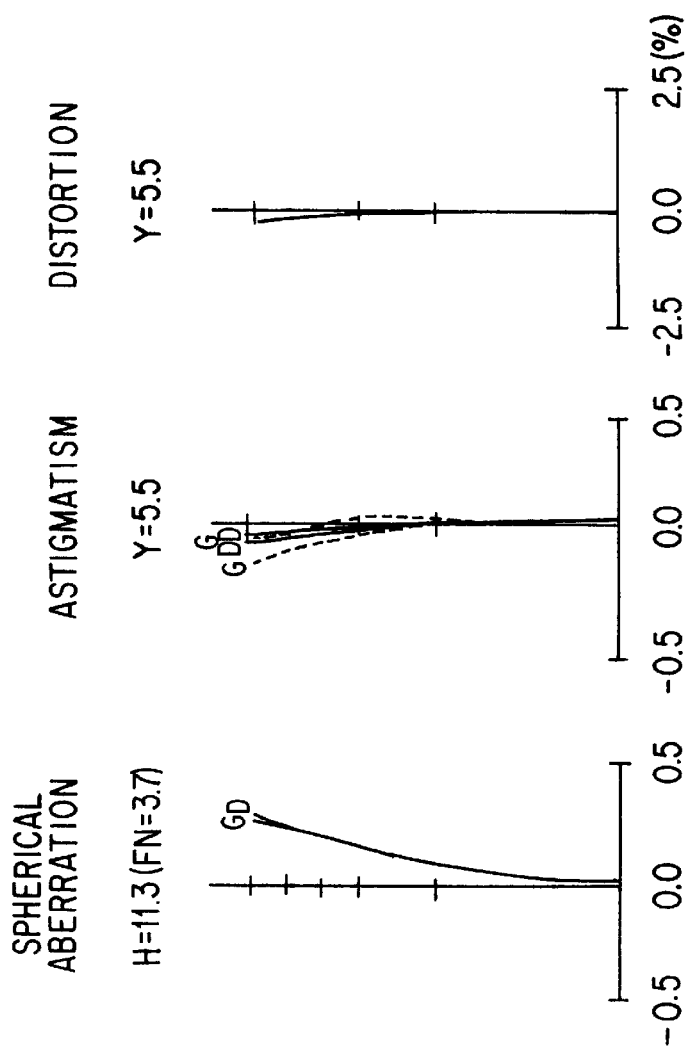
FIGS. 28a–28d are various aberration graphs at a maximum telephoto state for the ninth preferred embodiment.

FIG. 26 illustrates a lens structure for a zoom lens in the ninth preferred embodiment of the invention.

A filter F comprising a parallel plate is provided on the object side of the first lens group 9G1 for the zoom lens of FIG. 26. The first lens group 9G1 comprises a cemented positive lens, which comprises a negative meniscus lens with a weak curvature convex surface facing the object side and a positive meniscus lens with a strong curvature convex surface facing the object side; and a positive meniscus lens with a strong curvature convex surface facing the object side.

The second lens group 9G2 comprises a negative meniscus lens with a weak curvature convex surface facing the object side; a biconcave lens; and a cemented positive lens that includes a biconcave lens and a biconvex lens.

The third lens group 9G3 comprises a cemented positive lens, which comprises a biconvex lens and a negative meniscus lens with a strong curvature concave surface facing the object side; and a biconvex lens.

The fourth lens group 9G4 comprises a negative meniscus lens with a weak curvature convex surface facing the object side; and a cemented negative lens, which includes a biconcave lens and a biconvex lens.

The fifth lens group 9G5 comprises a positive meniscus lens with a weak curvature concave surface facing the object side; a cemented positive lens, which includes a biconvex lens and a negative meniscus lens with a weak curvature surface facing the object side; and a biconvex lens.

The zoom lens in the ninth preferred embodiment has a zoom ratio of about 600% and has 12 groups with 17 individual pieces. Characteristics of the ninth preferred embodiment include the lens arrangement of the second lens group 9G2 and the fifth lens group 9G5.

Next, values of various dimensions in the ninth preferred embodiment of the invention are listed in Table 9. In Table 9, f denotes a focal length, FN denotes a F-number, $2\omega$ denotes a field angle, Bf denotes a back focus, $\beta$ denotes a shooting magnification, and D0 denotes an object point distance. The surface number is the order of the lens surface from the object side in the direction of travel of a light ray. The values of the refraction index and Abbe's number are relative to a d-line ($\lambda$=587.6 nm).

TABLE 9 f = 14.9~101.1
FN = 2.1~3.7
$2\omega$ = 40.54°~6.56°

| Surface Number | Radius of Curvature | Intersurface Distance | Refractive Index | Abbe Number |
|---|---|---|---|---|
| 1 | ∞ | 2.000 | 1.51680 | 64.1 |
| 2 | ∞ | 2.000 | | |
| 3 | 84.814 | 1.500 | 1.80518 | 25.4 |
| 4 | 38.000 | 6.500 | 1.69350 | 53.8 |
| 5 | 713.145 | 0.200 | | |
| 6 | 34.914 | 4.500 | 1.67025 | 57.6 |
| 7 | 84.063 | (d7 = variable) | | |
| 8 | 44.392 | 1.200 | 1.74810 | 52.3 |
| 9 | 17.923 | 5.300 | | |
| 10 | −80.515 | 1.100 | 1.74810 | 52.3 |
| 11 | 39.416 | 0.200 | | |
| 12 | 33.39,5 | 5.000 | 1.80518 | 25.4 |
| 13 | −55.000 | 1.000 | 1.77279 | 49.4 |
| 14 | 40.347 | (d14 = variable) | | |
| 15 | 85.366 | 2.700 | 1.49782 | 82.6 |
| 16 | −26.000 | 1.000 | 1.80518 | 25.4 |
| 17 | −45.897 | 0.200 | | |
| 18 | 35.440 | 2.600 | 1.49782 | 82.6 |
| 19 | −98.669 | (d19 = variable) | | |
| 20 | 40.094 | 1.100 | 1.62041 | 60.3 |
| 21 | 19.460 | 3.600 | | |
| 22 | −15.929 | 1.100 | 1.61720 | 54.0 |
| 23 | 22.151 | 2.600 | 1.80518 | 25.4 |
| 24 | −24810.241 | (d19 = variable) | | |
| 25 | −120.081 | 3.500 | 1.79668 | 45.4 |
| 26 | −27.887 | 0.200 | | |
| 27 | 1148.998 | 5.500 | 1.49782 | 82.6 |
| 28 | −17.500 | 1.000 | 1.80518 | 25.4 |
| 29 | −42.177 | 0.200 | | |
| 30 | 45.122 | 4.000 | | |
| 31 | −57.782 | Bf | | |

Variable Interval During Zooming

| $\beta$ | −0.020 | −0.040 | −0.050 | −0.090 | −0.100 | −0.120 |
|---|---|---|---|---|---|---|
| D0 | 692.838 | 692.838 | 692.838 | 692.838 | 692.838 | 692.838 |
| d7 | 0.545 | 10.032 | 12.459 | 16.773 | 18.670 | 19.511 |
| d14 | 47.610 | 31.222 | 26.297 | 16.196 | 11.070 | 8.131 |
| d19 | 2.874 | 11.638 | 14.811 | 22.159 | 25.864 | 29.544 |
| d25 | 10.532 | 8.669 | 7.995 | 6.433 | 5.965 | 4.374 |
| Bf | 37.387 | 37.387 | 37.387 | 37.387 | 37.387 | 37.387 |

Condition Corresponding Values

| f1 = | 58.837 | $\beta$w1 = | −0.0921 | $\beta$c1 = | −0.0921 | $\beta$t1 = | −0.0921 |
|---|---|---|---|---|---|---|---|
| f2 = | −19.300 | $\beta$w2 = | −0.5691 | $\beta$c2 = | −1.0000 | $\beta$t2 = | −1.2914 |
| f3 = | 33.073 | $\beta$w3 = | −0.6344 | $\beta$c3 = | −1.0000 | $\beta$t3 = | −1.2436 |
| f4 = | −21.096 | $\beta$w4 = | −0.8366 | $\beta$c4 = | −1.0000 | $\beta$t4 = | −1.1285 |
| f5 = | 24.210 | $\beta$w5 = | −0.7191 | $\beta$c5 = | −0.7191 | $\beta$t5 = | −0.7191 |

TABLE 9-continued

| fw = | 14.850 | $\beta$w = | −0.0200 | $\beta$c = | −0.0662 | $\beta$t = | −0.1200 |
|---|---|---|---|---|---|---|---|
| ft = | 101.114 | $\Phi$ = | 15.7 | | | | |
| | (3) | | $\Phi$/f3 = | | 0.47471 | | |
| | (9) | | $\beta$1/$\beta$5 = | | 0.1281 | | |
| | (8) | | f2/f4 = | | 0.91487 | | |

FIGS. 27a–28d are various aberration graphs for the ninth preferred embodiment relative to a d-line ($\lambda$=587.6 nm) and a g-line ($\lambda$=435.8 nm). FIGS. 27a–27d are various aberrations at a maximum wide-angle or closest-distance focusing state. FIGS. 28a–28d are various aberration graphs at a maximum telephoto or farthest-distance focusing state.

Figure 29:
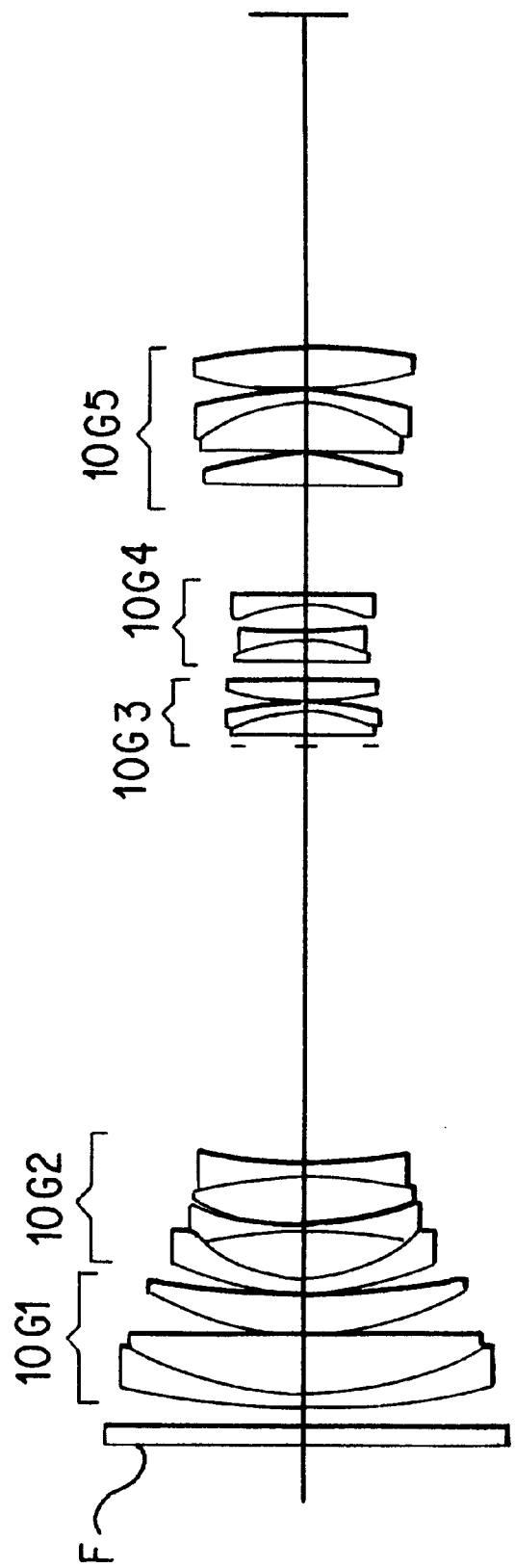
FIG. 29 is a side schematic drawing illustrating a lens structure according to a tenth preferred embodiment of the invention.
Figure 30:
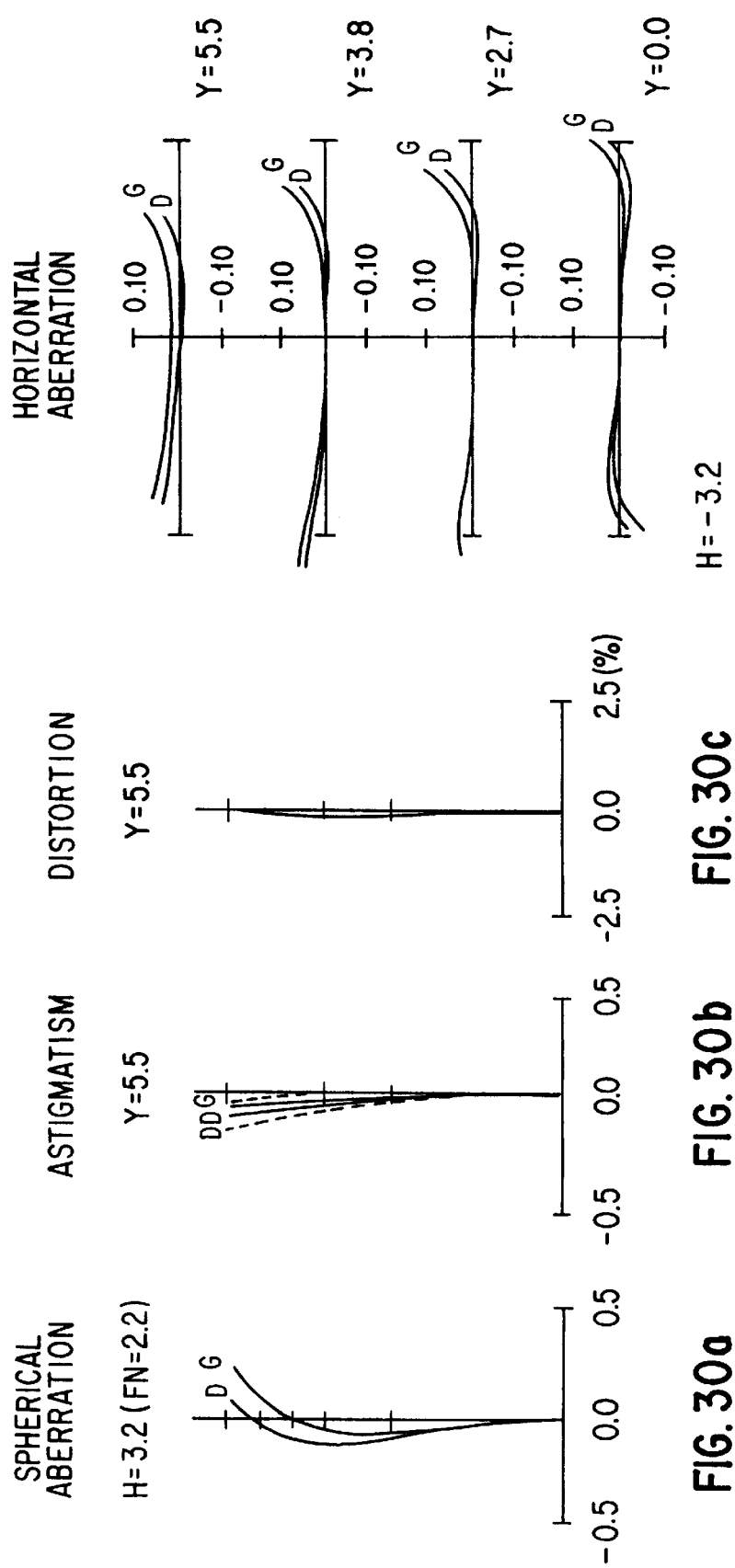
FIGS. 30a–30d are various aberration graphs at a maximum wide-angle state for the tenth preferred embodiment.
Figure 31:
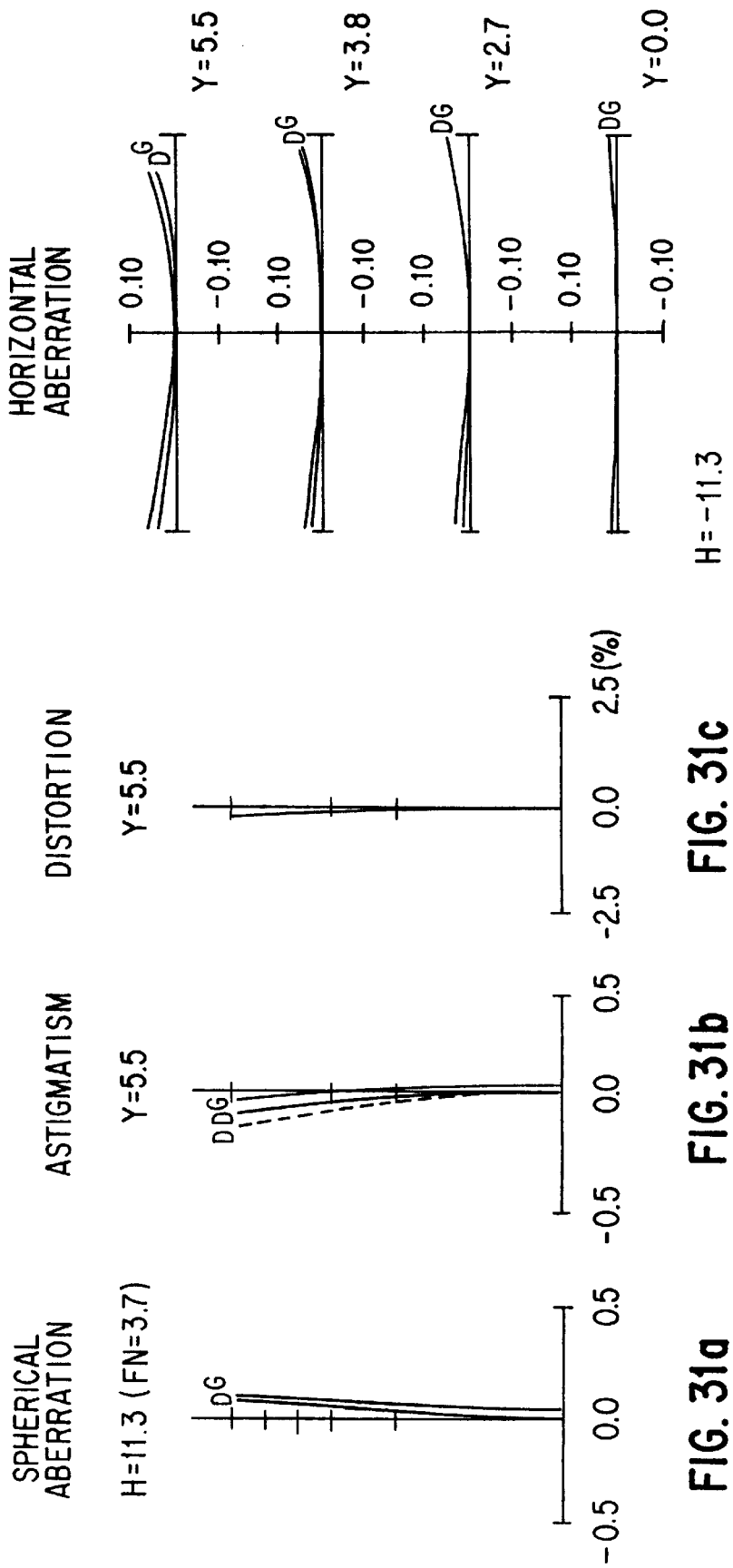
FIGS. 31a–31d are various aberration graphs at a maximum telephoto state for the tenth preferred embodiment.

FIG. 29 illustrates a lens structure of a zoom lens according to a tenth preferred embodiment of the invention.

A filter F comprising a parallel plate is provided on the object side of the first lens group 10G1 for the zoom lens of FIG. 29. The first lens group 10G1 comprises a cemented positive lens, which includes a negative meniscus lens with a weak curvature convex surface facing the object side and a positive meniscus lens with a strong curvature convex surface facing the object side; and a positive meniscus lens with a strong curvature convex surface facing the object side.

The second lens group 10G2 comprises a negative meniscus lens with a weak curvature convex surface facing the object side; a biconcave lens; and a positive cemented lens, which comprises a biconvex lens and a biconcave lens.

The third lens group 10G3 comprises a cemented positive lens, which includes a biconvex lens and a negative meniscus lens with a strong curvature concave surface facing the object side; and a biconvex lens.

The fourth lens group 10G4 comprises a cemented negative lens, which includes a positive meniscus lens with a strong curvature concave surface facing the object side and a biconcave lens; and a negative meniscus lens with a strong curvature concave surface facing the object side.

The fifth lens group 10G5 comprises a positive meniscus lens with a weak curvature concave surface facing the object side; a cemented positive lens, which includes a biconvex lens and a positive meniscus lens with a strong curvature concave surface facing the object side; and a biconvex lens.

The zoom lens in the tenth preferred embodiment has a zoom ratio of about 600% and has 12 groups with 17 individual pieces.

Next, values of various dimensions in the tenth preferred embodiment of the invention are listed in Table 10. In Table 10, f denotes a focal length, FN denotes a F-number, $2\omega$ denotes field angle, Bf denotes a back focus, $\beta$ denotes a shooting magnification, and D0 denotes an object point distance. The surface number is the order of the lens surface from the object side in the direction of travel of a light ray. The values of the refraction index and Abbe's number are relative to a d-line ($\lambda$=587.6 nm).

TABLE 10 f = 14.9~100.4
FN = 2.1~3.7
$2\omega$ = 40.52°~6.56°

| Surface Number | Radius of Curvature | Intersurface Distance | Refractive Index | Abbe Number |
|---|---|---|---|---|
| 1 | ∞ | 2.000 | 1.51680 | 64.1 |
| 2 | ∞ | 2.000 | | |
| 3 | 84.814 | 1.500 | 1.80518 | 25.4 |
| 4 | 37.000 | 6.500 | 1.69350 | 53.8 |

TABLE 10-continued

| | | | | |
|---|---|---|---|---|
| 5 | 502.938 | 0.200 | | |
| 6 | 34.343 | 4.500 | 1.67025 | 57.6 |
| 7 | 86.012 | (d7 = variable) | | |
| 8 | 44.392 | 1.200 | 1.74810 | 52.3 |
| 9 | 17.804 | 5.300 | | |
| 10 | −85.837 | 1.100 | 1.74810 | 52.3 |
| 11 | 39.416 | 0.200 | | |
| 12 | 31.834 | 5.000 | 1.80518 | 25.4 |
| 13 | −60.000 | 1.000 | 1.77279 | 49.4 |
| 14 | 37.586 | (d14 = variable) | | |
| 15 | 85.366 | 2.700 | 1.49782 | 82.6 |
| 16 | −26.000 | 1.000 | 1.80518 | 25.4 |
| 17 | −44.120 | 0.200 | | |
| 18 | 32.726 | 2.600 | 1.49782 | 82.6 |
| 19 | −160.705 | (d19 = variable) | | |
| 20 | −125.126 | 2.400 | 1.80518 | 25.4 |
| 21 | −18.500 | 1.000 | 1.61720 | 54.0 |
| 22 | 39.4101 | 3.000 | | |
| 23 | −17.063 | 1.000 | 1.74400 | 45.1 |
| 24 | −80.150 | (d24 = variable) | | |
| 25 | −120.081 | 3.500 | 1.80454 | 39.6 |
| 26 | −28.085 | 0.200 | | |
| 27 | 1558.537 | 5.500 | 1.49782 | 82.6 |
| 28 | −17.500 | 1.000 | 1.80518 | 25.4 |
| 29 | −42.177 | 0.200 | | |
| 30 | 45.122 | 4.000 | 1.49782 | 82.6 |
| 31 | −57.094 | Bf | | |

Variable interval during zooming

| β | −0.020 | −0.040 | −0.050 | −0.080 | −0.100 | −0.120 |
|---|---|---|---|---|---|---|
| D0 | 692.785 | 692.785 | 692.785 | 692.785 | 692.785 | 692.785 |
| d7 | 0.548 | 10.025 | 12.452 | 16.767 | 18.663 | 19.340 |
| d14 | 47.815 | 31.427 | 26.502 | 16.401 | 11.276 | 8.671 |
| d19 | 2.022 | 10.785 | 13.958 | 21.306 | 25.011 | 28.840 |
| d24 | 12.195 | 10.332 | 9.657 | 8.095 | 7.618 | 5.718 |
| Bf | 37.405 | 37.405 | 37.405 | 37.405 | 37.405 | 37.405 |

Condition Corresponding Values

| | | | | | | |
|---|---|---|---|---|---|---|
| f1 = | 58.837 | βw1 = | −0.0921 | βc1 = | −0.0921 | βt1 = −0.0921 |
| f2 = | −19.300 | βw2 = | −0.5691 | βc2 = | −1.0000 | βt2 = −1.2774 |
| f3 = | 33.073 | βw3 = | −0.6344 | βc3 = | −1.0000 | βt3 = −1.2406 |
| f4 = | −21.096 | βw4 = | −0.8366 | βc4 = | −1.0000 | βt4 = −1.1436 |
| f5 = | 24.210 | ↑w5 = | −0.7191 | βc5 = | −0.7191 | βt5 = −0.7191 |
| fw = | 14.850 | βw = | −0.0200 | βc = | −0.0662 | βt = −0.1200 |
| ft = | 100.361 | Φ = | 15.8 | | | |

| | | |
|---|---|---|
| (3) | Φ/f3 = | 0.47773 |
| (9) | β1/β5 = | 0.1281 |
| (8) | f2/f4 = | 0.91487 |

FIGS. 30a–31d are various aberration graphs for the tenth preferred embodiment relative to a d-line (λ=587.6 nm) and a g-line (λ=435.8 nm). FIGS. 30a–30d are various aberration graphs at a maximum wide-angle state. FIGS. 31a–31d are various aberration graphs at a maximum telephoto state.

Figure 32:
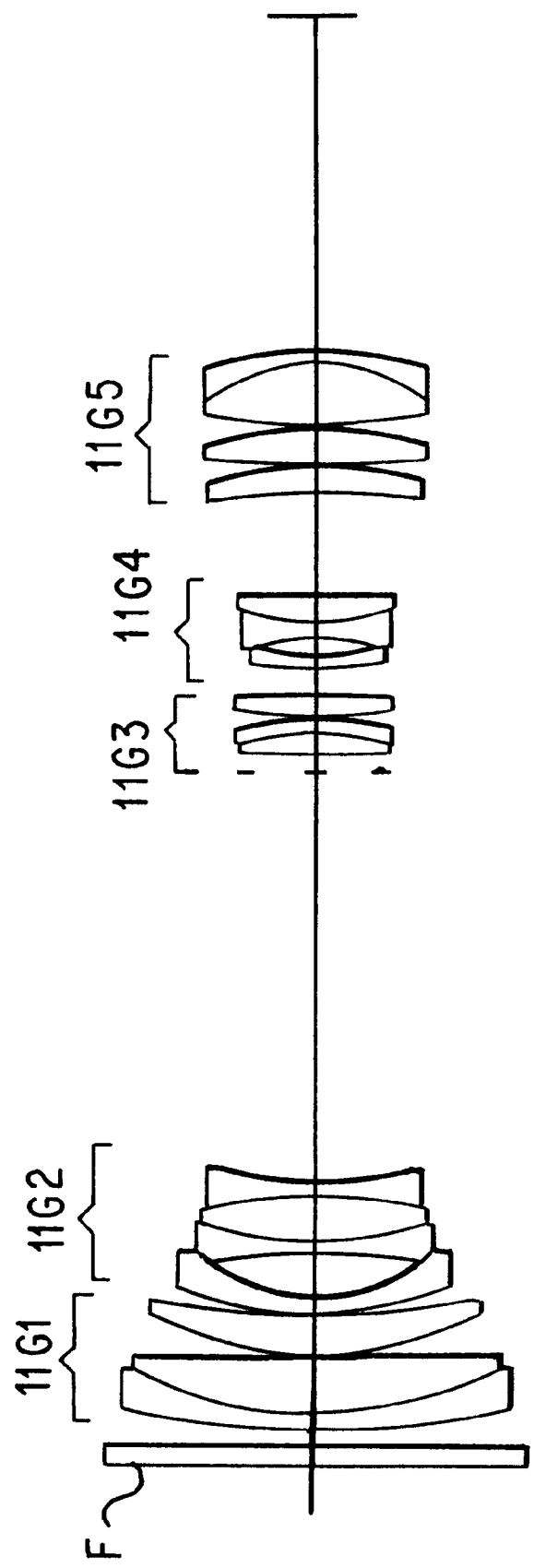
FIG. 32 is a side schematic drawing illustrating a lens structure of an eleventh preferred embodiment of the invention.
Figure 33:
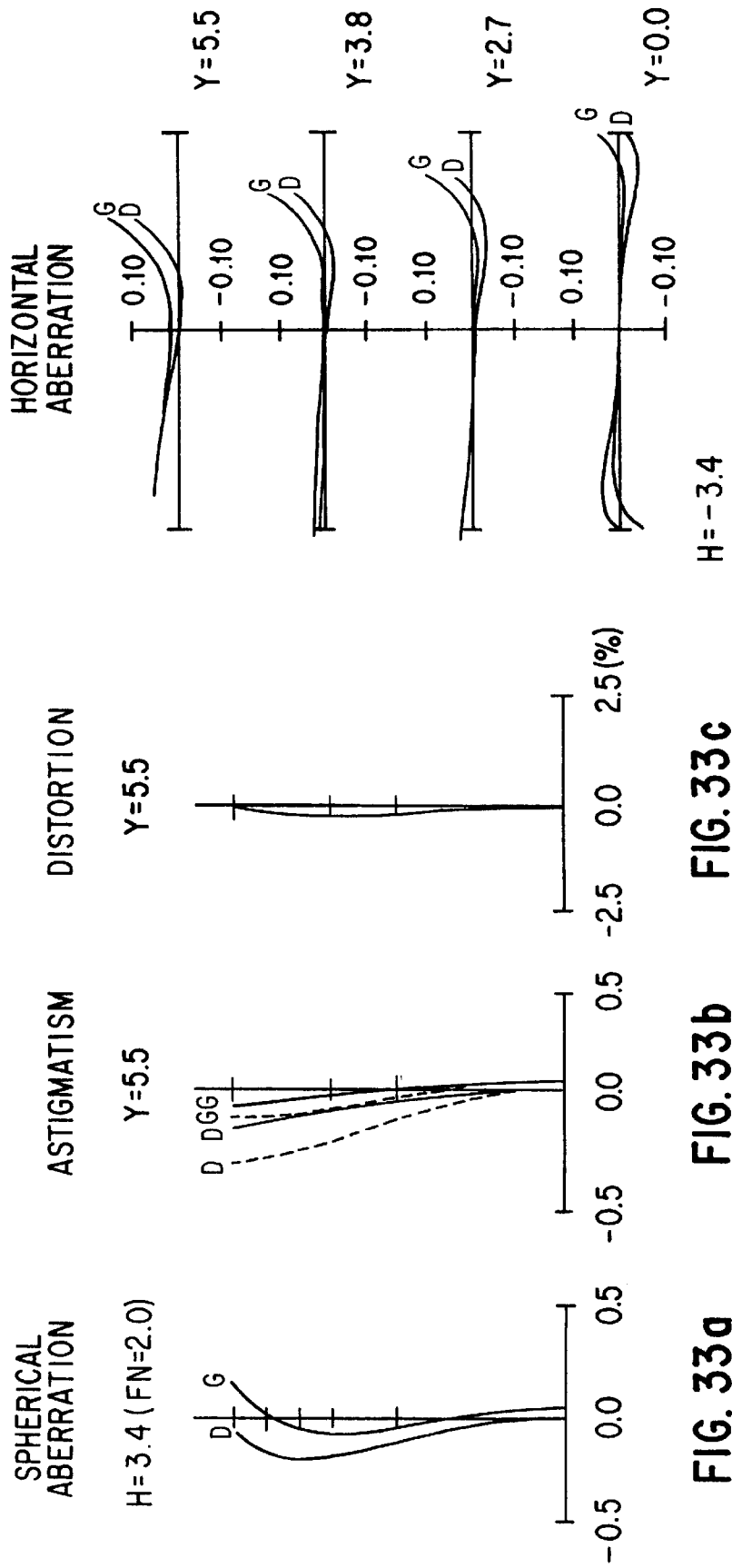
FIGS. 33a–33d are various aberration graphs at a maximum wide-angle state for the eleventh preferred embodiment.
Figure 34:
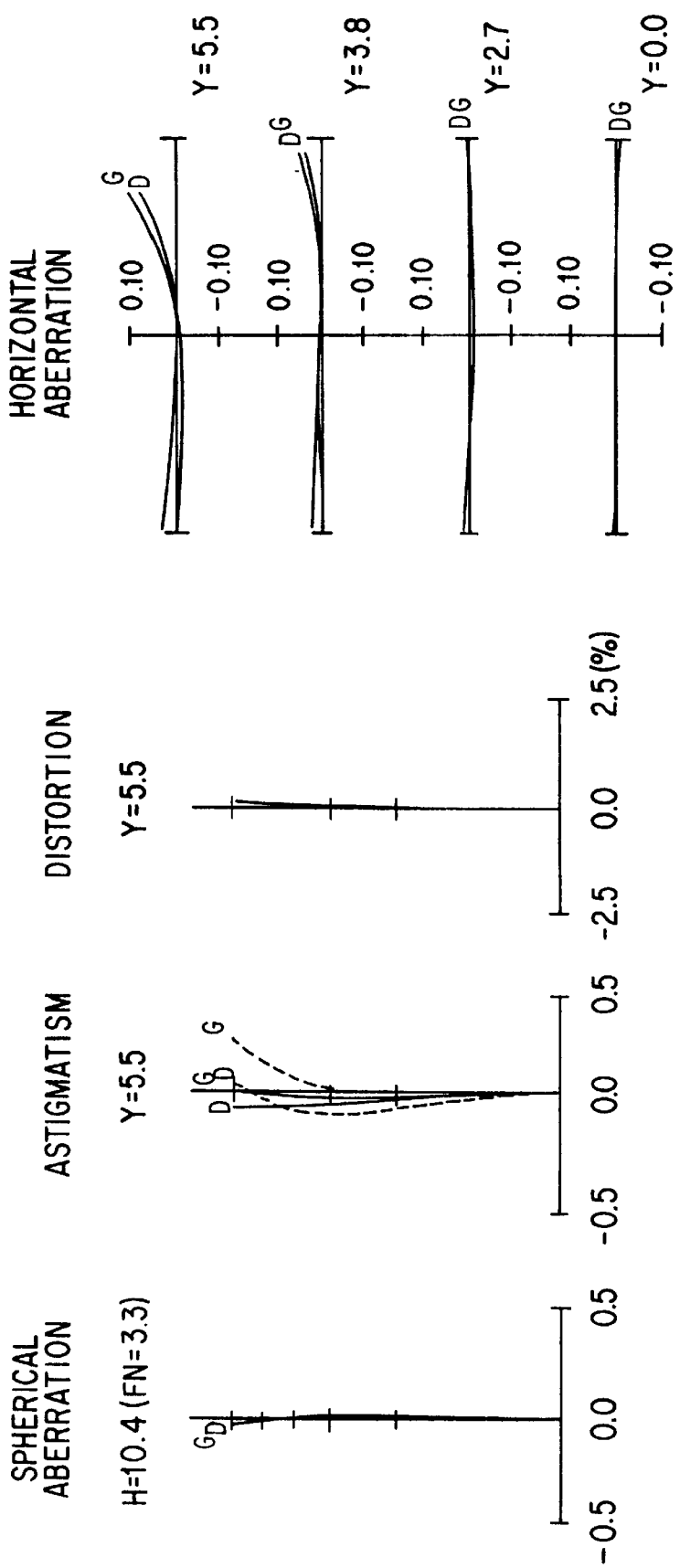
FIGS. 34a–34d are various aberration graphs at a maximum telephoto state for the eleventh preferred embodiment.

FIG. 32 illustrates a lens structure for a zoom lens according to an eleventh preferred embodiment of the invention.

A filter F comprising a parallel plate is provided on the object side of the first lens group 11G1 for the zoom lens of FIG. 32. The first lens group 11G1 comprises a cemented positive lens, which includes a negative meniscus lens with a weak curvature convex surface facing the object side and a positive meniscus lens with a strong curvature convex surface facing the object side; and a positive meniscus lens with a strong curvature convex surface facing the object side.

The second lens group 11G2 comprises a negative meniscus lens with a weak curvature convex surface facing the object side; a biconcave lens; and a cemented negative lens, which includes a biconvex lens and a biconcave lens.

The third lens group 11G3 comprises a cemented positive lens, which includes a biconvex lens and a negative meniscus lens with a strong curvature concave surface facing the object side; and a biconvex lens.

The fourth lens group 11G4 comprises a negative meniscus lens with a weak curvature convex surface facing the object side; and a cemented negative lens, which comprises a biconvex lens and a biconvex lens.

The fifth lens group 11G5 comprises a positive meniscus lens with a weak curvature concave surface facing the object side; a biconvex lens; and a cemented positive lens, which includes a biconvex lens and a negative meniscus lens with a strong curvature concave surface facing the object side.

The zoom lens in the eleventh preferred embodiment has a zoom ratio of about 500% and has 12 groups with 17 individual pieces.

Next, values of various dimensions for the eleventh preferred embodiment of the invention are listed in Table 11. In Table 11, f denotes a focal length, FN denotes F-number, 2ω denotes a field angle, Bf denotes a back focus, β denotes a shooting magnification, and D0 denotes the object point distance. The surface number is the order of the lens surface from the object side in the direction of travel of a light ray. The values of refraction index and the Abbe's number are relative to the d-line (λ=587.6 nm).

TABLE 11 f = 14.9~84.6
FN = 2.0~3.3
2ω = 40.50°~7.84°

| Surface Number | Radius of Curvature | Intersurface Distance | Refractive Index | Abbe Number |
|---|---|---|---|---|
| 1 | ∞ | 2.000 | 1.51680 | 64.1 |
| 2 | ∞ | 2.000 | | |
| 3 | 85.410 | 1.500 | 1.80518 | 25.3 |
| 4 | 36.500 | 6.500 | 1.69350 | 53.7 |
| 5 | 527.982 | 0.200 | | |
| 6 | 35.131 | 4.500 | 1.67025 | 57.5 |
| 7 | 92.773 | (d7 = variable) | | |
| 8 | 47.120 | 1.200 | 1.71300 | 53.9 |
| 9 | 17.401 | 6.000 | | |
| 10 | −61.269 | 1.100 | 1.74443 | 49.5 |
| 11 | 39.104 | 0.200 | | |
| 12 | 29.482 | 5.000 | 1.80518 | 25.3 |
| 13 | −57.000 | 1.000 | 1.71300 | 53.9 |
| 14 | 37.047 | (d14 = variable) | | |
| 15 | 113.398 | 2.700 | 1.49782 | 82.5 |
| 16 | −23.500 | 1.000 | 1.80518 | 25.3 |
| 17 | −38.083 | 0.200 | | |
| 18 | 32.990 | 2.600 | 1.49782 | 82.5 |
| 19 | −171.883 | (d19 = variable) | | |
| 20 | 40.140 | 1.100 | 1.62041 | 60.1 |
| 21 | 19.460 | 3.600 | | |
| 22 | −15.330 | 1.100 | 1.62280 | 57.0 |
| 23 | 22.151 | 2.600 | 1.80384 | 33.9 |
| 24 | −395.459 | (d24 = variable) | | |
| 25 | −87.000 | 3.000 | 1.79668 | 45.4 |
| 26 | −39.074 | 0.200 | | |
| 27 | 142.592 | 3.800 | 1.49782 | 82.6 |
| 28 | −36.972 | 0.200 | | |
| 29 | 52.338 | 6.500 | 1.49782 | 82.6 |
| 30 | −19.939 | 1.500 | 1.80518 | 25.4 |
| 31 | −38.778 | Bf | | |

Variable interval during zooming

| β | −0.020 | −0.025 | −0.040 | −0.050 | −0.080 | −0.100 |
|---|---|---|---|---|---|---|
| D0 | 692.653 | 692.653 | 692.653 | 692.653 | 692.653 | 692.653 |
| d7 | 0.668 | 4.082 | 10.156 | 12.582 | 16.897 | 18.794 |
| d14 | 47.038 | 41.533 | 30.650 | 25.725 | 15.624 | 10.498 |
| d19 | 2.969 | 5.625 | 11.733 | 14.906 | 22.254 | 25.959 |

TABLE 11-continued

| d24 | 10.892 | 10.327 | 9.029 | 8.354 | 6.792 | 6.315 |
|---|---|---|---|---|---|---|
| Bf | 36.436 | 36.436 | 36.436 | 36.436 | 36.436 | 36.436 |

(Condition Corresponding Values)

| f1 = | 58.837 | βw1 = | −0.0921 | βc1 = | −0.0921 | βt1 = | −0.0921 |
|---|---|---|---|---|---|---|---|
| f2 = | −19.300 | βw2 = | −0.5691 | βc2 = | −1.0000 | βt2 = | −1.2229 |
| f3 = | 33.073 | βw3 = | −0.6344 | βc3 = | −1.0000 | βt3 = | −1.1725 |
| f4 = | −21.096 | βw4 = | −0.8366 | βc4 = | −1.0000 | βt4 = | −1.0535 |
| f5 = | 24.210 | βw5 = | −0.7191 | βc5 = | −0.7191 | βt5 = | −0.7191 |
| fw = | 14.850 | βw = | −0.0200 | βc = | −0.0662 | βt = | −0.1000 |
| ft = | 84.638 | Φ = | 15.7 | | | | |

| (1) | Φ/f3 = | 0.47471 |
|---|---|---|
| (6) | β1/β5 = | 0.1281 |
| (7) | f2/f4 = | 0.91487 |

FIGS. 33a–34d are various aberration graphs for the eleventh preferred embodiment relative to a d-line (λ=587.6 nm) and a g-line (λ=435.8 nm). FIGS. 33a–33d are various aberration graphs at a maximum wide-angle state. FIGS. 34a–34d are various aberration graphs at the maximum telephoto state.

Figure 35:
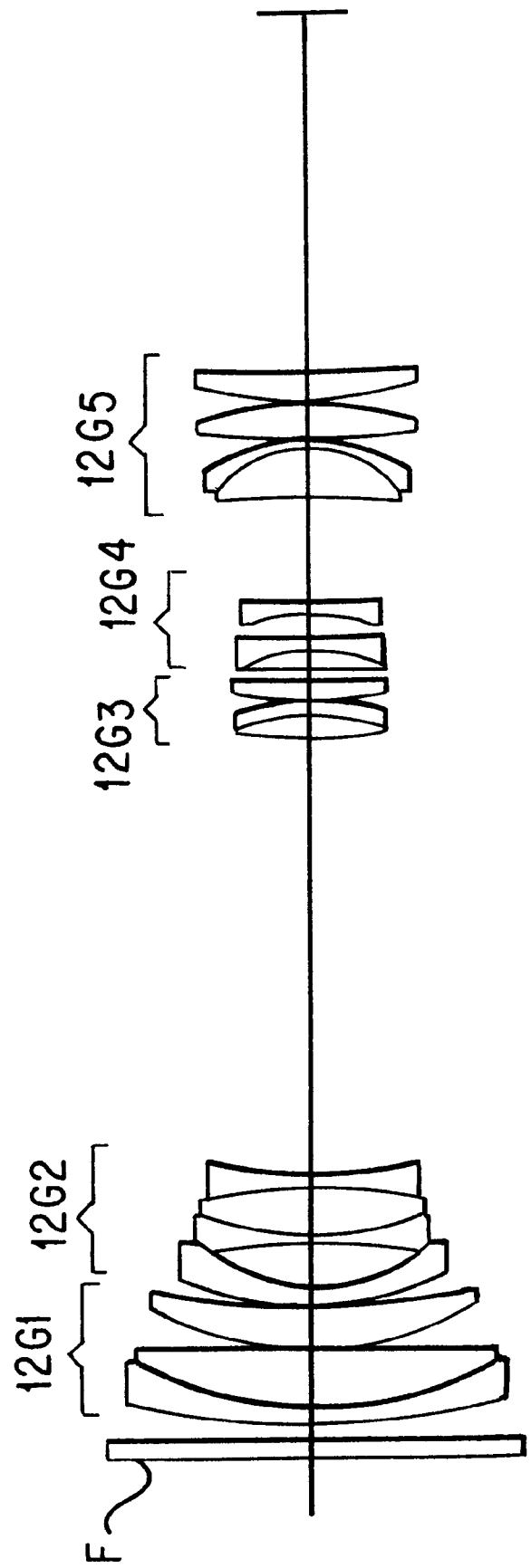
FIG. 35 is a side schematic drawing illustrating a lens structure according to a twelfth preferred embodiment of the invention.
Figures 36A, 36B, 36C, 36D:
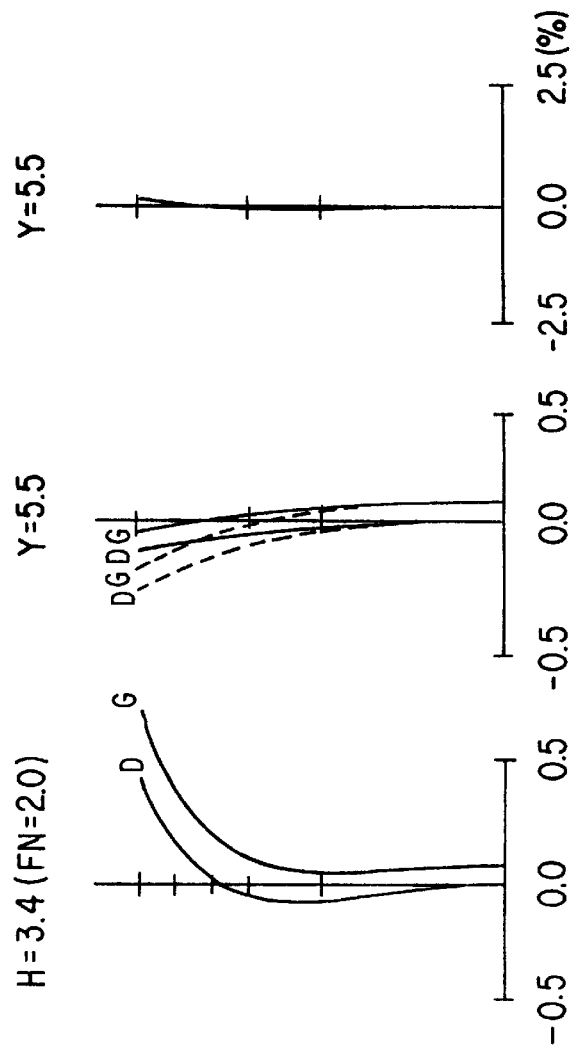
FIGS. 36a–36d are various aberration graphs at a maximum wide-angle state for the twelfth preferred embodiment.
Figures 37A, 37B, 37C, 37D:
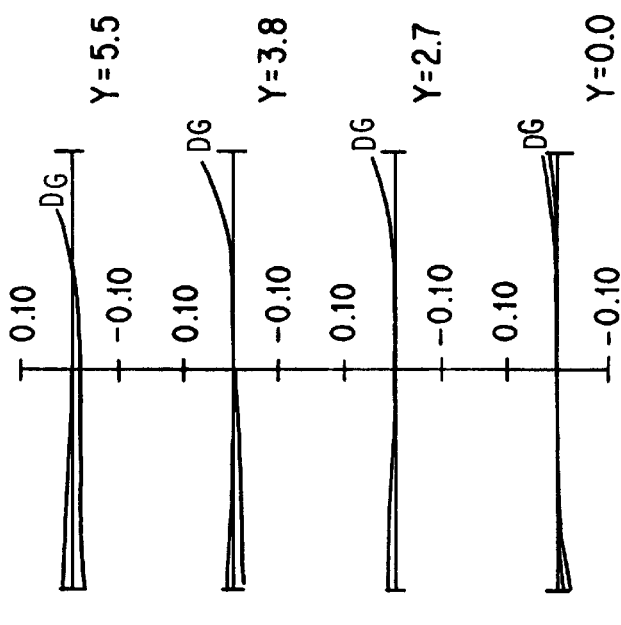
FIGS. 37a–37d are various aberration graphs at a maximum telephoto state for the twelfth preferred embodiment.

FIG. 35 illustrates a lens structure of a zoom lens according to a twelfth preferred embodiment of the invention.

A filter F comprising a parallel plate is provided on the object side of the first lens group 12G1 for the zoom lens of FIG. 35. The first lens group 12G1 comprises a cemented positive lens, which includes a negative meniscus lens with a weak curvature convex surface facing the object side and a positive meniscus lens with a strong curvature convex surface facing the object side; and a positive meniscus lens with a strong curvature convex surface facing the object side.

The second lens group 12G2 comprises a negative meniscus lens with a weak curvature convex surface facing the object side; a biconcave lens; and a cemented negative lens which comprises a biconvex lens and a biconcave lens.

The third lens group 12G3 comprises a cemented positive lens, which includes a biconvex lens and a negative meniscus lens with a strong curvature concave surface facing the object side; and a positive meniscus lens with a strong curvature biconvex surface facing the object side.

The fourth lens group 12G4 comprises a cemented negative lens, which includes a positive meniscus lens with a weak curvature concave surface facing the object side and a biconcave lens; and a biconcave lens.

The fifth lens group 12G5 comprises a cemented positive lens, which comprises a positive meniscus lens with a weak curvature concave surface facing the object side and a negative meniscus lens with strong curvature concave surface facing the object side; a biconvex lens; and a biconcave lens.

The zoom lens of the twelfth preferred embodiment has a zoom ratio of about 500% and has 12 groups with 17 individual pieces. Characteristics of the zoom lens in the twelfth preferred embodiment include the lens shape of the positive meniscus lens of the third lens group 12G3 and the lens shape of the cemented positive lens of the fifth lens group 12G5.

Next, values of various dimensions in the twelfth preferred embodiment of the present invention are listed in Table 12. In Table 12, f denotes the focal length, FN denotes F-number, 2ω denotes field angle, Bf denotes the back focus, β denotes shooting magnification, and D0 denotes the object point distance. The surface number is the order of the lens surface from the object side in the direction of travel of a light ray. The values of refraction index and Abbe's number are relative to a d-line (λ=587.6 nm).

TABLE 12 f = 14.9~84.6
FN = 2.0~3.3
2ω = 40.46°~7.82°

| Surface Number | Radius of Curvature | Intersurface Distance | Refractive Index | Abbe Number |
|---|---|---|---|---|
| 1 | ∞ | 2.000 | 1.51680 | 64.1 |
| 2 | ∞ | 2.000 | | |
| 3 | 90.091 | 1.500 | 1.80518 | 25.3 |
| 4 | 37.000 | 6.800 | 1.69350 | 53.7 |
| 5 | 546.280 | 0.200 | | |
| 6 | 34.551 | 5.500 | 1.67025 | 57.5 |
| 7 | 92.696 | (d7 = variable) | | |
| 8 | 42.215 | 1.200 | 1.74810 | 52.3 |
| 9 | 17.151 | 6.000 | | |
| 10 | −84.179 | 1.100 | 1.74810 | 52.3 |
| 11 | 39.416 | 0.200 | | |
| 12 | 31.834 | 5.000 | 1.80518 | 25.3 |
| 13 | −60.000 | 1.000 | 1.7279 | 49.5 |
| 14 | 39.749 | (d14 = variable) | | |
| 15 | 54.499 | 2.700 | 1.49782 | 82.5 |
| 16 | −26.574 | 1.000 | 1.80518 | 25.3 |
| 17 | −42.259 | 0.200 | | |
| 18 | 32.989 | 2.600 | 1.49782 | 82.5 |
| 19 | 420.820 | (d19 = variable) | | |
| 20 | −145.228 | 2.400 | 1.80518 | 25.3 |
| 21 | −18.500 | 1.000 | 1.62280 | 57.0 |
| 22 | 55.240 | 3.000 | | |
| 23 | −21.090 | 1.000 | 1.74400 | 45.0 |
| 24 | 182.353 | (d24 = variable) | | |
| 25 | −123.047 | 5.500 | 1.49782 | 82.5 |
| 26 | −13.300 | 1.000 | 1.80518 | 25.3 |
| 27 | −20.301 | 0.200 | | |
| 28 | 107.341 | 3.500 | 1.49782 | 82.5 |
| 29 | −47.370 | 0.200 | | |
| 30 | 38.216 | 3.500 | 1.49782 | 82.5 |
| 31 | −4596.038 | Bf | | |

Variable Interval During Zooming

| β | −0.020 | −0.025 | −0.040 | −0.050 | −0.080 | −0.100 |
|---|---|---|---|---|---|---|
| D0 | 692.544 | 692.544 | 692.544 | 692.544 | 692.544 | 692.544 |
| d7 | 0.184 | 3.579 | 9.671 | 12.098 | 16.413 | 18.310 |
| d14 | 47.862 | 42.357 | 31.474 | 26.549 | 16.449 | 11.323 |
| d19 | 0.965 | 3.621 | 9.729 | 12.901 | 20.249 | 23.955 |
| d24 | 11.721 | 11.157 | 9.858 | 9.184 | 7.621 | 7.145 |
| Bf | 38.789 | 38.789 | 38.789 | 38.789 | 38.789 | 38.789 |

Condition Corresponding Values

| f1 = | 58.837 | βw1 = | −0.0921 | βc1 = | −0.0921 | βt1 = | −0.0921 |
|---|---|---|---|---|---|---|---|
| f2 = | −19.300 | βw2 = | −0.5691 | βc2 = | −1.0000 | βt2 = | −1.2226 |
| f3 = | 33.073 | βw3 = | −0.6344 | βc3 = | −1.0000 | βt3 = | −1.1725 |
| f4 = | −21.096 | βw4 = | −0.8366 | βc4 = | −1.0000 | βt4 = | −1.0535 |
| f5 = | 24.210 | βw5 = | −0.7191 | βc5 = | −0.7191 | βt5 = | −0.7191 |
| fw = | 14.850 | βw = | −0.0200 | βc = | −0.0662 | βt = | −0.1000 |
| ft = | 84.638 | Φ = | 16.0 | | | | |

| (3) | Φ/f3 = | 0.48378 |
|---|---|---|
| (9) | β1/β5 = | 0.1281 |
| (8) | f2/f4 = | 0.91487 |

FIGS. 36a–37d are various aberration graphs of the twelfth preferred embodiment relative to a d-line (λ=587.6 nm) and a g-line (λ=435.8 nm). FIG. 36a–36d are various aberration graphs at a maximum wide-angle state. FIGS. 37a–37d are various aberration graphs at a maximum telephoto state.

Figure 38:
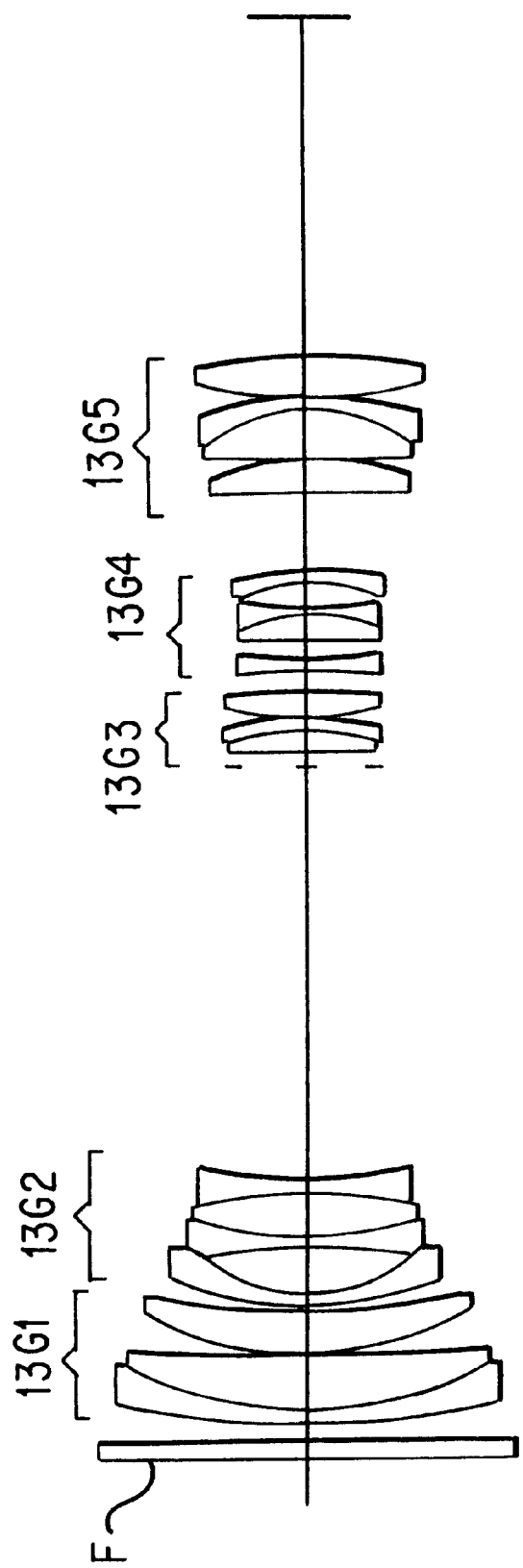
FIG. 38 is a side schematic drawing illustrating a lens structure according to a thirteenth preferred embodiment of the invention.
Figures 39A, 39B, 39C, 39D:
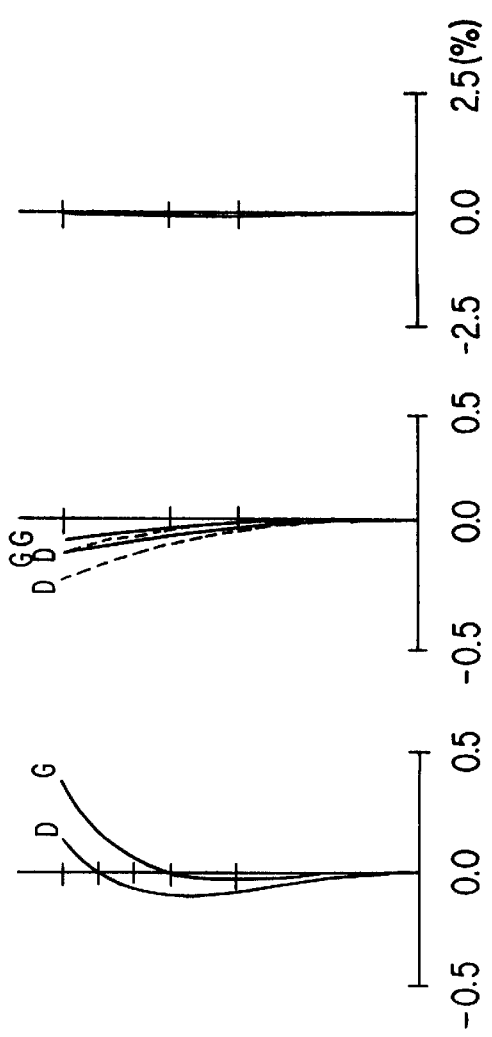
FIGS. 39a–39d are various aberration graphs at a maximum wide-angle state for the thirteenth preferred embodiment.

FIG. 38 illustrates a lens structure for a zoom lens according to a thirteenth preferred embodiment of the invention.

A filter F comprising a parallel plate is provided on the object side of the first lens group 13G1 for the zoom lens of FIG. 38. The first lens group 13G1 comprises a cemented positive lens, which includes a negative meniscus lens with a weak curvature convex surface facing the object side; and a positive meniscus lens with a strong curvature convex surface facing the object side, and a positive meniscus lens with a strong curvature convex surface facing the object side.

The second lens group 13G2 comprises a negative meniscus lens with a weak curvature convex surface facing the object side; a biconcave lens; and a positive cemented lens, which comprises having a biconcave lens and a biconvex lens.

The third lens group 13G3 comprises a positive cemented lens, which comprises having a biconvex lens and a negative meniscus lens with a strong curvature concave surface facing the object side; and a biconvex lens.

The fourth lens group 13G4 comprises a biconcave lens; a cemented negative lens, which comprises a biconvex lens and a biconcave lens; and a negative meniscus lens with a strong curvature concave surface facing the object side.

The fifth lens group 13G5 comprises a positive meniscus lens with a weak curvature concave surface facing the object side; a cemented positive lens, which comprises having a biconvex lens and a negative meniscus lens with a strong curvature concave surface facing the object side; and a biconvex lens.

This zoom lens has a zoom ratio of about 500% and has 13 groups with 18 individual pieces. Characteristics of this zoom lens include the lens arrangement of the fourth lens group 13G4.

Next, values of various dimensions in the thirteenth preferred embodiment of the invention are listed in Table 13. In Table 13, f denotes the focal length, FN denotes F-number, 2ω denotes a field angle, Bf denotes the back focus, β denotes a shooting magnification, and Do denotes the object point distance. The surface number is the order of the lens surface from the object side in the direction of travel of a light ray. The values of refraction index and Abbe's number are relative to a d-line (λ=587.6 nm).

TABLE 11 f = 14.9~84.6
FN = 2.1~3.3
2ω = 40.54°~7.86°

| Surface Number | Radius of Curvature | Intersurface Distance | Refractive Index | Abbe Number |
|---|---|---|---|---|
| 1 | ∞ | 2.000 | 1.51680 | 64.1 |
| 2 | ∞ | 2.000 | | |
| 3 | 84.814 | 1.500 | 1.80518 | 25.3 |
| 4 | 39.200 | 6.500 | 1.69350 | 53.7 |
| 5 | 748.606 | 0.200 | | |
| 6 | 35.137 | 4.500 | 1.67025 | 57.5 |
| 7 | 83.916 | (d7 = variable) | | |
| 8 | 44.392 | 1.200 | 1.74810 | 52.3 |
| 9 | 17.758 | 5.300 | | |
| 10 | −82.037 | 1.100 | 1.74810 | 52.3 |
| 11 | 39.416 | 0.200 | | |
| 12 | 34.034 | 5.000 | 1.80518 | 25.3 |
| 13 | −60.000 | 1.000 | 1.77279 | 49.5 |
| 14 | 41.859 | (d14 = variable) | | |
| 15 | 85.366 | 2.700 | 1.49782 | 82.5 |
| 16 | −26.000 | 1.000 | 1.80518 | 25.3 |
| 17 | −48.227 | 0.200 | | |
| 18 | 35.693 | 2.600 | 1.49782 | 82.5 |
| 19 | −82.623 | (d19 = variable) | | |
| 20 | −50.000 | 1.000 | 1.74443 | 49.5 |
| 21 | 57.434 | 2.000 | | |
| 22 | 125.000 | 3.000 | 1.80518 | 25.3 |
| 23 | −19.000 | 1.000 | 1.62374 | 47.1 |
| 24 | 57.239 | 3.000 | | |

TABLE 11-continued

| 25 | −17.204 | 1.000 | 1.74443 | 49.5 |
|---|---|---|---|---|
| 26 | −34.743 | (d26 = variable) | | |
| 27 | −78.979 | 3.500 | 1.79668 | 45.4 |
| 28 | −25.637 | 0.200 | | |
| 29 | 3160.273 | 5.500 | 1.49782 | 82.5 |
| 30 | −17.500 | 1.000 | 1.80518 | 25.3 |
| 31 | −42.177 | 0.200 | | |
| 32 | 41.171 | 4.000 | 1.49782 | 82.5 |
| 33 | −59.840 | Bf | | |

Variable Interval During Zooming

| β | −0.020 | −0.025 | −0.040 | −0.050 | −0.080 | −0.100 |
|---|---|---|---|---|---|---|
| D0 | 629.863 | 629.863 | 629.863 | 629.863 | 629.863 | 629.863 |
| d7 | 0.603 | 4.016 | 10.090 | 12.517 | 16.832 | 18.729 |
| d14 | 47.458 | 41.953 | 31.070 | 26.145 | 16.044 | 10.918 |
| d19 | 2.702 | 5.358 | 11.465 | 14.638 | 21.986 | 25.692 |
| d26 | 9.038 | 8.474 | 7.175 | 6.501 | 4.939 | 4.462 |
| Bf | 37.651 | 37.651 | 37.651 | 37.651 | 37.651 | 37.651 |

(Condition Corresponding Values)

f1 = 58.837  βw1 = −0.0921  βc1 = −0.0921  βt1 = −0.0921
f2 = −19.300  βw2 = −0.5691  βc2 = −1.0000  βt2 = −1.2226
f3 = 33.073  βw3 = −0.6344  βc3 = −1.0000  βt3 = −1.1725
f4 = −21.096  βw4 = −0.8366  βc4 = −1.0000  βt4 = −1.0535
f5 = 24.210  βw5 = −0.7191  βc5 = −0.7191  βt5 = −0.7191
fw = 14.850  βw = −0.0200  βc = −0.0662  βt = −0.1000
ft = 84.638  Φ = 15.7

(3)    Φ/f3 =     0.47471
(9)    β1/β5 =    0.1281
(8)    f2/f4 =    0.91487

FIGS. 39a–40d are various aberration graphs for this embodiment relative to a d-line (λ=587.6 nm) and a g-line (λ=435.8 nm). FIGS. 39a–39d are various aberration graphs at a maximum wide-angle or closest-distance focusing state. FIGS. 40a–40d are various aberration graphs at a maximum telephoto or farthest- distance focusing state.

Figure 41:
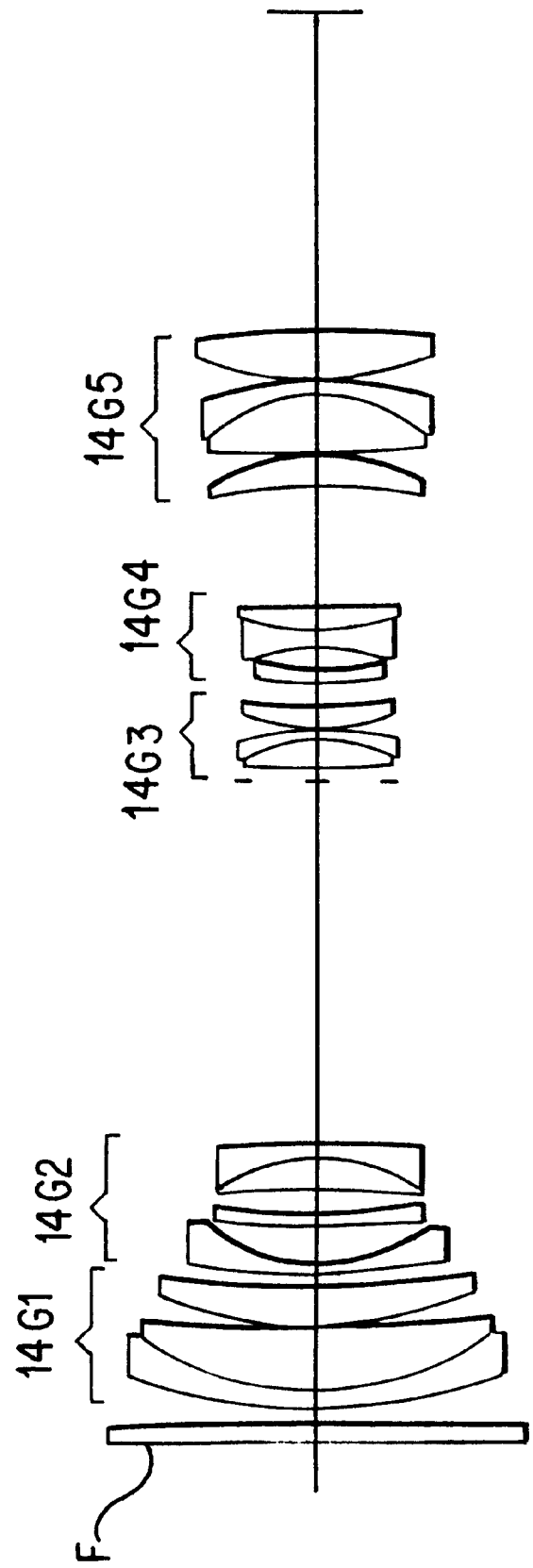
FIG. 41 is a side schematic drawing illustrating a lens structure according to a fourteenth preferred embodiment of the invention.
Figures 42A, 42B, 42C, 42D:
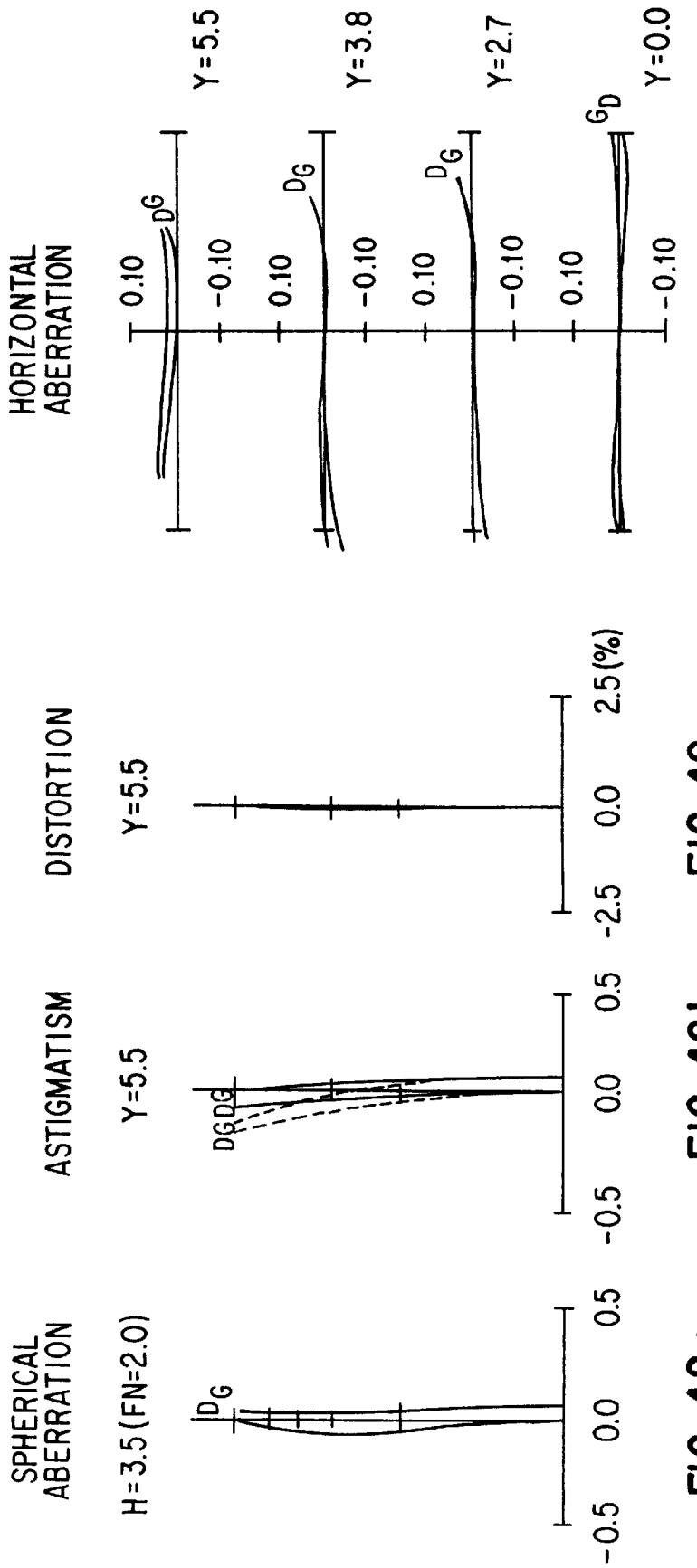
FIGS. 42a–42d are various aberration graphs at a maximum wide-angle state for the fourteenth preferred embodiment.

FIG. 41 illustrates a lens structure for a zoom lens according to a fourteenth preferred embodiment of the invention.

A filter F comprising a parallel plate is provided on the object side of the first lens group 14G1 for the zoom lens of FIG. 41. The first lens group 14G1 comprises a cemented positive lens, which comprises a negative meniscus lens with a weak curvature convex surface facing the object side and a positive meniscus lens with a strong curvature convex surface facing the object side; and a positive meniscus lens with a strong curvature convex surface facing the object side.

The second lens group 14G2 comprises a negative meniscus lens with a weak curvature convex surface facing the object side; a negative meniscus lens with a weak curvature convex surface facing the object side; and a cemented negative lens, which comprises a positive meniscus lens with a weak curvature concave surface facing the object side and a negative meniscus lens with a strong curvature concave surface facing the object side.

The third lens group 14G3 comprises a cemented positive lens, which comprises a biconvex lens and a negative meniscus lens with a strong curvature concave surface facing the object side; and a positive meniscus lens with a strong curvature convex surface facing the object side.

The fourth lens group 14G4 comprises a negative meniscus lens with a weak curvature concave surface facing the object side; and a cemented negative lens, which comprises a biconcave lens and a biconvex lens.

The fifth lens group 14G5 comprises a positive meniscus lens with a weak curvature concave surface facing the object side; a cemented positive lens, which comprises a biconvex lens and a negative meniscus lens with a strong curvature concave surface facing the object side; and a biconvex lens.

The zoom lens of this embodiment has a zoom ratio of about 700% and has 12 groups with 17 individual pieces. Characteristics of this embodiment include the lens arrangement and the lens shape for the second lens group 14G2 and the lens shape for the third lens group 14G3. With this structure, fluctuation of coma of a lower ray of main light rays due to zooming is corrected.

Next, values of various dimensions in this embodiment of the invention are listed in Table 14. In Table 14, f denotes the focal length, FN denotes F-number, 2ω denotes field angle, Bf denotes the back focus, β denotes a shooting magnification, and D0 denotes the object point distance. The surface number is the order of the lens surface from the object side in the direction of travel of a light ray. The values of a refraction index and Abbe's number are relative to a d-line (λ=587.6 nm).

TABLE 14 f = 14.9~116.3
FN = 2.0~4.3
2ω = 40.48°~5.76°

| Surface Number | Radius of Curvature | Intersurface Distance | Refractive Index | Abbe Number |
|---|---|---|---|---|
| 1 | ∞ | 2.000 | 1.51680 | 64.1 |
| 2 | ∞ | 2.000 | | |
| 3 | 53.816 | 1.500 | 1.80518 | 25.3 |
| 4 | 30.500 | 7.500 | 1.62374 | 47.1 |
| 5 | 252.285 | 0.200 | | |
| 6 | 43.433 | 4.000 | 1.72000 | 50.2 |
| 7 | 118.915 | (d7 = variable) | | |
| 8 | 71.132 | 1.200 | 1.77279 | 49.5 |
| 9 | 20.378 | 4.300 | | |
| 10 | 226.333 | 1.200 | 1.77279 | 49.5 |
| 11 | 54.698 | 3.000 | | |
| 12 | −50.126 | 3.500 | 1.80518 | 25.3 |
| 13 | −20.000 | 1.100 | 1.74810 | 52.3 |
| 14 | −211.086 | (d14 = variable) | | |
| 15 | 67.0024 | 3.000 | 1.49782 | 82.5 |
| 16 | −17.200 | 1.000 | 1.80518 | 25.3 |
| 17 | −25.481 | 0.200 | | |
| 18 | 23.775 | 2.000 | 1.49782 | 82.5 |
| 19 | −40.102 | (d19 = variable) | | |
| 20 | −33.010 | 1.100 | 1.62041 | 60.1 |
| 21 | 18.439 | 3.5000 | | |
| 22 | −14.235 | 1.100 | 1.65160 | 58.5 |
| 23 | 21.863 | 3.000 | 1.80518 | 25.3 |
| 24 | −216.683 | (d24 = variable) | | |
| 25 | −68.813 | 3.500 | 1.78797 | 47.5 |
| 26 | −22.825 | 0.200 | | |
| 27 | 343.545 | 6.500 | 1.49782 | 82.5 |
| 28 | −18.000 | 1.200 | 1.80518 | 25.3 |
| 29 | −50.715 | 0.200 | | |
| 30 | 32.232 | 5.000 | 1.49782 | 82.5 |
| 31 | −110.644 | Bf | | |

Variable Interval During Zooming

| β | −0.020 | −0.045 | −0.050 | −0.080 | −0.100 | −0.140 |
|---|---|---|---|---|---|---|
| D0 | 692.818 | 692.818 | 692.818 | 692.818 | 692.818 | 692.818 |
| d7 | 1.684 | 10.229 | 12.436 | 16.185 | 17.644 | 18.985 |
| d14 | 42.613 | 26.781 | 22.046 | 12.660 | 8.447 | 3.292 |
| d19 | 3.059 | 12.604 | 15.981 | 23.871 | 27.942 | 35.017 |
| d24 | 13.407 | 11.147 | 10.299 | 8.046 | 6.728 | 3.468 |
| Bf | 35.931 | 35.931 | 35.931 | 35.931 | 35.931 | 35.931 |

(Condition Corresponding Values)

| f1 = | 58.837 | βw1 = | −0.0921 | βc1 = | −0.0921 | βt1 = | −0.0921 |
|---|---|---|---|---|---|---|---|
| f2 = | −20.000 | βw2 = | −0.6071 | βc2 = | −1.0000 | βt2 = | −1.2786 |
| f3 = | 33.073 | βw3 = | −0.6453 | βc3 = | −1.0000 | βt3 = | −1.3041 |
| f4 = | −20.000 | βw4 = | −0.7709 | βc4 = | −1.0000 | βt4 = | −1.2678 |

TABLE 14-continued

| f5 = | 24.133 | βw5 = | −0.7192 | βc5 = | −0.7192 | βt5 = | −0.7192 |
|---|---|---|---|---|---|---|---|
| fw = | 14.909 | βw = | −0.0200 | βc = | −0.0662 | βt = | −0.1400 |
| ft = | 116.246 | Φ = | 15.5 | | | | |

| (3) | Φ/f3 = | 0.46866 |
|---|---|---|
| (9) | β1/β5 = | 0.1281 |
| (8) | f2/f4 = | 0.10000 |

FIGS. 42a–43d are various aberration graphs for this embodiment relative to a d-line (λ=587.6 nm) and a g-line (λ=435.8 nm). FIG. 42a–42d are various aberration graphs at a maximum wide-angle state or closest-distance focusing state. FIGS. 43a–43d are various aberration graphs at a maximum telephoto or farthest-distance focusing state.

Figure 44:
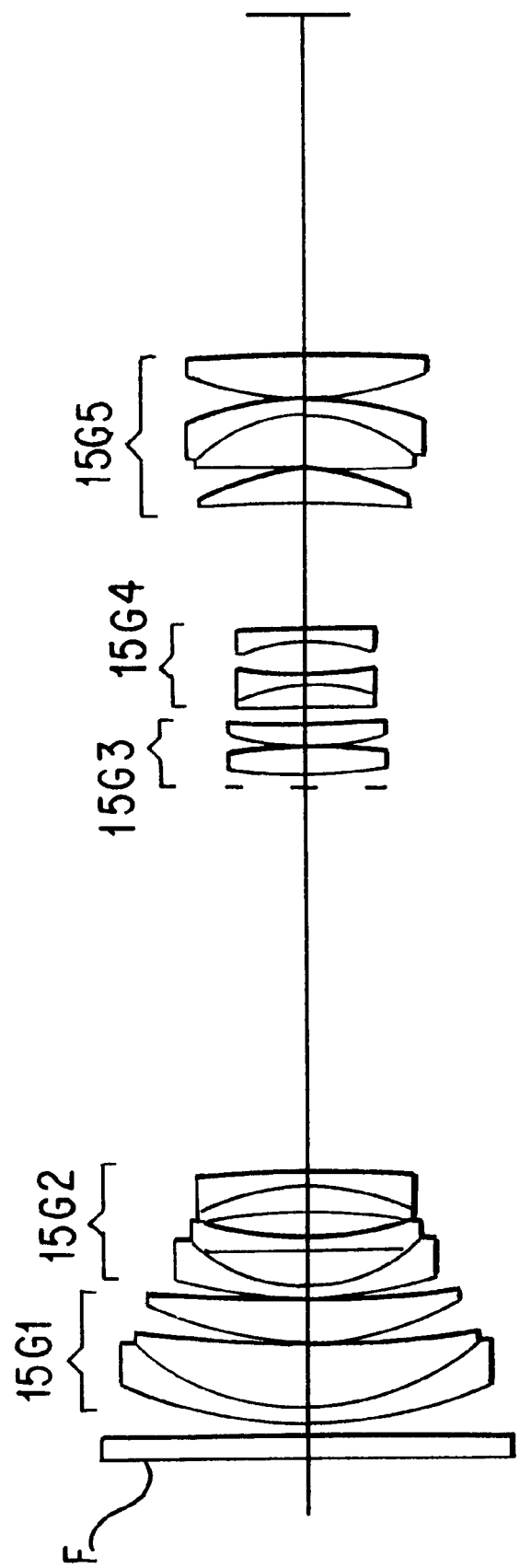
FIG. 44 is a side schematic drawing illustrating a lens structure according to a fifteenth preferred embodiment of the invention.
Figures 46A, 46B, 46C, 46D:
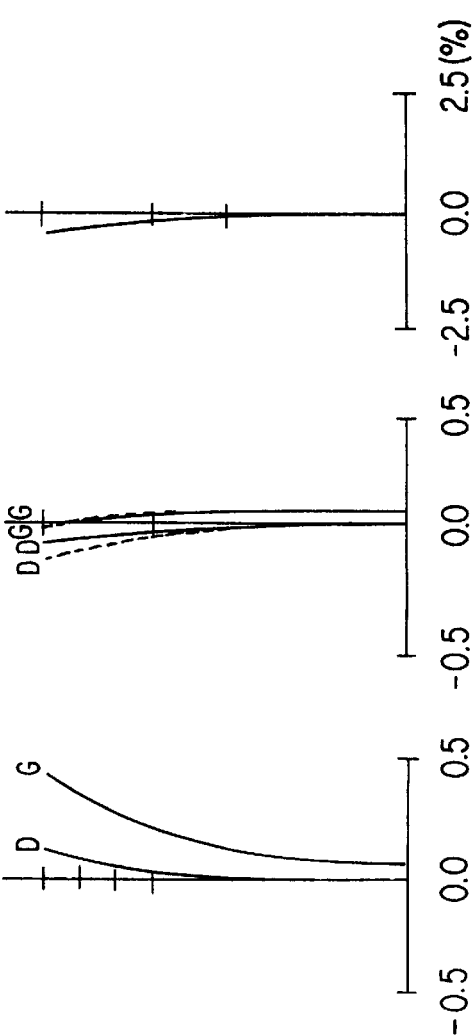
FIGS. 46a–46d are various aberration graphs at a maximum telephoto state for the fifteenth preferred embodiment.

FIG. 44 illustrates a lens structure for a zoom lens in according to a fifteenth preferred embodiment of the invention.

A filter F comprising a parallel plate is provided on the object side of the first lens group 15G1 for the zoom lens of FIG. 44. The first lens group 15G1 comprises a cemented positive lens, which includes a negative meniscus lens with a weak curvature convex surface facing the object side and a positive meniscus lens with a strong curvature convex surface facing the object side; and a positive meniscus lens with a strong curvature convex surface facing the object side.

The second lens group 15G2 comprises a negative meniscus lens with a weak curvature convex surface facing the object side; a negative meniscus lens with a weak curvature convex surface facing the object side; and a cemented negative lens, which includes a positive meniscus lens with a weak curvature concave surface facing the object side and a negative meniscus lens with a strong curvature concave surface facing the object side.

The third lens group 15G3 comprises a biconvex lens; and a cemented positive lens, which includes a biconvex lens and a positive meniscus lens with a strong curvature convex surface facing the object side.

The fourth lens group 15G4 comprises a cemented negative lens, which includes a positive meniscus lens with a weak curvature concave surface facing the object side and a biconcave lens; and a negative cemented lens, which includes a biconcave lens and a positive meniscus lens with a strong curvature concave surface facing the object side.

The fifth lens group 15G5 comprises a positive meniscus lens with a weak curvature concave surface facing the object side; a cemented positive lens, which includes a biconvex lens and a negative meniscus lens with a strong curvature concave surface facing the object side; and a biconvex lens.

The zoom lens of this embodiment has a zoom ratio of about 600% and 12 groups with 16 individual pieces. Characteristics of this embodiment include the third lens group 15G3 having two pieces of lenses without a cemented lens, and the lens arrangement and shape of the second lens group 15G2. With this structure, fluctuation of coma in the lower ray of a main light ray due to zooming may be corrected.

Next, values of various dimensions for this embodiment are listed in Table 15. In Table 15, f denotes the focal length, FN denotes a F-number, 2ω denotes field angle, Bf denotes the back focus, β denotes a shooting magnification, and D0 denotes the object point distance. The surface number is the order of the lens surface from the object side in the direction of travel of a light ray. The values of a refraction index and Abbe's number are relative to a d-line (λ=587.6 nm).

TABLE 15 f = 14.3~99.6
FN = 2.0~4.0
2ω = 40.50°~6.68°

| Surface Number | Radius of Curvature | Intersurface Distance | Refractive Index | Abbe Number |
|---|---|---|---|---|
| 1 | ∞ | 2.000 | 1.51680 | 64.1 |
| 2 | ∞ | 2.000 | | |
| 3 | 49.301 | 1.500 | 1.80518 | 25.4 |
| 4 | 26.700 | 7.000 | 1.62280 | 57.0 |
| 5 | 115.719 | 0.200 | | |
| 6 | 32.225 | 5.000 | 1.51823 | 58.9 |
| 7 | 169.097 | (d7 = variable) | | |
| 8 | 52.721 | 1.200 | 1.71300 | 53.9 |
| 9 | 20.378 | 4.300 | | |
| 10 | 226.333 | 1.200 | 1.74400 | 45.0 |
| 11 | 40.791 | 3.000 | | |
| 12 | −54.794 | 2.800 | 1.80518 | 25.3 |
| 13 | −24.000 | 1.100 | 1.69680 | 55.6 |
| 14 | −160.259 | (d14 = variable) | | |
| 15 | 72.124 | 2.700 | 1.49782 | 82.6 |
| 16 | −69.461 | 0.200 | | |
| 17 | 29.777 | 2.600 | 1.49782 | 82.6 |
| 18 | 2238.813 | (d18 = variable) | | |
| 19 | −2456.198 | 2.500 | 1.80518 | 25.4 |
| 20 | −22.000 | 1.000 | 1.61720 | 54.0 |
| 21 | 39.279 | 3.900 | | |
| 22 | −17.586 | 1.000 | 1.74400 | 45.0 |
| 23 | −1039.085 | (d23 = variable) | | |
| 24 | −77.463 | 3.500 | 1.49782 | 82.5 |
| 25 | −21.127 | 0.200 | | |
| 26 | 301.687 | 6.000 | 1.49782 | 82.6 |
| 27 | −17.800 | 1.200 | 1.80518 | 25.4 |
| 28 | −36.124 | 0.200 | | |
| 29 | 32.627 | 5.000 | 1.49782 | 82.6 |
| 30 | −115.033 | Bf | | |

Variable Interval During Zooming

| β | −0.020 | −0.040 | −0.050 | −0.080 | −0.100 | −0.120 |
|---|---|---|---|---|---|---|
| D0 | 692.911 | 692.911 | 692.911 | 692.911 | 692.911 | 692.911 |
| d7 | 0.145 | 8.6999 | 11.213 | 15.277 | 17.166 | 16.554 |
| d14 | 44.065 | 28.621 | 23.645 | 13.841 | 9.125 | 5.833 |
| 418 | 1.803 | 11.359 | 14.489 | 22.197 | 25.852 | 30.002 |
| d23 | 14.255 | 11.589 | 10.921 | 8.953 | 8.124 | 5.878 |
| Bf | 39.693 | 39.693 | 39.693 | 39.693 | 39.693 | 39.693 |

Condition Corresponding Values

| f1 = | 58.837 | βw1 = | −0.0921 | βc1 = | −0.0921 | βt1 = | −0.0921 |
|---|---|---|---|---|---|---|---|
| f2 = | −20.000 | βw2 = | −0.5862 | βc2 = | −1.0000 | βt2 = | −1.1971 |
| f3 = | 33.073 | βw3 = | −0.6385 | βc3 = | −1.0000 | βt3 = | −1.2351 |
| f4 = | −20.000 | βw4 = | −0.8068 | βc4 = | −1.0000 | βt4 = | −1.2257 |
| f5 = | 24.133 | βw5 = | −0.7192 | βc5 = | −0.7192 | βt5 = | −0.7192 |
| fw = | 14.909 | βw = | −0.0200 | βc = | −0.0662 | βt = | −0.1200 |
| ft = | 99.512 | Φ = | 16.0 | | | | |

| (3) | Φ/f3 = | 0.48378 |
|---|---|---|
| (9) | β1/β5 = | 0.1281 |
| (8) | f2/f4 = | 1.00000 |

FIGS. 45a–46d are various aberration graphs for this embodiment relative to a (λ=587.6 nm) and a g-line (λ=435.8 nm). FIGS. 45a–45d are various aberration graphs at a maximum wide-angle or the closest-distance focusing state. FIGS. 46a–46d are various aberration graphs at a maximum telephoto or the farthest-distance focusing state.

Figure 47:
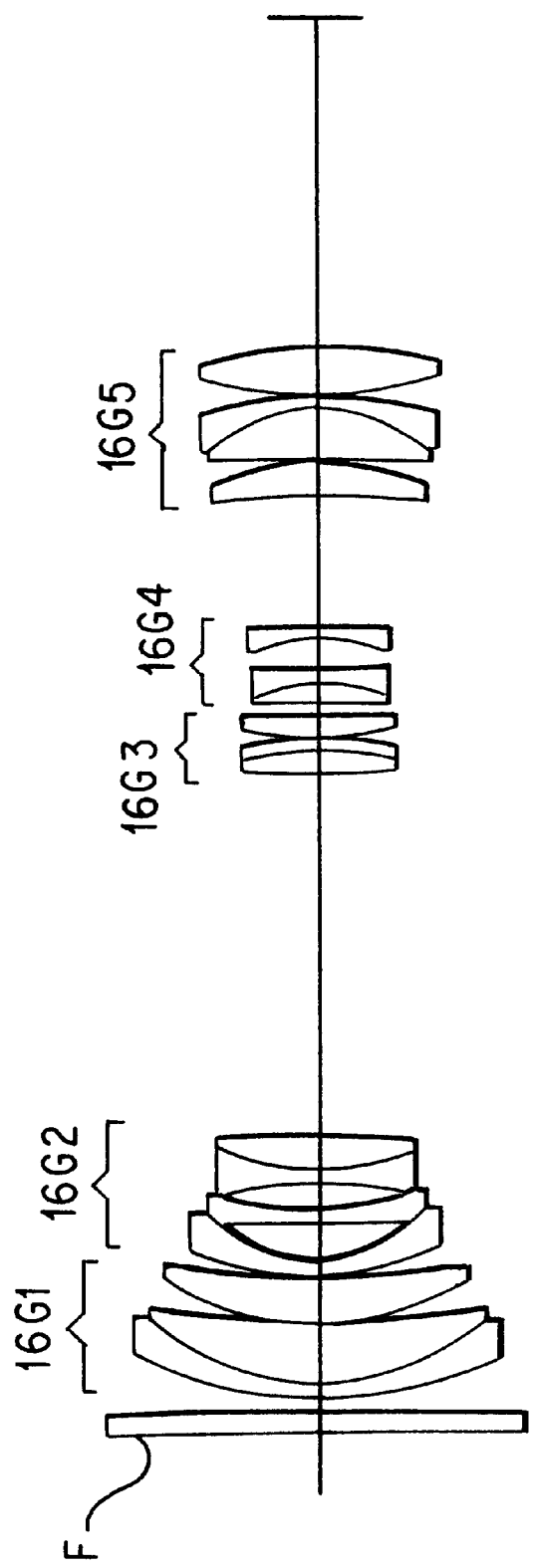
FIG. 47 is a side schematic drawing illustrating a lens structure according to a sixteenth preferred embodiment of the invention.
Figure 48:
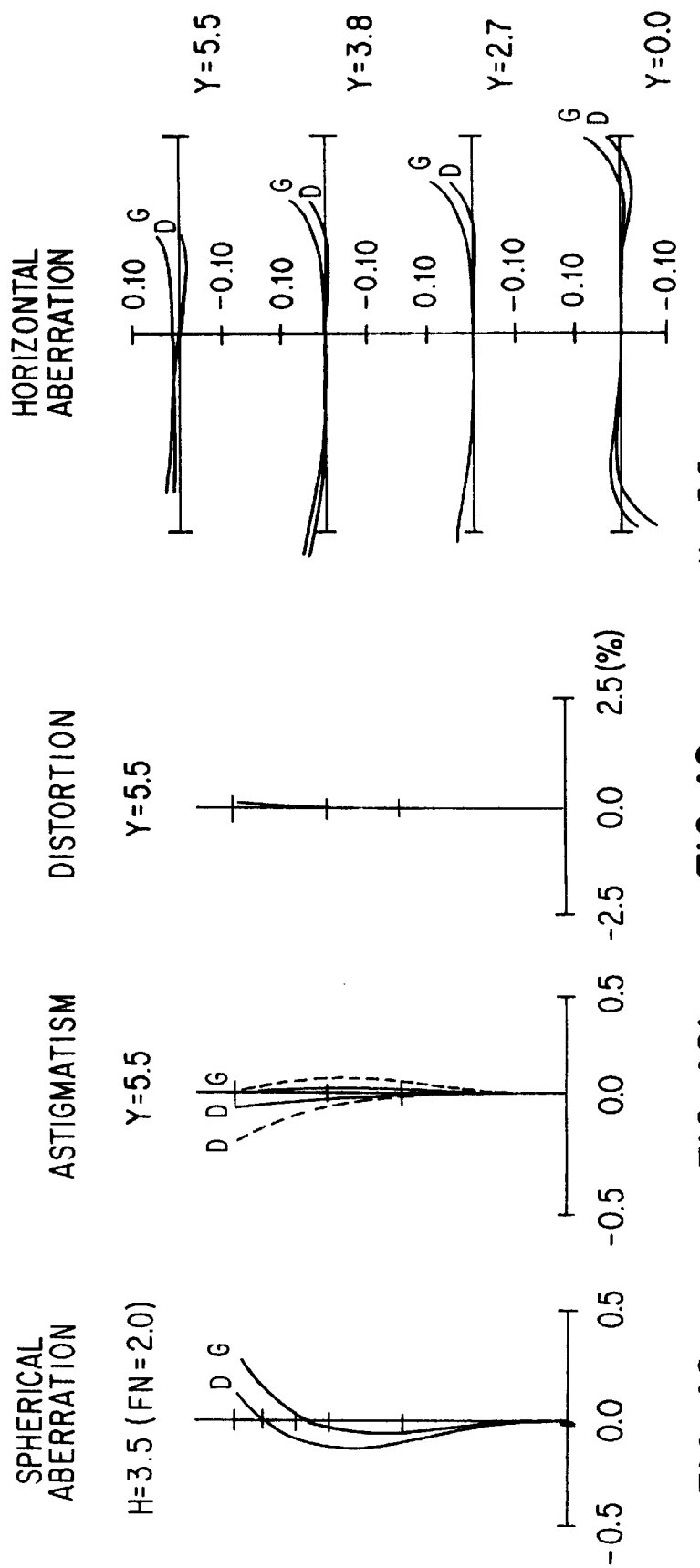
FIGS. 48a–48d are various aberration graphs at a maximum wide-angle state for the sixteenth embodiment preferred.
Figure 49:
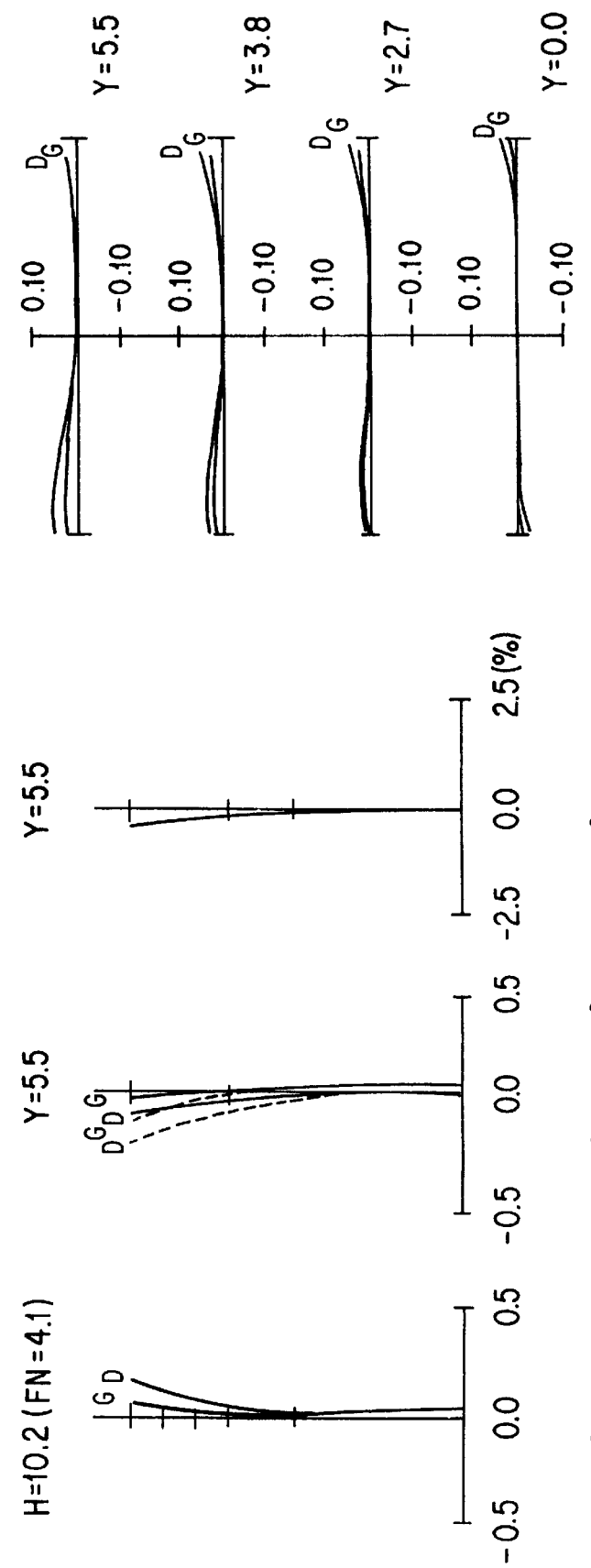
FIGS. 49a–49d are various aberration graphs at a maximum telephoto state for the sixteenth preferred embodiment.

FIG. 47 illustrates a lens structure for a zoom lens according to a sixteenth preferred embodiment of the invention.

A filter F comprising a parallel plate is provided on object side of the first lens group 16G1 for the zoom lens of FIG. 47. The first lens group 16G1 comprises a cemented positive lens, which comprises a negative meniscus lens with a weak curvature convex surface facing the object side and a positive meniscus lens with a strong curvature convex surface facing the object side; and a positive meniscus lens with a strong curvature convex surface facing the object side.

The second lens group 16G2 comprises a negative meniscus lens with a weak curvature convex surface facing the object side; a negative meniscus lens with a weak curvature convex surface facing the object side; and a cemented negative lens, which comprises a biconcave lens and a biconvex lens.

The third lens group 16G3 comprises a cemented positive lens, which comprises a biconvex lens and a negative meniscus lens with a strong curvature concave surface facing the object side; and a biconvex lens.

The fourth lens group 16G4 comprises a cemented negative lens, which comprises a positive meniscus lens with a weak curvature concave surface facing the object side and a biconcave lens; and a biconcave lens.

The fifth lens group 16G5 comprises a positive meniscus lens with a weak curvature concave surface facing the object side; a cemented positive lens, which comprises a biconvex lens and a negative meniscus lens with a strong curvature concave surface facing the object side; and a biconvex lens.

The zoom lens of this embodiment has a zoom ratio of about 600% and 12 groups with 17 individual pieces. Characteristics of this embodiment include lens arrangement and lens shape of the second lens group 16G2.

Next, values of various dimensions for this embodiment are listed in Table 16. In Table 16, f denotes the focal length, FN denotes a F-number, 2ω denotes a field angle, Bf denotes the back focus, β denotes a shooting magnification, and D0 denotes the object point distance. The surface number is the order of the lens surface from the object side in the direction of travel of a light ray. The values of a refraction index and Abbe's number are relative to a d-line (λ=587.6 nm).

TABLE 16 f = 14.9~98.1
FN = 2.0~4.1
2ω = 40.44°~6.72°

| Surface Number | Radius of Curvature | Intersurface Distance | Refractive Index | Abbe Number |
|---|---|---|---|---|
| 1 | ∞ | 2.000 | 1.51680 | 64.1 |
| 2 | ∞ | 2.000 | | |
| 3 | 44.103 | 1.500 | 1.80518 | 25.4 |
| 4 | 27.300 | 7.000 | 1.61720 | 54.0 |
| 5 | 116.689 | 0.200 | | |
| 6 | 31.925 | 5.000 | 1.51823 | 58.9 |
| 7 | 95.252 | (d7 = variable) | | |
| 8 | 39.841 | 1.100 | 1.71700 | 48.1 |
| 9 | 15.228 | 4.500 | | |
| 10 | 355.229 | 1.100 | 1.76684 | 46.8 |
| 11 | 38.839 | 3.100 | | |
| 12 | −51.546 | 1.100 | 1.65160 | 58.5 |
| 13 | 24.500 | 4.200 | 1.79504 | 28.6 |
| 14 | −166.600 | (d14 = variable) | | |
| 15 | 72.124 | 2.700 | 1.49782 | |
| 16 | −28.000 | 1.000 | 1.80518 | 25.4 |
| 17 | −50.075 | 3.900 | | |
| 18 | 35.791 | 1.000 | 1.49782 | 82.6 |
| 19 | −103.661 | (d19 = variable) | | |
| 20 | −375.814 | 2.500 | 1.80518 | 25.4 |
| 21 | −19.800 | 1.000 | 1.61720 | 54.0 |
| 22 | 45.255 | 3.900 | | 45.0 |
| 23 | −18.070 | 1.000 | 1.74400 | 45.0 |
| 24 | 472.498 | (d24 = variable) | | 82.5 |
| 25 | −76.968 | 3.500 | 1.80454 | 39.6 |
| 26 | −27.107 | 0.200 | | |
| 27 | 513.798 | 6.000 | 1.49782 | 82.6 |
| 28 | −17.800 | 1.200 | 1.80518 | 25.4 |
| 29 | −42.575 | 0.200 | | |

TABLE 16-continued

| 30 | −39.374 | 5.000 | 1.49782 | 82.6 |
|---|---|---|---|---|
| 31 | −54.266 | Bf | | |

Variable Interval During Zooming

| β | −0.020 | −0.040 | −0.050 | −0.080 | −0.100 | −0.120 |
|---|---|---|---|---|---|---|
| D0 | 694.019 | 694.019 | 694.019 | 694.019 | 694.019 | 694.019 |
| d7 | 0.572 | 8.493 | 10.861 | 14.926 | 16.419 | 15.353 |
| d14 | 40.529 | 25.362 | 20.494 | 10.802 | 6.550 | 3.828 |
| d19 | 1.185 | 11.260 | 14.510 | 22.121 | 26.166 | 30.807 |
| d24 | 15.094 | 12.266 | 11.516 | 9.531 | 8.244 | 5.391 |
| Bf | 36.950 | 36.950 | 36.950 | 36.950 | 36.950 | 36.950 |

Condition Corresponding Values

| f1 = | 58.837 | βw1 = | −0.0921 | βc1 = | −0.0921 | βt1 = | −0.0921 |
|---|---|---|---|---|---|---|---|
| f2 = | −20.000 | βw2 = | −0.6071 | βc2 = | −1.0000 | βt2 = | −1.1654 |
| f3 = | 33.073 | βw3 = | −0.6453 | βc3 = | −1.0000 | βt3 = | −1.2380 |
| f4 = | −20.000 | βw4 = | −0.7709 | βc4 = | −1.0000 | βt4 = | −1.2560 |
| f5 = | 24.133 | βw5 = | −0.7192 | βc5 = | −0.7192 | βt5 = | −0.7192 |
| fw = | 14.909 | βw = | −0.0200 | βc = | −0.0662 | βt = | −0.1200 |
| ft = | 98.091 | Φ = | 15.7 | | | | |

| (1) | Φ/f3 = | 0.47471 |
|---|---|---|
| (6) | β1/β5 = | 0.1281 |
| (7) | f2/f4 = | 1.00000 |

FIGS. 48a–49d are various aberration graphs for this embodiment relative to a d-line (λ=587.6 nm) and a g-line (λ=435.8 nm). FIGS. 48a–48d are various aberration graphs at a maximum wide-angle or the closest-distance focusing state. FIGS. 49a–49d are various aberration graphs at maximum telephoto state or farthest-distance focusing state.

Figure 50:
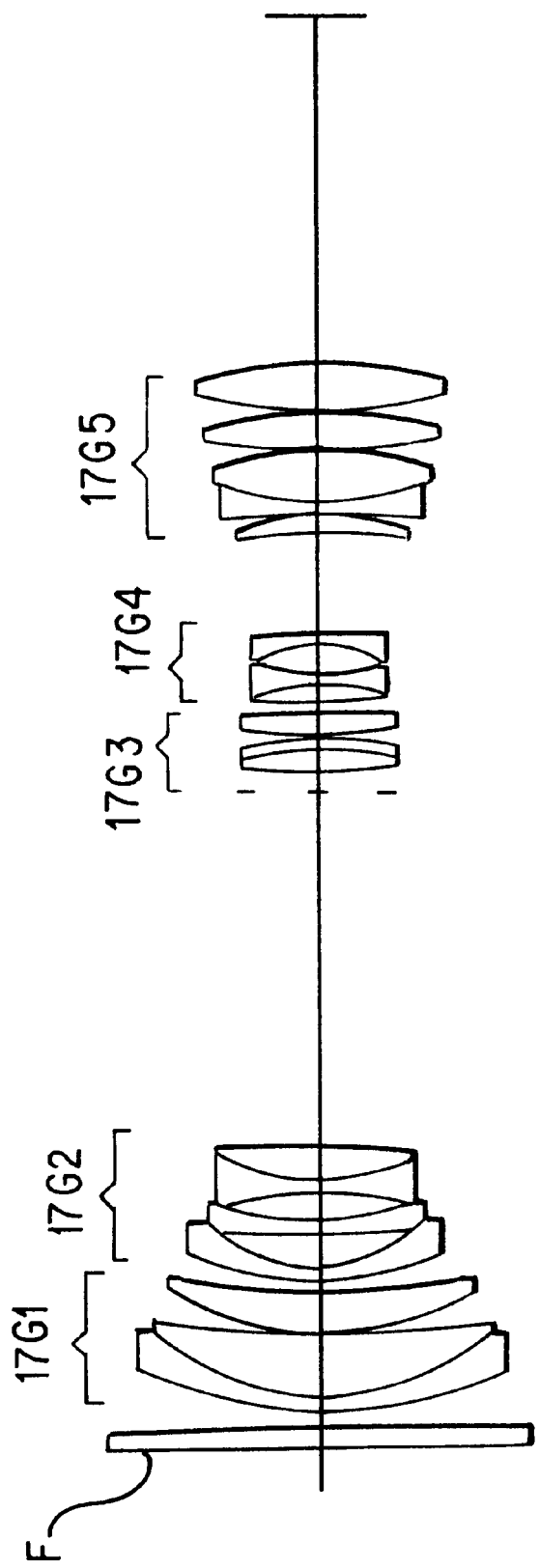
FIG. 50 is a side schematic drawing illustrating a lens structure according to a seventeenth preferred embodiment of the invention.
Figures 52A, 52B, 52C, 52D:
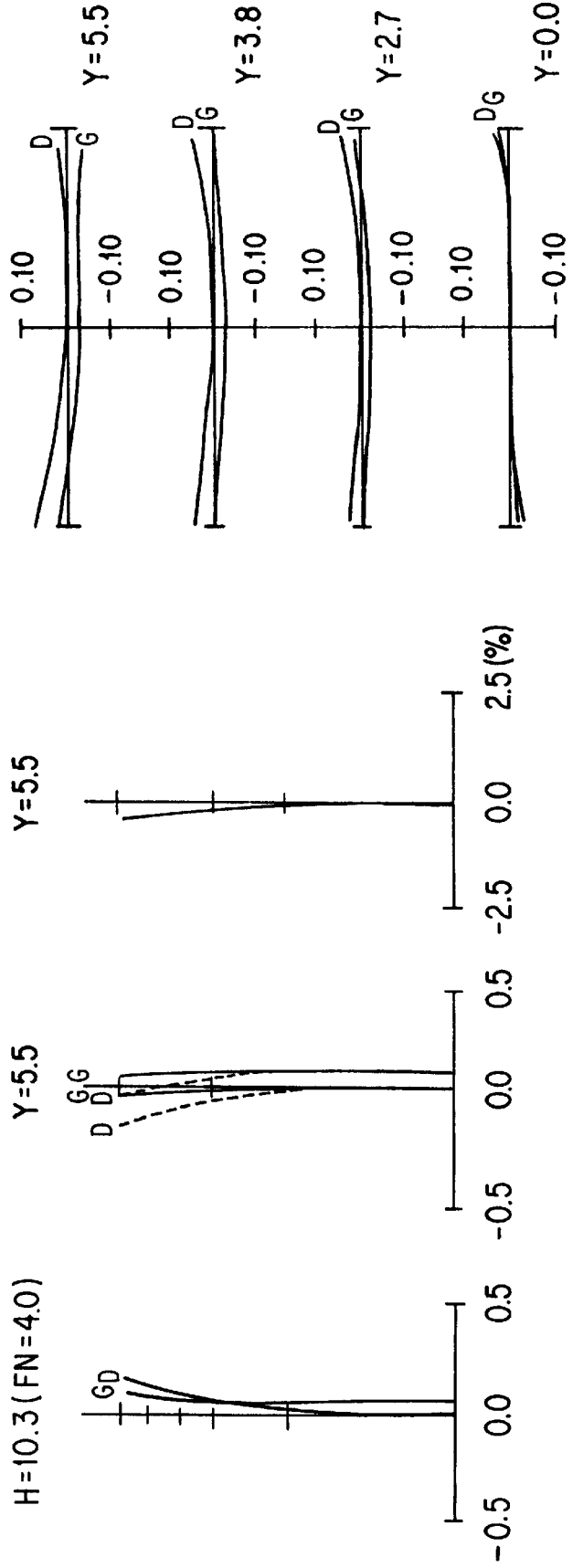
FIGS. 52a–52d are various aberration graphs at a maximum wide-angle state for the seventeenth preferred embodiment.

FIG. 50 illustrates lens structures for a zoom lens according to a seventeenth preferred embodiment of the invention.

A filter F comprising a parallel plate is provided on the object side of the first lens group 17G1 for the zoom lens of FIG. 50. The first lens group 17G1 comprises a cemented positive lens, which comprises a negative meniscus lens with a weak curvature convex surface facing the object side and a positive meniscus lens with a strong curvature convex surface facing the object side; and a positive meniscus lens with a strong curvature convex surface facing the object side.

The second lens group 17G2 comprises a negative meniscus lens with a weak curvature convex surface facing the object side; a negative meniscus lens with a weak curvature convex surface facing the object side; and a cemented negative lens, which comprises a biconcave lens and a biconvex lens.

The third lens group 17G3 comprises a cemented positive lens, which comprises a biconvex lens and a negative meniscus lens with the strong curvature concave surface facing the object side; and a biconvex lens.

The fourth lens group 11G4 comprises a cemented negative lens, which comprises a biconcave lens and a biconvex lens; and a negative meniscus lens with a weak curvature concave surface facing the object side.

The fifth lens group 17G5 comprises a positive meniscus lens with a weak curvature concave surface facing the object side; a cemented positive lens, which comprises a biconcave lens and a biconvex lens; a biconvex lens; and a biconvex lens.

The zoom lens of this embodiment has a zoom ratio of about 600% and 12 groups with 17 individual pieces. Characteristics of the seventeenth preferred embodiment include lens arrangement of the second lens group 17G2, biconvex lens shape of the third lens group 17G3, and the number of lenses in the fifth lens group 17G5 is one more than the other embodiments.

By positioning the negative lens component in the fifth lens group 17G5 as close as possible to the object side, a long back focus may be secured. Moreover, the fluctuation of coma in the lower ray as well as the upper ray of a main light ray due to zooming may be corrected.

Next, values of various dimensions this embodiment are listed in Table 17. In Table 17, f denotes the focal length, FN denotes F-number, 2ω denotes field angle, Bf denotes the back focus, β denotes shooting magnification, and D0 denotes the object point distance. The surface number is the order of the lens surface from the object side in the direction of travel advancement of the light ray, the values of a refraction index and Abbe's number are relative to a d-line (λ=587.6 nm).

TABLE 17 f = 14.9~98.1
FN = 2.0~4.0
2ω = 40.48°~6.70°

| Surface Number | Radius of Curvature | Intersurface Distance | Refractive Index | Abbe Number |
|---|---|---|---|---|
| 1 | ∞ | 2.000 | 1.51680 | 64.1 |
| 2 | ∞ | 2.000 | | |
| 3 | 52.027 | 1.500 | 1.80518 | 25.3 |
| 4 | 30.500 | 7.000 | 1.61720 | 54.0 |
| 5 | 131.933 | 0.200 | | |
| 6 | 33.143 | 5.000 | 1.62374 | 47.1 |
| 7 | 94.758 | (d7 = variable) | | |
| 8 | 38.096 | 1.100 | 1.71300 | 53.9 |
| 9 | 16.334 | 4.151 | | |
| 10 | 355.229 | 1.100 | 1.77279 | 49.5 |
| 11 | 35.159 | 3.200 | | |
| 12 | −51.546 | 1.100 | 1.74400 | 45.0 |
| 13 | 29.000 | 4.700 | 1.80384 | 33.9 |
| 14 | −99.982 | (d14 = variable) | | |
| 15 | 59.846 | 2.700 | 1.49782 | 82.5 |
| 16 | −30.500 | 1.000 | 1.80518 | 25.3 |
| 17 | −44.528 | 0.200 | | |
| 18 | 30.3053 | 2.700 | 1.49782 | 82.5 |
| 19 | 216.503 | (d19 = variable) | | |
| 20 | 114.358 | 2.400 | 1.80518 | 25.3 |
| 21 | −18.000 | 1.000 | 1.65160 | 58.5 |
| 22 | 25.297 | 3.100 | | |
| 23 | −14.320 | 1.000 | 1.59319 | 67.9 |
| 24 | −367.727 | (d24 = variable) | | |
| 25 | −42.161 | 2.000 | 1.79668 | 45.4 |
| 26 | −30.296 | 0.200 | | |
| 27 | −81.960 | 1.200 | 1.80518 | 25.3 |
| 28 | 29.747 | 5.800 | 1.49782 | 82.5 |
| 29 | −33.739 | 0.200 | | |
| 30 | 76.558 | 3.800 | 1.49782 | 82.5 |
| 31 | −54.623 | 0.200 | | |
| 32 | 40.327 | 5.200 | 1.49782 | 82.5 |
| 33 | −51.417 | Bf | | |

Variable Interval During Zooming

| β | −0.020 | −0.040 | −0.050 | −0.080 | −0.100 | −0.120 |
|---|---|---|---|---|---|---|
| D0 | 693.451 | 693.451 | 693.451 | 693.451 | 693.451 | 693.451 |
| d7 | 1.089 | 9.500 | 11.611 | 15.771 | 16.638 | 14.870 |
| d14 | 41.250 | 25.551 | 20.929 | 10.971 | 7.716 | 4.549 |
| d19 | 1.129 | 10.793 | 14.258 | 21.807 | 26.386 | 30.750 |
| d24 | 11.595 | 9.219 | 8.264 | 6.512 | 4.322 | 1.893 |
| Bf | 39.720 | 39.720 | 39.720 | 39.720 | 39.720 | 39.720 |

(Condition Corresponding Values)

| f1 = | 58.837 | βw1 = | −0.0921 | βc1 = | −0.0921 | βt1 = | −0.0921 |
|---|---|---|---|---|---|---|---|
| f2 = | −20.000 | βw2 = | −0.6071 | βc2 = | −1.0000 | βt2 = | −1.1654 |
| f3 = | 33.073 | βw3 = | −0.6453 | βc3 = | −1.0000 | βt3 = | −1.2380 |
| f4 = | −20.000 | βw4 = | −0.7709 | βc4 = | −1.0000 | βt4 = | −1.2560 |
| f5 = | 24.133 | βw5 = | −0.7192 | βc5 = | −0.7192 | βt5 = | −0.7192 |

TABLE 17-continued

| fw = | 14.909 | βw = | −0.0200 | βc = | −0.0662 | βt = | −0.1200 |
|---|---|---|---|---|---|---|---|
| ft = | 98.091 | Φ = | 16.0 | | | | |
| | (3) | | Φ/f3 = | | 0.48378 | | |
| | (9) | | β1/β5 = | | 0.1281 | | |
| | (8) | | f2/f4 = | | 1.00000 | | |

FIGS. 51a–52d are various aberration graphs for this embodiment relative to a-line (λ=587.6 nm) and a g-line (λ=435.8 nm). FIGS. 51a–51d are various aberration graphs at a maximum wide-angle of closest-distance focusing state. FIGS. 52a–52d are various aberration graphs at a maximum telephoto or the farthest-distance focusing state.

In each of the ninth through seventeenth embodiments described above, particularly at a maximum wide-angle state, distortion is nearly perfectly corrected. Since the decline of illumination ratio depends on $\cos^4\theta$, vignetting needs to be controlled. Aberration graphs clearly indicate that the amount of light in a marginal zone is sufficient in each embodiment. Because the amount of light in a marginal zone is large, a lens arrangement and lens shape of the second lens group as well as a lens shape of the third lens group are configured to control occurrences of coma due to zooming, particularly as countermeasures for coma in lower rays of the main light ray. A lens arrangement and shape of the fifth lens group is configured as a countermeasure for comas in upper rays of the main light ray.

The zoom lens can include a fixed aperture diaphragm S provided between the third lens group G3 and the fourth lens group G4. If the diaphragm S is provided, the condition (15) should be satisfied:

$$0.3 < D3S/D4S < 2.0 \tag{15}$$

where, D3S is an on-axis distance between the third lens group G3 and the aperture diaphragm S at a maximum wide-angle state and D4S is an on-axis distance between a fourth lens group G4 and the aperture diaphragm S at the maximum wide-angle state.

The second lens group G2 through the fourth lens group G4 have a simultaneous larger magnification than substantial equal magnification towards a maximum telephoto state from a near equal magnification zoom arrangement. Furthermore, the second lens group G2 through fourth lens group G4 have a simultaneously smaller magnification than a substantially equal magnification towards a maximum wide-angle state from the near equal magnification zoom arrangement.

The invention according to the eighteenth and nineteenth embodiments satisfies the conditions below;

$$-0.9 < (1/f1 + 1/f2)fw < 0 \tag{1}$$

$$-0.5 < (1/f4 + 1/f5)fw < 0.2 \tag{2}$$

$$0.3 < D3S/D4S < 2.0 \tag{15}$$

where f1 is a focal length of the first lens group G1; f2 is a focal length of the second lens group G2; f4 is a focal length of the fourth lens group G4; f5 is a focal length of the fifth lens group G5; fw is a focal length of the total zoom lens system at the maximum wide-angle state; D3S is an on-axis distance between the third lens group G3 and the aperture diaphragm S at a maximum wide-angle state; and D4S is an on-axis distance between the fourth lens group G4 and the aperture diaphragm S at a maximum wide-angle state.

The exit pupil is not far removed in a maximum telephoto state side because the position of the aperture diaphragm S is fixed between the third lens group G3 and the fourth lens group G4. Thus, the diameter of the optical system does not become too large. By fixing the position of the aperture diaphragm S, the mechanical structure becomes simple. Furthermore, it is convenient to provide a structure to cut or shield an upper flare component in a maximum wide-angle state side and to cut or shield a lower flare component in a maximum telephoto state side.

Condition (15) fixes the aperture diaphragm at a position between the third lens group G3 and the fourth lens group G4. If D3S/D4S is larger than the upper limit of condition (15), the aperture diaphragm S becomes too close to the fourth lens group G4. This causes structural inconvenience. Moreover, the main light ray will be too low in the first lens group G1, causing the diameter of the lens to become large. This is inconvenient if the system is desired to be small.

On the other hand, if D3S/D4S is smaller than the lower limit of condition (15), the aperture diaphragm S becomes too close to the third lens group G3. This also causes structural inconvenience. The main light ray is too high in the fifth lens group G5, causing the diameter of the lens to become large. If the value of D3S/D4S deviates from the range of condition (15), correction of coma and a bow in image plane becomes large.

Furthermore, the conditions (16) and (17) should be satisfied by the zoom lens:

$$-1.0 < \Delta D3S/f3 < 2.0 \tag{16}$$

$$-0.5 < \Delta D4S/|f4| < 1.0 \tag{17}$$

where, f3 is focal length of the third lens group G3; ΔD3S is a displacement amount of an on-axis distance D3S during zooming from a maximum wide-angle state to a maximum telephoto state; ΔD4S is a displacement amount of an on-axis distance D4S during zooming from a maximum wide-angle state to a maximum telephoto state. Here, the signs for ΔD3S and ΔD4S are positive (+) for an increase and negative (−) for a decrease.

Condition (16) defines an appropriate range for a displacement amount of an on-axis distance D3S between the third lens group G3 and the aperture diaphragm S. Condition (17) defines an appropriate range for displacement amount of an on-axis distance D4S between the fourth lens group G4 and the aperture diaphragm S.

If ΔD3S is larger than the upper limit of condition (16), the movement of the third lens group G3 becomes large, causing the driving mechanism for movement to become complicated. Moreover, fluctuation of coma and image plane bow in a lower region of a main light ray during zooming becomes large. On the other hand, if ΔD3S is smaller than the lower limit of condition (16), the movement of the third lens group G3 becomes small and the zoom lens fails to obtain a sufficient zoom ratio.

If ΔD4S is larger than the upper limit of condition (17), the movement of the fourth lens group G4 becomes large. This causes the driving mechanism to become complicated. Moreover, fluctuation of coma and image plane bow in an upper region from a main light ray during zooming becomes large. On the other hand, if ΔD4S is smaller than the lower limit of condition (17), the movement of the fourth lens group G4 becomes too small. The zoom fails to obtain sufficient zoom ratio.

In order to produce a simple optical system, each lens group may preferably be formed from the least number of lenses possible. Particularly, the second lens group G2 and the third lens group G3, which are movable, may be formed of no more than three lenses. Moreover, the second lens group G2 can be formed of a negative single lens L21, and a cemented negative lens L22 having a positive single lens and a negative single lens.

When the second lens group G2 is a negative single lens L21 and a cemented negative lens L22, which includes a positive single lens and a negative single lens, the condition (18) can be satisfied to control fluctuations of spherical aberration during zooming;

$$0.3 < f21/f22 < 1.5 \tag{18}$$

where, f21 is a focal length of the negative single lens L21, and f22 is a focal length of the cemented negative lens L22.

Moreover, to eliminate color, a difference $\Delta \upsilon$ between Abbe's number for the positive single lens and Abbe's number for the negative single lens in the cemented lens L22 should satisfy condition (19);

$$15 < \Delta \upsilon \tag{19}$$

The third lens group G3 can be formed of a cemented lens having a positive single lens and a negative single lens, and a single lens.

Figure 53:
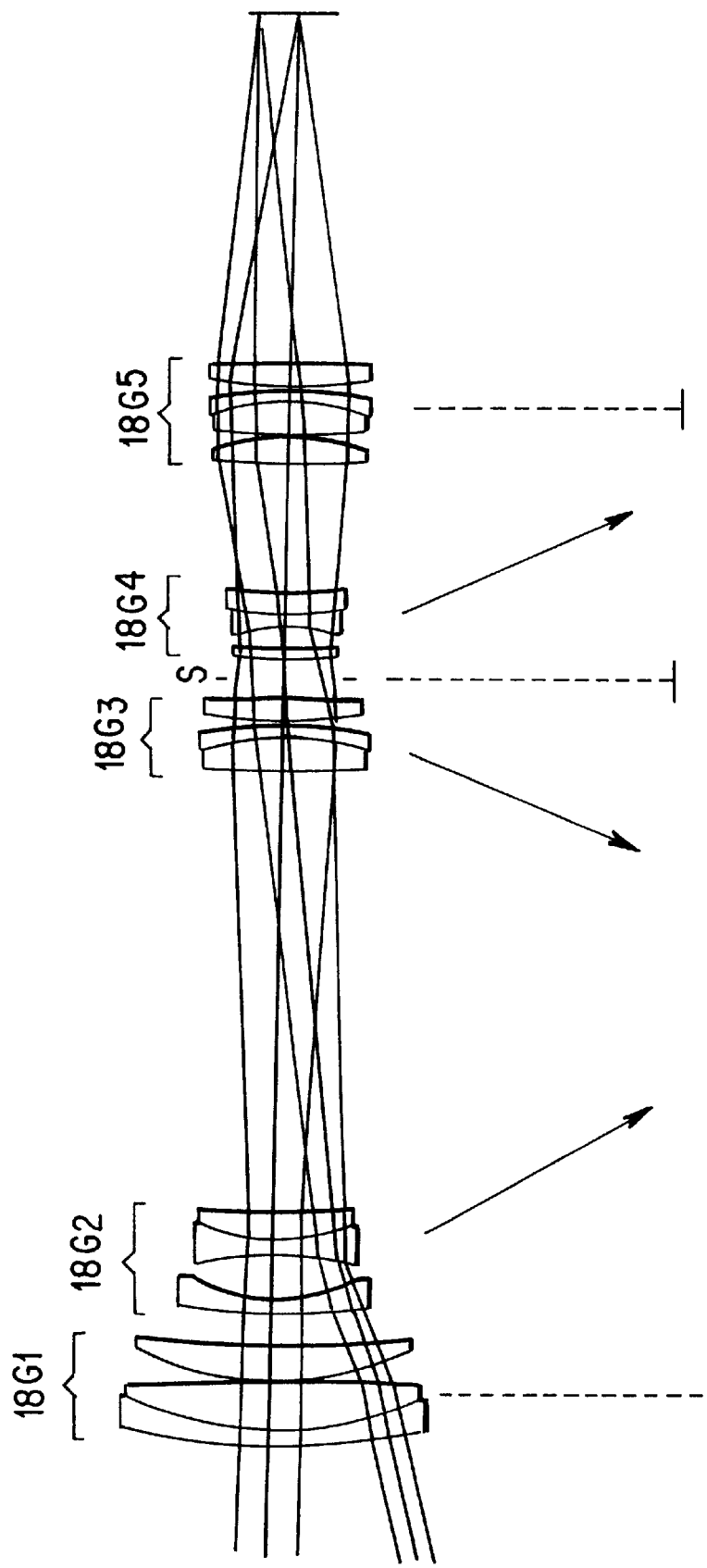
FIG. 53 is a side schematic drawing illustrating a lens structure according to an eighteenth preferred embodiment of the invention.
Figures 54A, 54B, 54C, 54D:
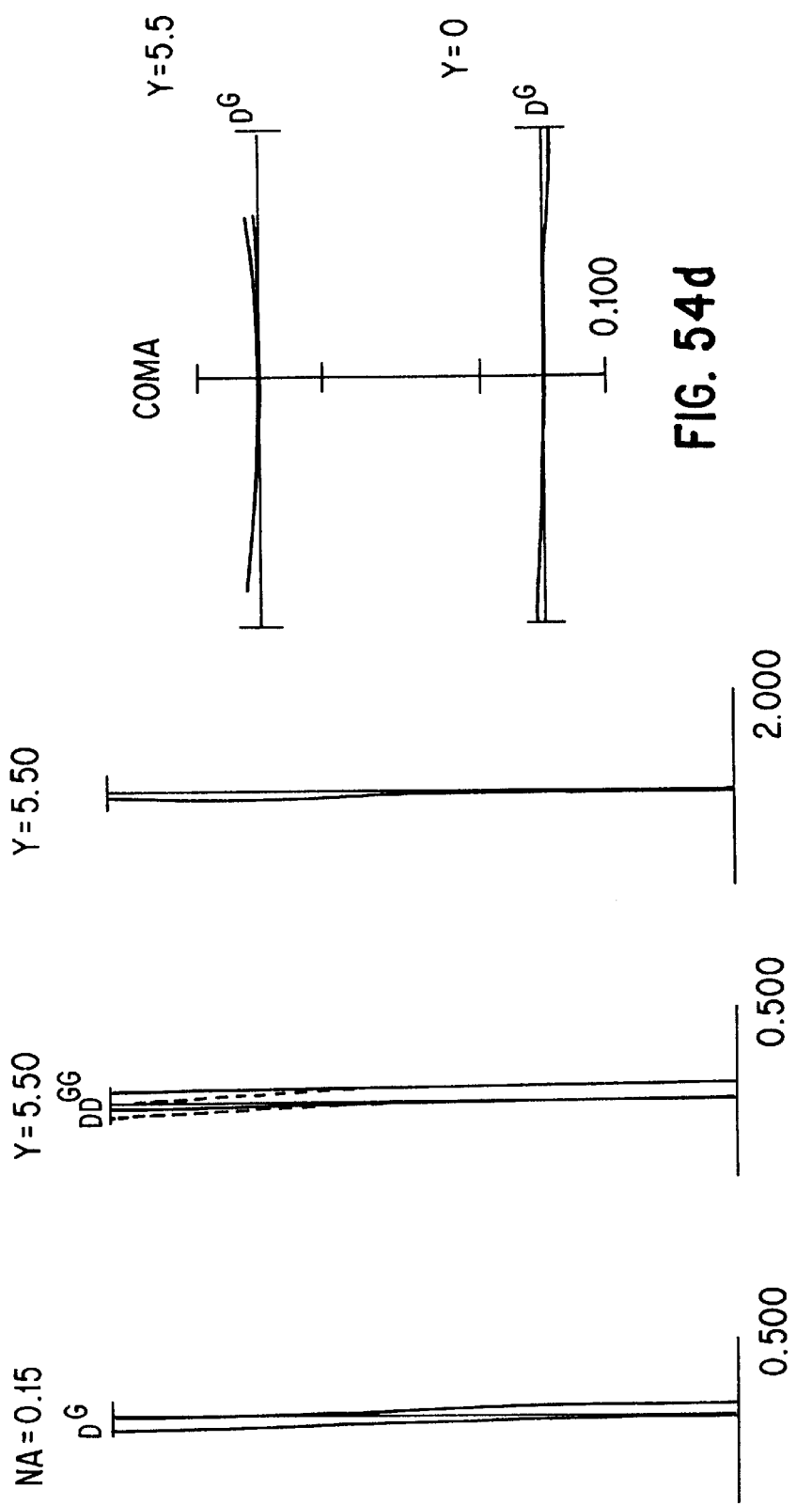
FIGS. 54a–54d are various aberration graphs at a maximum wide-angle state for the eighteenth preferred embodiment.

FIG. 53 illustrates a lens structure for a zoom lens according to the eighteenth preferred embodiment of the invention. In the zoom lens of FIG. 53, first lens group 18G1 comprises a cemented positive lens, which includes a negative meniscus lens with a convex surface facing the object side and a biconvex lens; and a positive meniscus lens with a convex surface facing the object side.

The second lens group 18G2 comprises a negative meniscus lens with a convex surface facing the object side; and a cemented negative lens, which includes a biconcave lens and a positive meniscus lens with a convex surface facing the object side.

The third lens group 18G3 comprises a cemented positive lens, which includes a biconvex lens and a negative meniscus lens with the concave surface facing the object side; and a biconvex lens.

The fourth lens group 18G4 comprises a negative meniscus lens with a convex surface facing the object side; and a cemented negative lens, which includes a biconcave lens and a positive meniscus lens with a biconvex surface facing the object side.

The fifth lens group 18G5 comprises a biconvex lens; a cemented positive lens which includes a biconvex lens and a positive meniscus lens with a convex surface facing the object side; and a biconvex lens.

Next, values of various dimensions in this embodiment are listed in Table 18. In Table 18, NA denotes the object side aperture number, FNO denotes an effective F-number, Bf denotes the back focus, β denotes a shooting magnification, and D0 denotes the object point distance. The surface number is the order of the lens surface from the object side in the direction of travel of a light ray. The refraction index (D) and the refraction index (G) are refraction indices relative to a d-line ($\lambda$=587.6 nm) and g-line ($\lambda$=435.8 nm), respectively.

TABLE 18

β = -0.226~-0.1356
NA = 0.15~0.12
FNO = 3.5~4.2

| Surface Number | Radius of Curvature | Intersurface Distance | Abbe Number | Refractive Index (D) | Refractive Index (G) |
|---|---|---|---|---|---|
| 1 | 106.7959 | 2.000 | 25.50 | 1.804581 | 1.846310 |
| 2 | 52.6200 | 7.5000 | 58.54 | 1.612720 | 1.625709 |
| 3 | -863.5284 | 0.3000 | | | |
| 4 | 49.8381 | 5.000 | 58.54 | 1.612720 | 1.625709 |
| 5 | 135.6045 | (d5 = variable) | | | |
| 6 | 79.4647 | 1.8000 | 51.09 | 1.733500 | 1.751403 |
| 7 | 24.6165 | 6.800 | | | |
| 8 | -67.4478 | 1.5000 | 51.09 | 1.733500 | 1.751403 |
| 9 | 27.6070 | 4.5000 | 23.01 | 1.860741 | 1.910649 |
| 10 | 99.6760 | (d10 = variable) | | | |
| 11 | 241.5064 | 5.0000 | 82.52 | 1.497820 | 1.505265 |
| 12 | -29.8600 | 2.0000 | 25.20 | 1.804581 | 1.846310 |
| 13 | -49.3631 | 0.3000 | | | |
| 14 | 54.6371 | 3.6000 | 69.98 | 1.518601 | 1.527667 |
| 15 | -113.6091 | (d15 = variable) | | | |
| 16 | ∞ | (d16 = variable) | (aperture diaphragm S) | | |
| 17 | 181.9856 | 1.5000 | 60.14 | 1.620409 | 1.633173 |
| 18 | 47.3957 | 3.000 | | | |
| 19 | -22.8011 | 1.5000 | 54.01 | 1.617200 | 1.631485 |
| 20 | 23.8970 | 3.6000 | 25.50 | 1.804581 | 1.846310 |
| 21 | 164.2025 | (d21 =variable) | | | |
| 22 | 2769.5356 | 3.5000 | 46.80 | 1.766840 | 1.787458 |
| 23 | -37.7169 | 0.3000 | | | |
| 24 | 207.1700 | 5.0000 | 82.52 | 1.497820 | 1.505265 |
| 25 | -25.6660 | 1.3000 | 25.50 | 1.804581 | 1.846310 |
| 26 | -84.0862 | 0.3000 | | | |
| 27 | 57.6312 | 4.000 | 82.52 | 1.497820 | 1.505265 |
| 28 | -252.3130 | Bf | | | |

(Variable Interval Zooming)

| | Maximum Wide-Angle State | Maximum Telephoto State |
|---|---|---|
| β | -0.226 | -0.1356 |
| D0 | 850.0002 | 850.0002 |
| d5 | 4.54497 | 31.92859 |
| d10 | 64.64386 | 7.82052 |
| d15 | 2.43229 | 31.87202 |
| d16 | 3.15047 | 9.27069 |
| d21 | 18.79476 | 12.67454 |
| Bf | 51.2448 | 51.2448 |

Condition Corresponding Values

| | | |
|---|---|---|
| | f1 = | 80.65047 |
| | f2 = | -26.47146 |
| | f3 = | 45.34412 |
| | f4 = | -28.92587 |
| | f5 = | 33.18521 |
| | fw = | 20.67557 |
| | D3S = | 2.43229 |
| | D4S = | 3.15047 |
| | ΔD3S = | 29.4397 |
| | ΔD4S = | 6.1202 |
| | φ= | 10.08 |
| | f21 = | -49.30738 |
| | f22 = | -66.36008 |
| (1) | (1/f1 + 1/f2)fw = | -0.524691 |
| (2) | (1/f4 + 1/f5)fw = | -0.091742 |
| (3) | D3S/D4S = | 0.77204 |
| (5) | ΔD3S/f3 = | 0.649251 |
| (6) | ΔD4S/\|f4\| = | 0.108915 |
| (7) | φ/f3 = | 0.2223 |
| (8) | β2 = | -0.56357~-1.35147 |
| (9) | β3 = | -0.63131~-1.26450 |
| (10) | β4 = | -0.84545~-1.05703 |
| (11) | f2/f4 = | 0.915148 |
| (12) | f21/f22 | 0.743028 |
| (19) | Δυ = | 28.08 |

FIGS. 54a–55d are various aberration graphs for this embodiment relative to a d-line (λ=587.6 nm) and a g-line (λ=435.8 nm). FIGS. 54a–54d are various aberration graphs at a maximum wide-angle or closest-distance focusing state. FIGS. 55a–55d are various aberration graphs at a maximum telephoto or farthest-distance focusing state.

Figure 56:
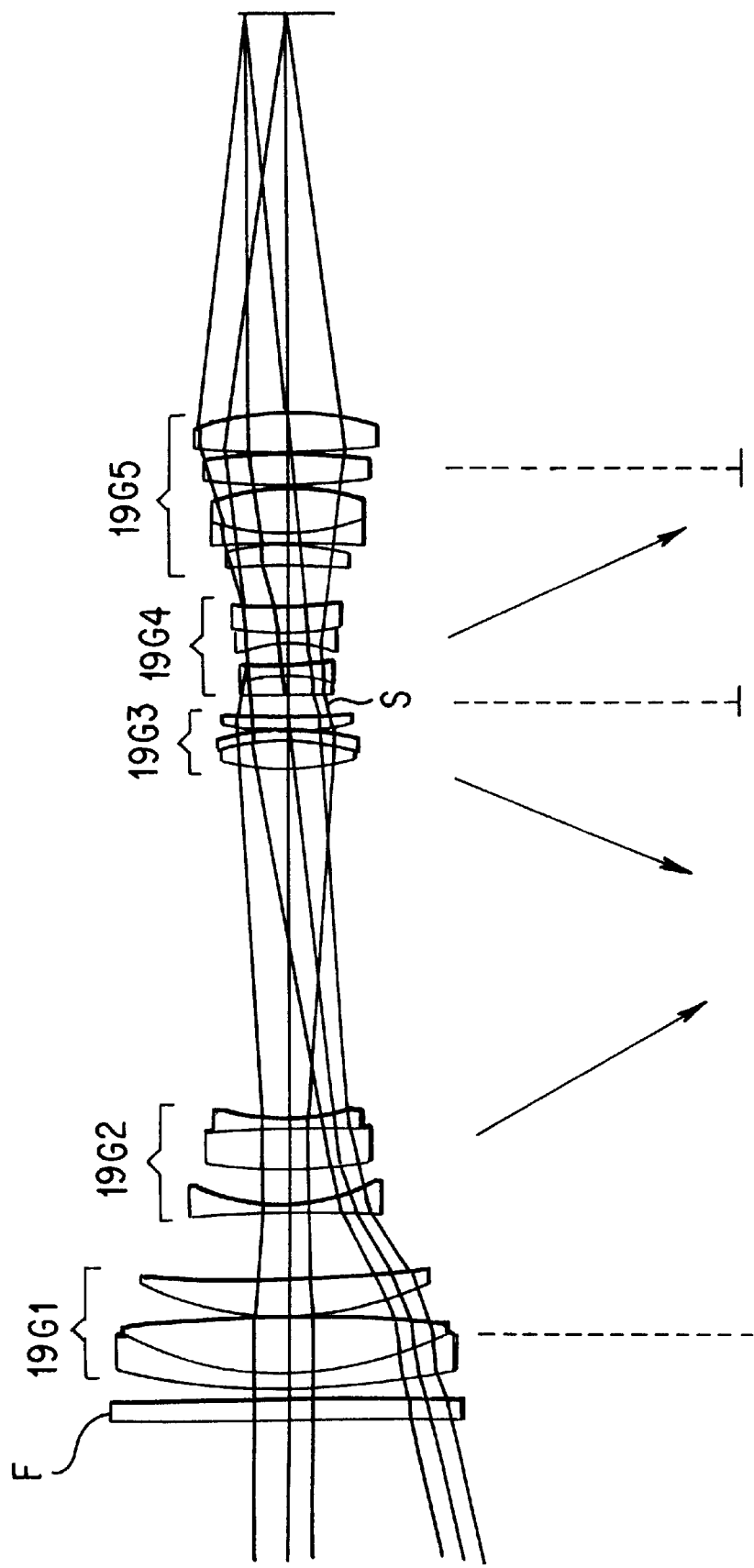
FIG. 56 is a side schematic drawing illustrating a lens structure according to a nineteenth preferred embodiment of the invention.
Figures 57A, 57B, 57C, 57D:
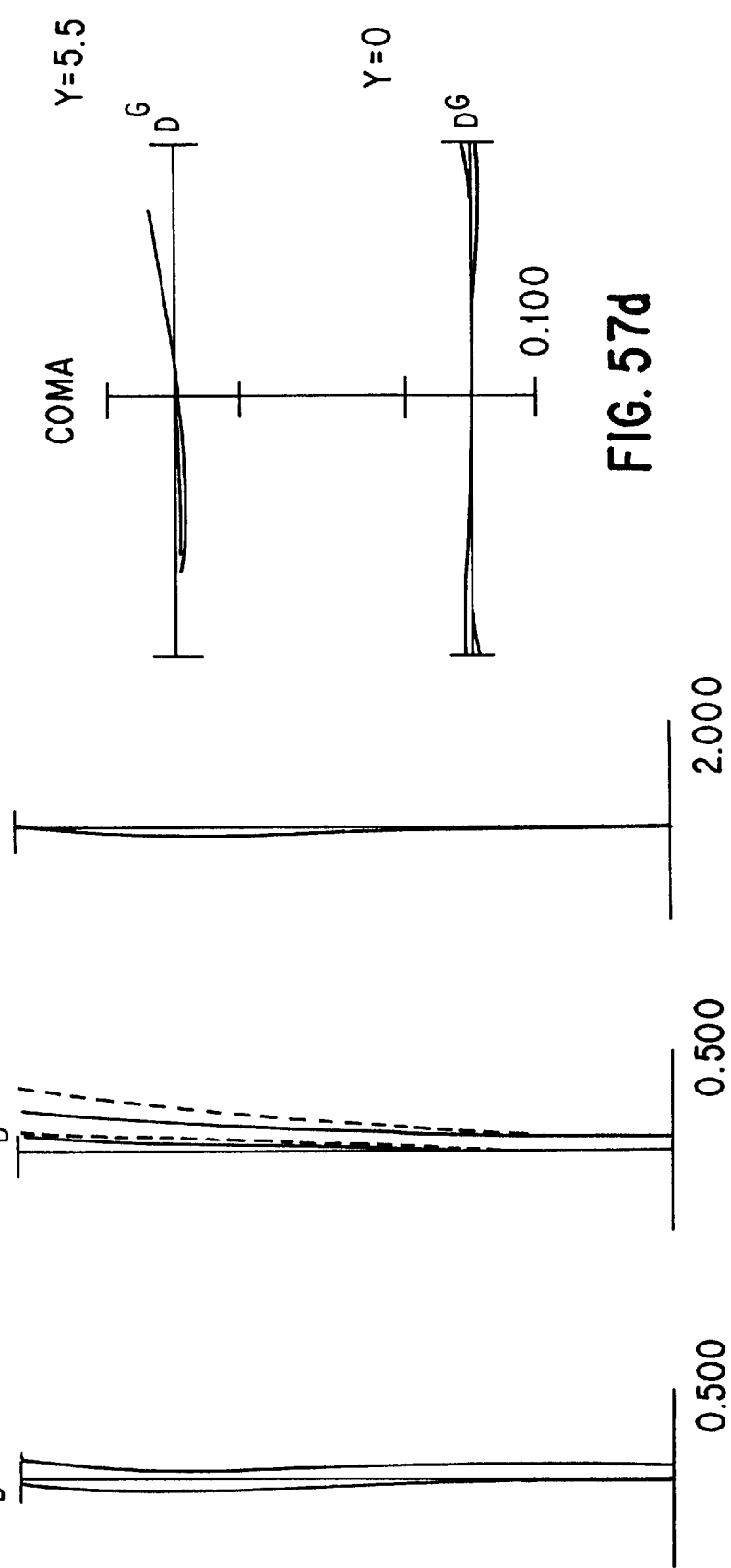
FIGS. 57a–57d are various aberration graphs at a maximum wide-angle state for the nineteenth preferred embodiment.

FIG. 56 illustrates a lens structure of a zoom lens according to a nineteenth preferred embodiment of the invention.

A filter F comprising a parallel plate is provided on the object side of the first lens group 19G1 for the zoom lens of FIG. 56. The first lens group 19G1 comprises a cemented positive lens, which includes a negative meniscus lens with a convex surface facing the object side and a biconvex lens; and a positive meniscus lens with a convex surface facing the object side.

The second lens group 19G2 comprises a negative meniscus lens with a convex surface facing the object side; and a cemented negative lens, which includes a biconcave lens and a biconvex lens.

The third lens group 19G3 comprises a cemented positive lens, which includes a biconvex lens and a negative meniscus lens with the concave surface facing the object side; and a positive meniscus lens with a biconvex surface facing the object side.

The fourth lens group 19G4 comprises a cemented negative lens, which includes a biconcave lens and a positive meniscus lens with a biconcave surface facing the object side; and a cemented negative lens, which includes a biconcave lens and a positive meniscus lens with a biconvex surface facing the object side.

The fifth lens group 19G5 comprises a positive meniscus lens with a biconcave surface facing the object side; a cemented positive lens, which includes a biconcave lens and a biconvex lens; a biconvex lens; and a biconvex lens.

Next, values of various dimensions for this embodiment are listed in Table 19. In Table 19, NA denotes the object side aperture number, FNO denotes an effective F-number, Bf denotes the back focus, β denotes a shooting magnification, and D0 denotes the object point distance. The surface number is the order of the lens surface from the object side in the direction of travel of a light ray. The refraction index (D) and refraction index (G) are refraction indices relative to a d-line (λ=587.6 nm) and g-line (λ=435.8 nm), respectively.

TABLE 19

β = –0.0250~–0.120
NA = 0.14~0.11
FNO = 3.6~4.5

| Surface Number | Radius of Curvature | Intersurface Distance | Abbe Number | Refractive Index (D) | Refractive Index (G) |
|---|---|---|---|---|---|
| 1 | ∞ | 2.0000 | 64.10 | 1.516800 | 1.526703 |
| 2 | ∞ | 2.0000 | | | |
| 3 | 110.9804 | 1.5000 | 25.35 | 1.805182 | 1.847252 |
| 4 | 41.1963 | 6.9000 | 47.10 | 1.623741 | 1.640493 |
| 5 | –182.4525 | 0.2000 | | | |
| 6 | 43.3991 | 4.6000 | 50.84 | 1.658440 | 1.674735 |
| 7 | 136.6342 | (d7 = variable) | | | |
| 8 | 1286.4230 | 1.0000 | 47.47 | 1.787971 | 1.808793 |
| 9 | 22.9487 | 4.5000 | | | |
| 10 | 45.5627 | 4.8000 | 23.10 | 1.860741 | 1.910649 |
| 11 | –491.2425 | 1.0000 | 43.35 | 1.840421 | 1.864916 |
| 12 | 22.0868 | (d12 = variable) | | | |
| 13 | 29.6102 | 4.0000 | 82.52 | 1.497820 | 1.505265 |
| 14 | –21.7362 | 1.0000 | 25.35 | 1.805182 | 1.847252 |
| 15 | –28.5963 | 0.2000 | | | |
| 16 | 66.5690 | 1.5000 | 82.52 | 1.497820 | 1.505265 |
| 17 | 116.2056 | (d17 = variable) | | | |
| 18 | ∞ | (d18 = variable) | (aperture diaphragm S) | | |

TABLE 19-continued

| 19 | 182.7880 | 2.7000 | 25.35 | 1.805182 | 1.847252 |
|---|---|---|---|---|---|
| 20 | –15.7572 | 1.0000 | 60.14 | 1.620409 | 1.633173 |
| 21 | 69.8292 | 3.5000 | | | |
| 22 | –14.4756 | 1.0000 | 49.52 | 1.744429 | 1.763231 |
| 23 | 21.5904 | 3.2000 | 28.56 | 1.795040 | 1.831518 |
| 24 | 112.5463 | (d24 = variable) | | | |
| 25 | –38.3582 | 2.1000 | 45.37 | 1.796681 | 1.818801 |
| 26 | –30.5562 | 0.2000 | | | |
| 27 | –81.3514 | 1.0000 | 25.35 | 1.805182 | 1.847252 |
| 28 | 25.0636 | 6.0000 | 82.52 | 1.497820 | 1.505265 |
| 29 | –29.7894 | 0.2000 | | | |
| 30 | 58.0745 | 3.9000 | 82.52 | 1.497820 | 1.505265 |
| 31 | –85.9937 | 0.2000 | | | |
| 32 | 58.5071 | 5.0000 | 82.52 | 1.497820 | 1.505265 |
| 33 | –34.6990 | Bf | | | |

Variable Interval Zooming

| | Maximum Wide-Angle State | Maximum Telephoto State |
|---|---|---|
| β | –0.0250 | –0.120 |
| D0 | 790.0861 | 794.0861 |
| d7 | 8.33469 | 23.92179 |
| d12 | 44.44477 | 12.90847 |
| d17 | 1.47689 | 17.41609 |
| d18 | 1.15604 | 5.29134 |
| d24 | 5.51057 | 1.37477 |
| Bf | 50.3843 | 50.3843 |

Condition Corresponding Values

| | | |
|---|---|---|
| | f1 = | 60 |
| | f2 = | –17.5 |
| | f3 = | 30 |
| | f4 = | –17 |
| | f5 = | 25 |
| | fw = | 21.49186 |
| | D3S = | 1.47680 |
| | D4S = | 1.15604 |
| | ΔD3S = | 15.9392 |
| | ΔD4S = | 4.1353 |
| | φ= | 7.87 |
| | f21 = | –29.66313 |
| | f22 = | –59.26113 |
| (1) | (1/f1 + 1/f2)fw = | –0.869909 |
| (2) | (1/f4 + 1/f5)fw = | –0.404553 |
| (3) | D3S/D4S = | 1.277542 |
| (5) | ΔD3S/f3 = | 0.531307 |
| (6) | ΔD4S/|f4| = | 0.243253 |
| (7) | φ/f3 = | 0.262333 |
| (8) | β2 = | –0.57625~–1.18392 |
| (9) | β3 = | –0.63626~–1.14293 |
| (10) | β4 = | –0.80745~–1.05070 |
| (11) | f2/f4 = | 1.029412 |
| (12) | f21/f22 = | 0.50055 |
| (19) | Δν = | 20.34 |

FIGS. 57a–58d are various aberration graphs for this embodiment relative to a d-line (λ=587.6 nm) and a g-line (λ=435.8 nm). FIGS. 57a–57d are various aberration graphs at a maximum wide-angle or the closest-distance focusing state. FIG. 58a–58d are various aberration graphs at a maximum telephoto or farthest-distance focusing state.

As described above, the present invention creates a compact, high performance and high power zoom lens. Moreover, by combining a focus detection function with the present invention, auto focusing also becomes possible. Furthermore, even better imaging performance may be obtained by combining the present invention with a non-spherical lens or lenses made of refraction index distribution glass.

As described above, the refractive powers for the first lens group G1, the second lens group G2 and the fourth lens group G4 change drastically in each preferred embodiment. However, distortion and various other aberrations are favorably corrected, even with a large change in refractive power. Further, sufficient imaging performance is secured.

Moreover, an effective F-value at the maximum wide-angle state is very bright at about F/2.0. The amount of light in the marginal zone is sufficient. By increasing the number of lenses combined in the fourth lens group G4, a degree of freedom, which enables simultaneous correction of on-axis chromatic aberration and chromatic aberration of magnification at a maximum wide-angle state, is secured. It is also possible to reduce the load of the second lens group G2 to eliminate color.

The lens system described above comprises five lens groups. However, it is possible to divide the third lens group G3 into two separate lens groups to make the total lens system have six lens groups. Similarly, the total lens system may include seven lens groups by dividing the third lens group G3 into three lens groups to secure a sufficient degree of freedom for a larger aperture diameter.

The number of lenses may be reduced, if achieving wide angle is not necessary or a dark optical system is sufficient. It is easier to increase a zoom ratio by expanding a zoom region towards a maximum telephoto state side, rather than by expanding a zoom region towards a maximum wide-angle state side. Moreover, it is more simple to shorten a length to increase shooting magnifications because reaching the wide angle is not required. For example it may be possible to advance the first lens group G1 towards the object side. Moreover, the invention can easily be applied to an infinite state photographic system, even though each embodiment described above is a finite state photographic state.

The optical system is bright. Further, because the effective diameter of a surface closest to the object side is small, the optical system is compact. Even though compact, the optical system of the invention can correct various aberrations and provide a high performance optical system, because the optical system has effective zoom features, such as magnification of each lens group, refractive power distribution of each lens, selection of appropriate zoom locus and the like.

As described above, the invention can achieve a high resolution, high performance, high power zoom lens. For a finite system, the invention is also easily able to provide an optical system, which copes with a wide variety of uses. In particular, it can produce a bright and compact zoom lens with a short conjugal length and wide field angle. The zoom lens exhibits little distortion and fluctuation during zooming. The zoom lens can secure a sufficient amount of light in the marginal zone at a perimeter region of the field to minimize the shading of the system.

The invention achieves the optical system that simultaneously satisfies the features described above, substantially expanding the multi-purpose feature of the optical system. Here, the size, length and working distance of a shooting and projection image can easily be established by moving a focus of the focusing lens group. Various uses are possible at optimum arrangement. For example, the zoom lens of the invention can be used in a picture lens system, a digital still camera lens system, a close-up shooting optical system, an enlargement development optical system, a liquid crystal video projector projection lens and the like.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A zoom lens system comprising, in order from an object side:

a first lens group having a positive refractive power;

a second lens group having a negative refractive power;

a third lens group having a positive refractive power;

a fourth lens group having a negative refractive power; and a fifth lens group having a positive refractive power;

wherein a magnification of the second lens group, a magnification of the third lens group and a magnification of the fourth lens group simultaneously attain approximately equal magnifications in relation to one another; and the zoom lens system satisfies the conditions:

$$-0.9<(1/f1+1/f2)fw<0$$

$$-0.5<(1/f4+1/f5)fw<0.2$$

where, f1 is a focal length of the first lens group, f2 is a focal length of the second lens group, f4 is the focal length of the fourth lens group, f5 is a focal length of the fifth lens group and fw is a focal length of the zoom lens system at a maximum wide-angle state, wherein a plurality of the lens groups are movable, and wherein said zoom lens system further includes:

an aperture diaphragm which is arranged in the space between an image side of said second lens group and an image side of one of said plurality of movable lens groups which is closest to the image side of said second lens group.

2. A zoom lens of claim 1, wherein the second lens group, the third lens group and the fourth lens group simultaneously have a larger absolute value of magnification than the approximately equal magnification when closer to a maximum telephoto state than the maximum wide angle state.

3. A zoom lens system of claim 1, wherein the second lens group, the third lens group and the fourth lens group simultaneously have a smaller absolute value of magnification than the approximately equal magnification when closer the maximum wide-angle state than a maximum telephoto state.

4. A zoom lens system of claim 1, wherein the zoom lens system satisfies a condition:

$$0.3<\Phi/f3<0.8$$

where, $\Phi$ is a maximum effective diameter of an object side surface of the third lens group at a maximum wide-angle state and f3 is a focal length of the third lens group.

5. A zoom lens system of claim 1, wherein the zoom lens system satisfies conditions:

$$-1.4<\beta2<-0.4$$

$$-1.5<\beta3<-0.5$$

$$-1.5<\beta4<-0.6$$

where, $\beta2$ is a magnification of the second lens group, $\beta3$ is a magnification of the third lens group, and $\beta4$ is a magnification of the fourth lens group.

6. A zoom lens system of claim 1, wherein the magnification of one of the second lens group, the third lens group, and the fourth lens group have an equal magnification in relation to one another, and the zoom lens system satisfies a condition:

$0.9<|\beta ci|<1.1$ where βci is a magnification of at least the first lens group and the fifth lens group for zooming.

7. A zoom lens system of claim 1, wherein, the zoom lens system satisfies a condition:

$0.7<f2/f4<1.3$ where, f2 is a focal length of the second lens group and f4 is a focal length of the fourth lens group G4.

8. A zoom lens system of claim 1, wherein the zoom lens system satisfies a condition:

$0.05<\beta 1/\beta 5<0.5$ where, β1 is a magnification of the first lens group and β5 is a magnification of the fifth lens group.

9. A zoom lens system of claim 1, wherein the zoom lens system satisfies conditions:

$-0.9<fw/f12<-0.1$ $0.1<fw/f45<0.8$ where, f12 is a combined focal length of the first lens group and the second lens group, f45 is a combined focal length of the fourth lens group and the fifth lens group, and fw is a focal length of the zoom lens system at a maximum wide-angle state.

10. A zoom lens of one of claim 1, wherein, the zoom lens system satisfies conditions:

$-1.4<ft/f12<-0.3$ $0.7<ft/f45<3.0$ where, f12 is a total focal length of the first lens group and the second lens group, f45 is a combined focal length of the fourth lens group and the fifth lens group, and ft is a focal length of the zoom lens system at a maximum telephoto state.

11. A zoom lens system of claim 1, wherein the aperture diaphragm is fixedly provided between the third lens group and the fourth lens group, and wherein the zoom lens system satisfies condition:

$0.3<D3S/D4S<2.0$ where, D3S is an on-axis distance between the third lens group and the aperture diaphragm at a maximum wide-angle state and D4S is an on-axis distance between a fourth lens group and the aperture diaphragm at a maximum wide-angle state.

12. A zoom lens system of claim 11, wherein the zoom lens system satisfies conditions:

$-1.0<\Delta D3S/f3<2.0$ $-0.5<\Delta D4S/|f4|<1.0$ where, f3 is a focal length of the third lens group f4 is a focal length of the fourth lens group, ΔD3S is a displacement amount of an on-axis distance D3S during zooming from a maximum wide-angle state to a maximum telephoto state, where a sign for ΔD3S is positive for an increase and negative for a decrease and ΔD4S is a displacement amount of an on-axis distance D4S during zooming from a maximum wide-angle state to a maximum telephoto state, where a sign for ΔD4S is positive for an increase and negative for a decrease.

13. A zoom lens system for forming an image of an object comprising, in order from an object side:
a first lens group having a positive refractive power;
a second lens group having a negative refractive power;
a third lens group having a positive refractive power;
a fourth lens group having a negative refractive power; and
a fifth lens ,coup having a positive refractive power;
wherein a magnification of the second lens group, a magnification of the third lens group, and a magnification of the fourth lens group are such that they almost simultaneously attain approximately equal magnifications in relation to one another,
wherein a plurality of the lens groups are movable, and wherein said zoom lens system further includes:
an aperture diaphragm which is arranged in the space between an image side of said second lens group and an image side of one of said plurality of movable lens groups which is closest to the image side of said second lens group.

14. A zoom lens system of claim 13, wherein the second lens group, the third lens group and the fourth lens group simultaneously have a larger absolute value of magnification than the approximately equal magnification when closer to a maximum telephoto state than a maximum wide angle state.

15. A zoom lens system of claim 13, wherein the second lens group, the third lens group and the fourth lens group simultaneously have a smaller absolute value of magnification than the approximately equal magnification when closer to a maximum wide-angle state than a maximum telephoto state.

16. A zoom lens system of claim 13, wherein the zoom lens system satisfies a condition:

$0.3<\Phi/f3<0.8$ where, Φ is a maximum effective diameter of an object side surface of the third lens group at a maximum wide-angle state and f3 is a focal length of the third lens group.

17. A zoom lens system of claim 13, wherein the zoom lens system satisfies conditions:

$-1.4<\beta 2<-0.4$ $-1.5<\beta 3<-0.5$ $-1.5<\beta 4<-0.6$ where, β2 is a magnification of the second lens group, β3 is a magnification of the third lens group, and β4 is the magnification of the fourth lens group.

18. A zoom lens system of claim 13, wherein the magnifications of one of the second lens group, the third lens group, and the fourth lens group have an equal magnification in relation to one another, and the zoom lens system satisfies a condition:

$0.9<|\beta ci|<1.1$ where βci is a magnification of at least the first lens group and the fifth lens group for zooming.

19. A zoom lens system of claim 13, wherein the zoom lens system satisfies a condition:

$0.05<\beta 1/\beta 5<0.5$ where, β1 is a magnification of the first lens group and β5 is a magnification of the fifth lens group G5.

20. A zoom lens system of claim 13, wherein, the zoom lens system satisfies a condition:

$$0.7 < f2/f4 < 1.3$$

where, f2 is a focal length of the second lens group and f4 is a focal length of the fourth lens group.

21. A zoom lens system comprising, in order from an object side:
   a first lens group having a positive refractive power;
   a second lens group having a negative refractive power;
   a third lens group having a positive refractive power;
   a fourth lens group having a negative refractive power; and
   a fifth lens group having a positive refractive power;
      wherein a magnification of the second lens group, a magnification of the third lens group and a magnification of the fourth lens group simultaneously attain approximately equal magnifications in relation to one another; and
      the zoom lens system further comprising a fixed aperture diaphragm provided between the third lens group and the fourth lens group; and the zoom lens system satisfies the following conditions:

$$-0.9 < (1/f1 + 1/f2)fw < 0$$

$$-0.5 < (1/f4 + 1/f5)fw < 0.2$$

$$0.3 < D3S/D4S < 2.0$$

where, f1 is a focal length of the first lens group, f2 is a focal length of the second lens group, f4 is a focal length of the fourth lens group, f5 is a focal length of the fifth lens group, fw is a focal length of the total zoom lens system at (the) a maximum wide-angle state, D3S is an on-axis distance between the third lens group and the aperture diaphragm at the maximum wide-angle state, and D4S is an on-axis distance between the fourth lens group and the aperture diaphragm at the maximum wide-angle state.

22. A zoom lens of claim 21, wherein the second lens group the third lens group, and the fourth lens group simultaneously have a larger absolute value of magnification than the approximately substantially equal magnification, when closer to a maximum telephoto state than the maximum wide angle state.

23. A zoom lens system of claim 21, wherein the second lens group, the third lens group and the fourth lens group simultaneously have a smaller absolute value of magnification than the approximately equal magnification when closer to the maximum wide-angle state than a maximum telephoto state.

24. A zoom lens system of claim 21, wherein the zoom lens system satisfies conditions:

$$-1.0 < \Delta D3S/f3 < 2.0$$

$$-0.5 < \Delta D4S/|f4| < 1.0$$

where, f3 is a focal length of the third lens group, f4 is a focal length of the fourth lens group, ΔD3S is a displacement amount of an on-axis distance D3S during zooming from a maximum wide-angle state to a maximum telephoto state, where a sign for ΔD3S is positive for an increase and negative for a decrease, and ΔD4S is a displacement amount of an on-axis distance D4S during zooming from a maximum wide-angle state to a maximum telephoto state, where a sign for ΔD4S is positive for an increase and negative for a decrease.

25. A zoom lens of one of claim 21, wherein the zoom lens system satisfies a condition:

$$0.3 < \Phi/f3 < 1.2$$

where, w is a maximum effective diameter of an object side surface of the third lens group at the maximum wide-angle state and f3 is a focal length of the third lens group.

26. A zoom lens of claim 21, wherein the zoom lens system satisfies conditions:

$$-1.4 < \beta2 < -0.4$$

$$-1.5 < \beta3 < -0.5$$

$$-1.5 < \beta4 < -0.6$$

where, β2 is a magnification of the second lens group, β3 is a magnification of the third lens group, and β4 is a magnification of the fourth lens group.

27. A zoom lens of claim 13, wherein the first lens group is fixed relative to an image during zooming.

28. A zoom lens of claim 13, wherein the second through fourth lens groups move during zooming.

29. A zoom lens of claim 13, wherein the fifth lens group is fixed relative to an image during zooming.

30. The zoom lens of claim 13, wherein the aperture diaphragm is provided between the third lens group and the fourth lens group, and wherein the fourth lens group moves during zooming.

31. A zoom lens of claim 30, wherein the first lens group is fixed relative to an image during zooming.

32. A zoom lens of claim 1, wherein the an aperture diaphragm is arranged in a space on one of (i) an object side of said third lens group and (ii) an image side of said third lens group.

33. A zoom lens of claim 13, wherein the aperture diaphragm is arranged in a space on one of (i) En object side of said third lens group and (ii) an image side of said third lens group.

34. The zoom lens system of claim 1, wherein the aperture diaphragm is arranged in a space between an image side space of said second lens group and an object side space of said fourth lens group.

35. The zoom lens system of claim 1, wherein said first lens group is fixed with respect to the image plane during zooming.

36. The zoom lens system of claim 1, wherein horizontal magnification of said third lens group is increased when zooming from a wide angle end state to a telephoto end state.

37. The zoom lens system of claim 1, wherein said third lens group is shifted toward said object side when zooming from a wide angle end state to a telephoto end state.

38. The zoom lens system of claim 1, wherein said zoom lens system satisfies the below condition:

$$0.3 < \Phi/f3 < 0.8,$$

where, Φ is a clear aperture of the object side surface of said third lens group when at the wide angle end state, and f3 is a focal length of the third lens group.

39. The zoom lens system of claim 1, wherein said zoom lens system satisfies the below condition:

$$0.05 < \beta1/\beta5 < 0.5,$$

where, β1 is a magnification of said first lens group, and β5 is a magnification of said fifth lens group.

40. The zoom lens system of claim 13, wherein said aperture diaphragm is arranged between the image side space of said second lens group and the object side space of said fourth lens group.

41. The zoom lens system of claim 13, wherein when zooming from the wide angle end state to the telephoto end state, the horizontal magnification of said third lens group is increased.

42. The zoom lens system of claim 13, wherein when zooming from the wide angle end state to the telephoto end state, said third lens group is shifted towards said object side.

* * * * *